US008692895B2

(12) United States Patent
Ohno et al.

(10) Patent No.: US 8,692,895 B2
(45) Date of Patent: Apr. 8, 2014

(54) IMAGE APPARATUS AND ELECTRONIC DEVICE

(75) Inventors: Takehide Ohno, Yokohama (JP); Koichi Muramatsu, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 976 days.

(21) Appl. No.: 12/518,721

(22) PCT Filed: Dec. 28, 2007

(86) PCT No.: PCT/JP2007/075433
§ 371 (c)(1),
(2), (4) Date: Jun. 11, 2009

(87) PCT Pub. No.: WO2008/082008
PCT Pub. Date: Jul. 10, 2008

(65) Prior Publication Data
US 2010/0013939 A1   Jan. 21, 2010

(30) Foreign Application Priority Data

| Jan. 5, 2007 | (JP) | ................................ | 2007-000552 |
| Mar. 2, 2007 | (JP) | ................................ | 2007-052810 |
| Apr. 3, 2007 | (JP) | ................................ | 2007-097063 |
| May 21, 2007 | (JP) | ................................ | 2007-133672 |
| Aug. 10, 2007 | (JP) | ................................ | 2007-209408 |

(51) Int. Cl.
*H04N 5/225* (2006.01)
*H04N 5/228* (2006.01)

(52) U.S. Cl.
USPC ........................................ 348/208.5; 348/373

(58) Field of Classification Search
USPC ................. 348/208.3–208.7, 373–375, 208.5
See application file for complete search history.

(56) References Cited

U.S. PATENT DOCUMENTS

| 7,057,829 | B2 | 6/2006 | Tanigawa et al. |
| 7,436,435 | B2 * | 10/2008 | Wada ........................ 348/208.4 |
| 7,468,327 | B2 * | 12/2008 | Chang et al. ................. 438/758 |
| 2001/0055073 | A1 * | 12/2001 | Shinomiya .................... 348/374 |
| 2003/0025824 | A1 * | 2/2003 | Ishikawa ....................... 348/374 |
| 2003/0067544 | A1 * | 4/2003 | Wada ........................ 348/208.7 |
| 2004/0047273 | A1 | 3/2004 | Kitano |
| 2005/0052570 | A1 * | 3/2005 | Enomoto ..................... 348/375 |
| 2005/0083590 | A1 * | 4/2005 | Tanigawa et al. ............. 359/819 |
| 2006/0007320 | A1 * | 1/2006 | Seo ............................ 348/219.1 |
| 2006/0115261 | A1 | 6/2006 | Nomura |
| 2006/0234767 | A1 | 10/2006 | Nishikawa et al. |
| 2007/0002546 | A1 * | 1/2007 | Nomura et al. ............... 361/748 |
| 2007/0154195 | A1 | 7/2007 | Irisawa et al. |

FOREIGN PATENT DOCUMENTS

| CN | 1469353 A | 1/2004 |
| CN | 1609647 A | 4/2005 |
| CN | 1719326 A | 1/2006 |

(Continued)

*Primary Examiner* — Sinh Tran
*Assistant Examiner* — Tuan Le
(74) *Attorney, Agent, or Firm* — Dickstein Shapiro LLP

(57) ABSTRACT

An imaging apparatus includes a barrel unit having a photographic lens, an image pickup device configured to receive light through the photographic lens to capture a subject image, a movable unit configured to movably support the image pickup device in a direction perpendicular to a light-receiving axis of the subject image, a processing unit configured to process signals from the image pickup device, a flexible board configured to connect the image pickup device to the processing unit, and a positioning unit configured to position the flexible board.

16 Claims, 46 Drawing Sheets

(56) References Cited

FOREIGN PATENT DOCUMENTS

| | | |
|---|---|---|
| EP | 1 526 716 A2 | 4/2005 |
| EP | 1 732 312 A2 | 12/2006 |
| JP | 2003-110930 | 4/2003 |
| JP | 2003-189140 | 7/2003 |
| JP | 2003-303944 | 10/2003 |
| JP | 2004-77852 | 3/2004 |
| JP | 2004-274242 | 9/2004 |
| JP | 2005-102172 | 4/2005 |
| JP | 2007-274666 | 10/2007 |

* cited by examiner

GENERAL OPERATIONS OF A DIGITAL CAMERA

FIG.25
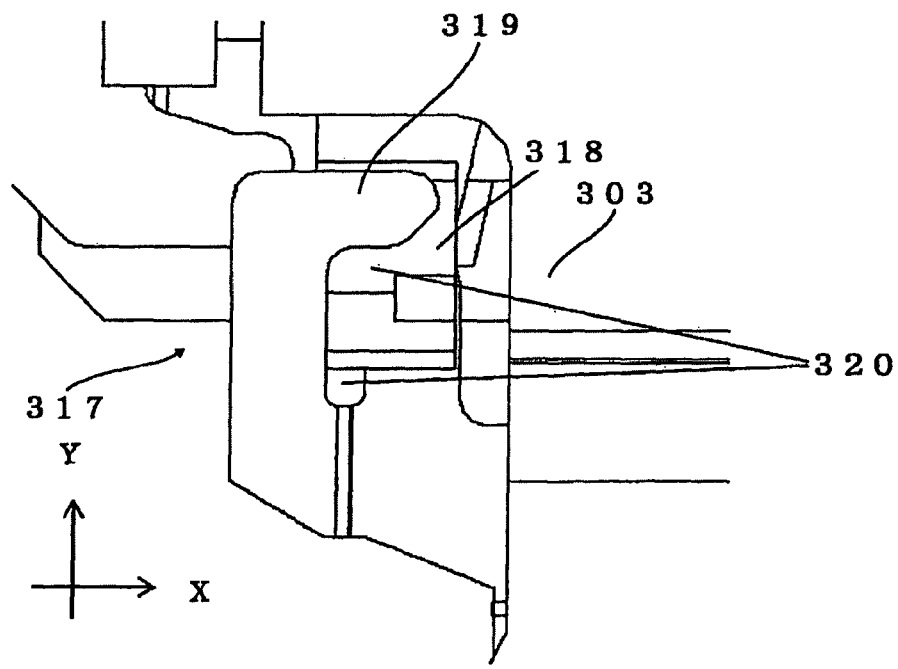
FIG.26
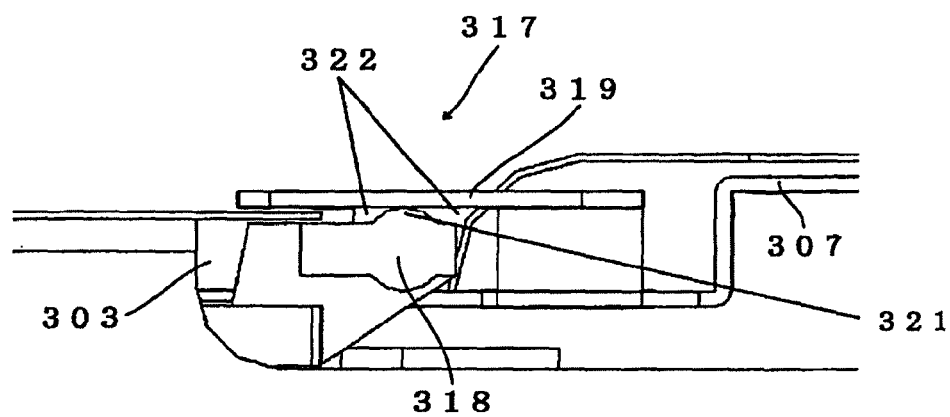
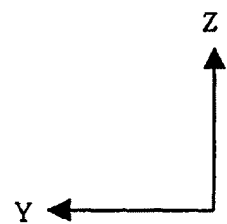

FIG.41
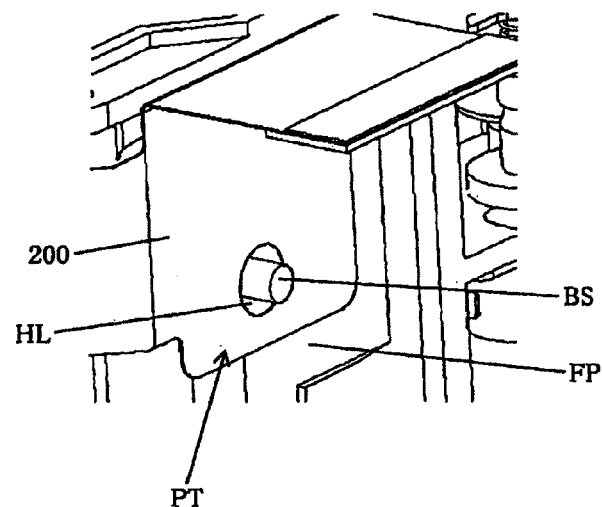
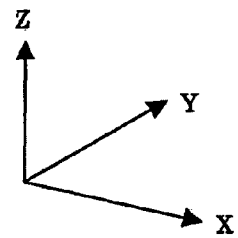
FIG.42
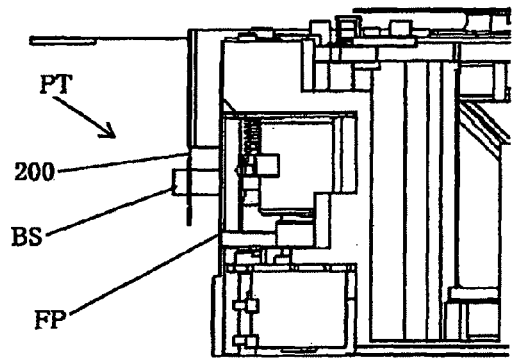
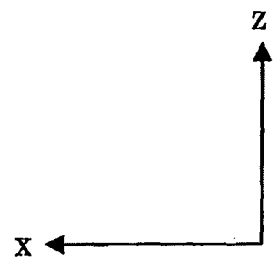

IMAGE APPARATUS AND ELECTRONIC DEVICE

CROSS-REFERENCE TO THE RELATED APPLICATIONS

This application is based on and claims priority from Japanese Patent Application Nos. 2007-000552, filed on Jan. 5, 2007, 2007-097063, filed on Apr. 3, 2007, 2007-052810, filed on Mar. 2, 2007, 2007-133672, filed on May 21, 2007 and 2007-209408, filed on Aug. 10, 2007, the disclosure of which is incorporated herein by reference in its entirety.

TECHNICAL FIELD

The present invention relates to an imaging apparatus which captures an image of a subject by imaging an optical image of the subject on an image sensor which forms image data based on the optical image, and particularly to an imaging apparatus which includes a function of suppressing image blur by making an image sensor follow the movement of an optical image of a subject causing the image blur and an electronic device including the imaging apparatus.

BACKGROUND ART

At present, an imaging apparatus is known such as a digital camera having a so-called image blur suppression function, which suppresses image blur. Such an imaging apparatus is, for example, described in Japanese Patent Application Publication No. 2004-274242, in which a mounting stage is provided at one end of a fixation cylinder which is integrally mounted to a case of a body and houses a barrel unit including a lens barrel, and the like on an optical axis for photographing. An image pickup device such as a CCD (charge-coupled device) solid-state image sensor is mounted on the mounting stage. The mounting stage is held on a guide stage, which, in turn, enables the mounting stage to move along an X-Y plane perpendicular to a Z axis of an optical axis. The guide stage is fixed with regard to the optical axis in the case of the body, while the mounting stage is configured to be driven on the guide stage by magnetic forces which are formed by permanent magnets and coils placed opposite to the permanent magnet.

According to the conventional imaging apparatus, a processing circuit containing an arithmetic processing device, or the like, which is provided in the case of the body, is configured to detect a slope of the body produced in the X and Y directions. Based on the detected output, by varying currents to be conducted to the driving coils, the image pickup device is controlled to follow the movement of an optical image of the subject causing an image blur. At this time, a flexible printed wiring board (hereinafter called simply "flexible board"), which can be flexibly deformed, is used to connect the image pickup device, which is movably disposed on the mounting stage, and the processing circuit, which controls the image pickup device and processes signals from the image pickup device. This prevents movement control performance of the image pickup device from deteriorating. That is, when the image pickup device is moved, the flexible board absorbs a reactive force generated on the flexible board due to the connection between the image pickup device and the processing circuit on which an end of the flexible board is fixed, by use of flexibility of the flexible board. Accordingly, the reactive force interferes with the movement of the image pickup device so as to prevent the movement control performance of the image pickup device from deteriorating.

In the conventional imaging apparatus, as the flexible board which connects the image pickup device movably disposed and the processing circuit or the processing device, a long flexible board is required in order to absorb the reactive force of the flexible board produced when the image pickup device is moved.
(Problem 1)

However, if a long flexible board is used, there is a problem in that the flexible board cannot effectively absorb the reactive force because the flexible board interferes with surrounding parts due to deformation of the flexible board such as slack thereof, or the like when the image pickup device moves.
(Problem 2)

Since most parts surrounding the image pickup device in the imaging apparatus are disposed so as to be overlapped with the barrel unit in a direction perpendicular to the optical axial direction, each of the surrounding parts has only a small space in the optical axial direction. Accordingly, there is a problem in that if the flexible board is not exactly disposed at a predetermined position, it is possible the flexible board will interfere with the surrounding parts thus increasing the reactive forces of the flexible board by the interferences. There is also a problem in that if the flexible board is not exactly disposed at the predetermined position to use efficiently the space around the image pickup device, reductions of size and thickness of the body can not be achieved.
(Problem 3)

Furthermore, in the conventional imaging apparatus, there is a problem in that the flexible board is deformed due to variations in the position of the processing device occurring when the flexible board is attached on the fixed processing device so that the movement of the image pickup device is affected by the deformation.
(Problem 4)

In addition, in the conventional imaging apparatus, the flexible board has a plurality of folded portions to absorb reactive forces. Therefore, when assembling the imaging apparatus, the flexible board is required to be accurately folded at a plurality of folded portions to allow the flexible board to be firmly housed at a predetermined position in a small space of the camera body around the image pickup device.
(Problem 5)

Furthermore, in the conventional imaging apparatus, the long flexible board having the plurality of folded portions is required in order to absorb reactive forces generated in the flexible board according to the movement of the image pickup device. Therefore, long signal lines disposed along the flexible board are used and thus image signals are easily affected by noise, or the like, and this causes a problem in that image quality is reduced.

DISCLOSURE OF THE INVENTION

An object of the present invention is to provide an imaging apparatus having an image blur suppression function, in which a positioning unit is configured to guide a flexible board connecting between an image pickup device and a processing circuit so that interference between the flexible board and surrounding parts is prevented.

To achieve the above object, an imaging apparatus according to an embodiment of the present invention includes a barrel unit having a photographic lens, an image pickup device configured to receive light through the photographic lens to capture a subject image, a movable unit configured to movably support the image pickup device in a direction perpendicular to a light-receiving axis of the subject image, a processing unit configured to process signals from the image pickup device, a flexible board configured to connect the image pickup device to the processing unit, and a positioning unit configured to position the flexible board.

BRIEF DESCRIPTION OF THE DRAWINGS

FIG. 25 is a schematic view illustrating the connection portion shown in FIG. 23 in a state after the flexible board positioning member is connected, viewed from X-Y plane.

FIG. 26 is a schematic sectional view in an X direction illustrating the connection portion shown in FIG. 23 in a state after the flexible board positioning member is connected.

FIG. 41 is an enlarged view showing a positioning mechanism PT.

FIG. 42 is a side view showing the imaging apparatus shown in FIG. 39.

BEST MODE FOR CARRYING OUT THE INVENTION

Preferred embodiments of an imaging apparatus such as a digital camera having an image blur suppression function for suppressing image blur and an electronic device including the imaging apparatus according to the present invention will be explained in detail with reference to the accompanying drawings below.

An imaging apparatus according to an embodiment of the present invention includes a barrel unit 7 (described later) which has a photographic lens including, for example, a zoom lens 71*a*, a focus lens 72*a*, and the like, an image pickup device such as a CCD solid-state image sensing device 101, which is configured to receive light through the photographic lens to capture a subject image, a movable unit such as a CCD stage 1251 which is configured to movably support the image pickup device in a direction perpendicular to a light-receiving axis of the subject image, a processing unit or a processing device such as a processor 104 included in a processing circuit which is configured to process signals from the image pickup device, a flexible board 200 (described later), which is configured to connect the image pickup device to the processing unit, and a positioning unit configured to position the flexible board.

Figure 49:
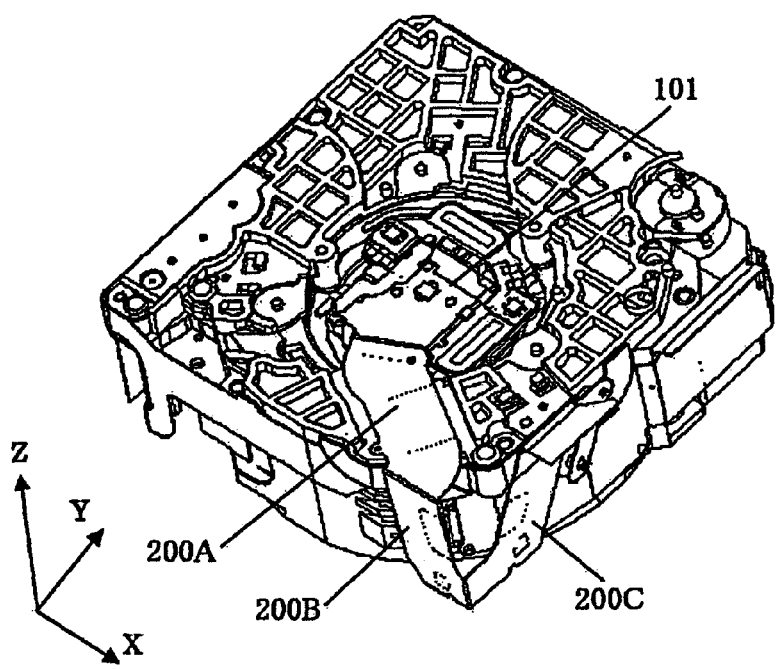
FIG. 49 is an enlarged perspective view illustrating the imaging apparatus according to an embodiment of the present invention.
Figure 50:
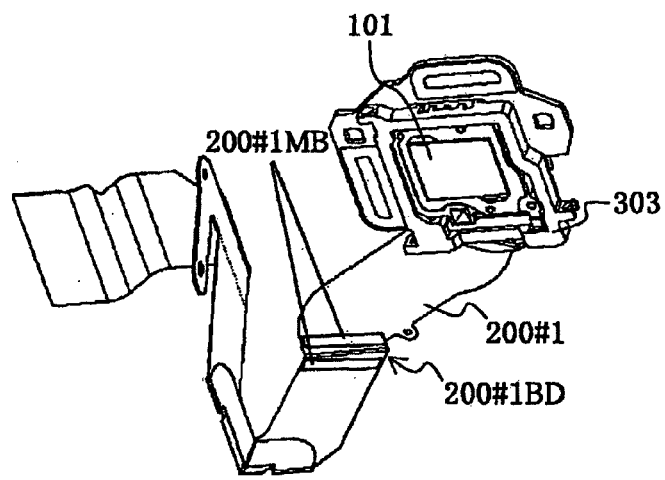
FIG. 50 is a perspective view illustrating an image pickup device and a flexible board of the imaging apparatus according to an embodiment of the present invention, viewed from a light-receiving surface of the image pickup device.
Figure 51:
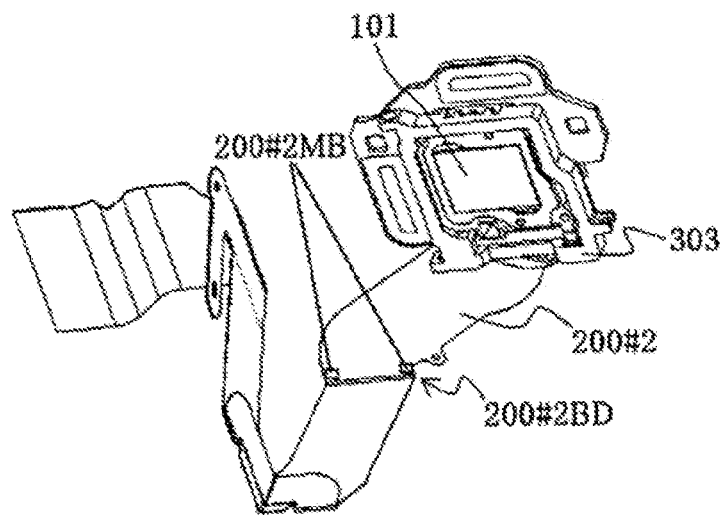
FIG. 51 is a perspective view illustrating an image pickup device and a flexible board of the imaging apparatus according to an embodiment of the present invention, viewed from a light-receiving surface of the image pickup device.

The positioning unit includes, for example, a positioning member 307 configured to guide the flexible board connected to the image pickup device along a peripheral portion of the barrel unit (FIGS. 20 to 27), at least one reinforcing member (for example 200*hk*A) provided on a part of the flexible board to suppress deformation of the flexible board (FIGS. 45 to 49), a positioning mechanism including a concave portion provided on the flexible board and a convex portion provided on the fixing unit and configured to be fitted in the convex portion (FIGS. 39 to 44), and a folded portion positioning member 200#1MB which is provided on the flexible board (FIGS. 50 and 51).

Next, a digital camera used as the imaging apparatus according to an embodiment of the present invention will be explained as follows.

(General Structure of Digital Camera)

Figure 1:
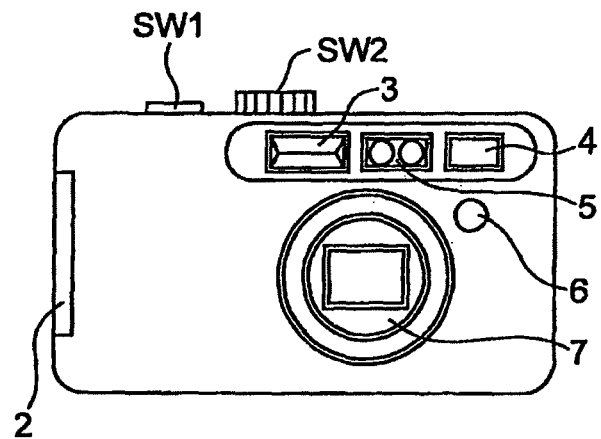
FIG. 1 is a front view of a digital camera according to an embodiment of the present invention.
Figure 2:
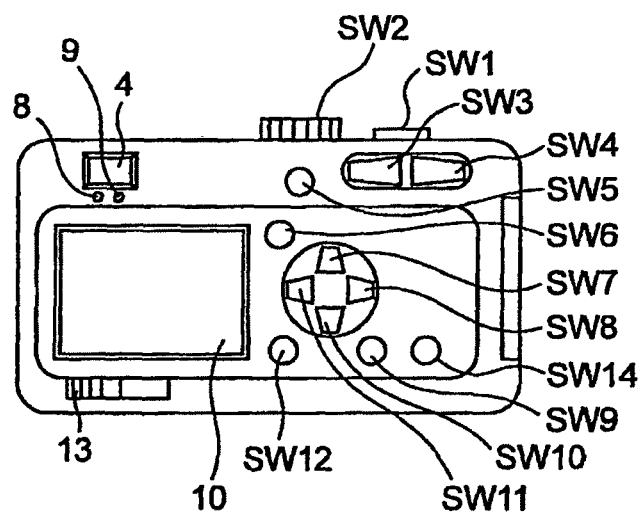
FIG. 2 is a back view of the digital camera presented in FIG. 1.
Figure 3:
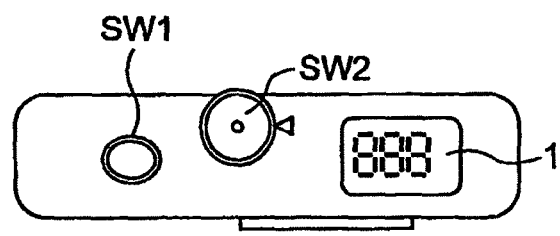
FIG. 3 is a plan view of the digital camera presented in FIG. 1.
Figure 4A:
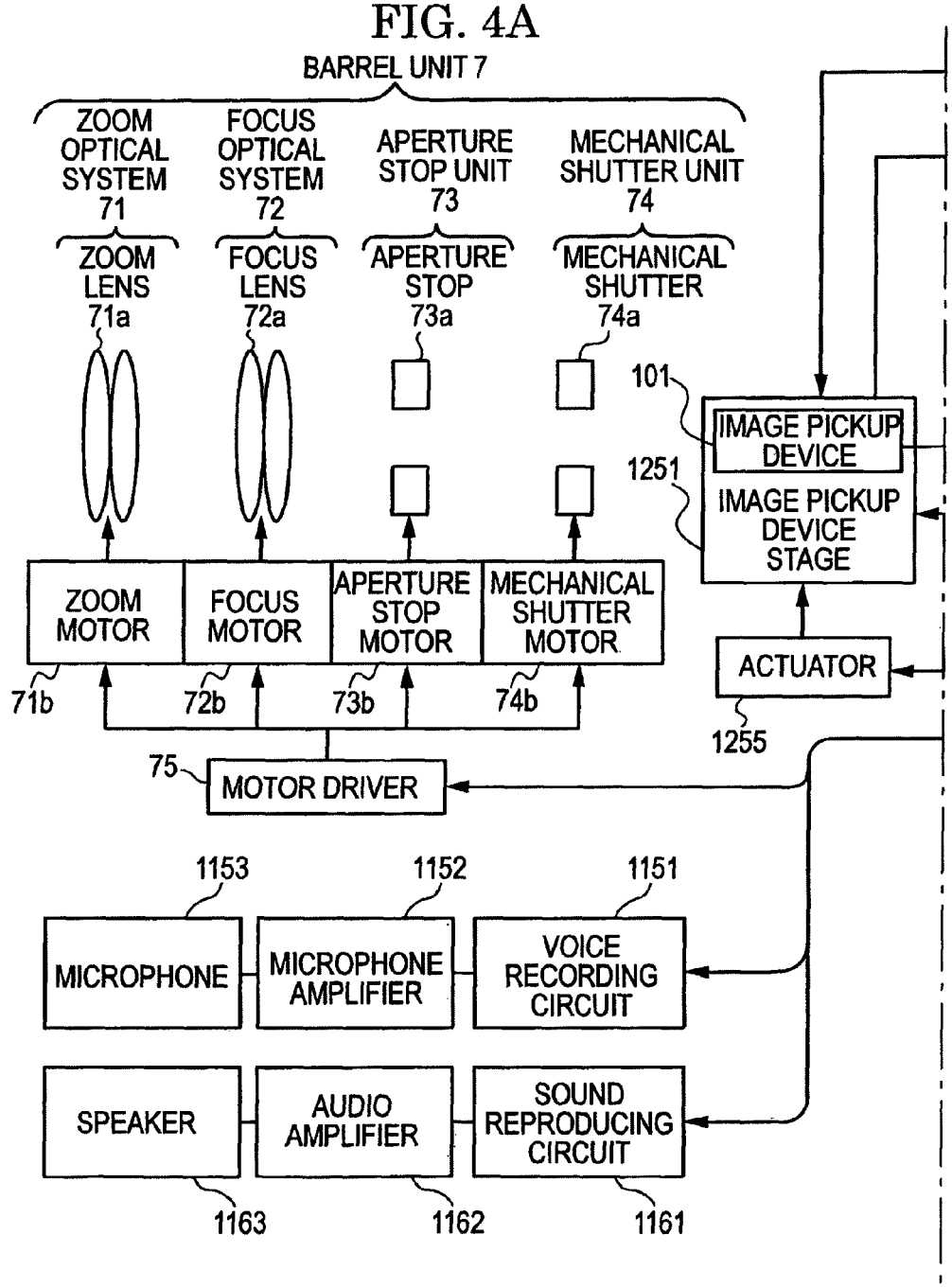
FIG. 4 is a block diagram illustrating a schematic system circuit configuration of the digital camera presented in FIG. 1.
Figure 4B:
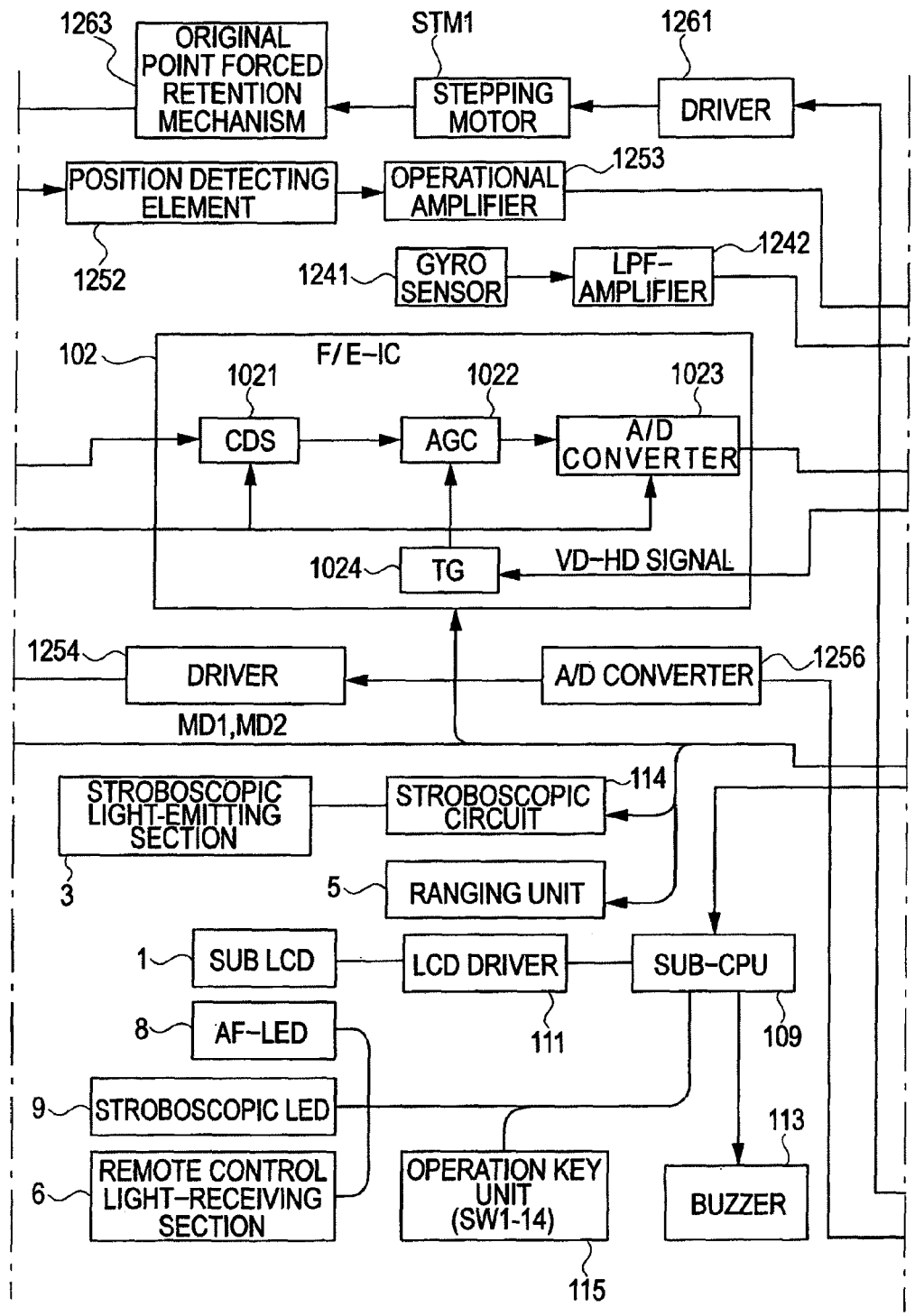
Figure 4C:
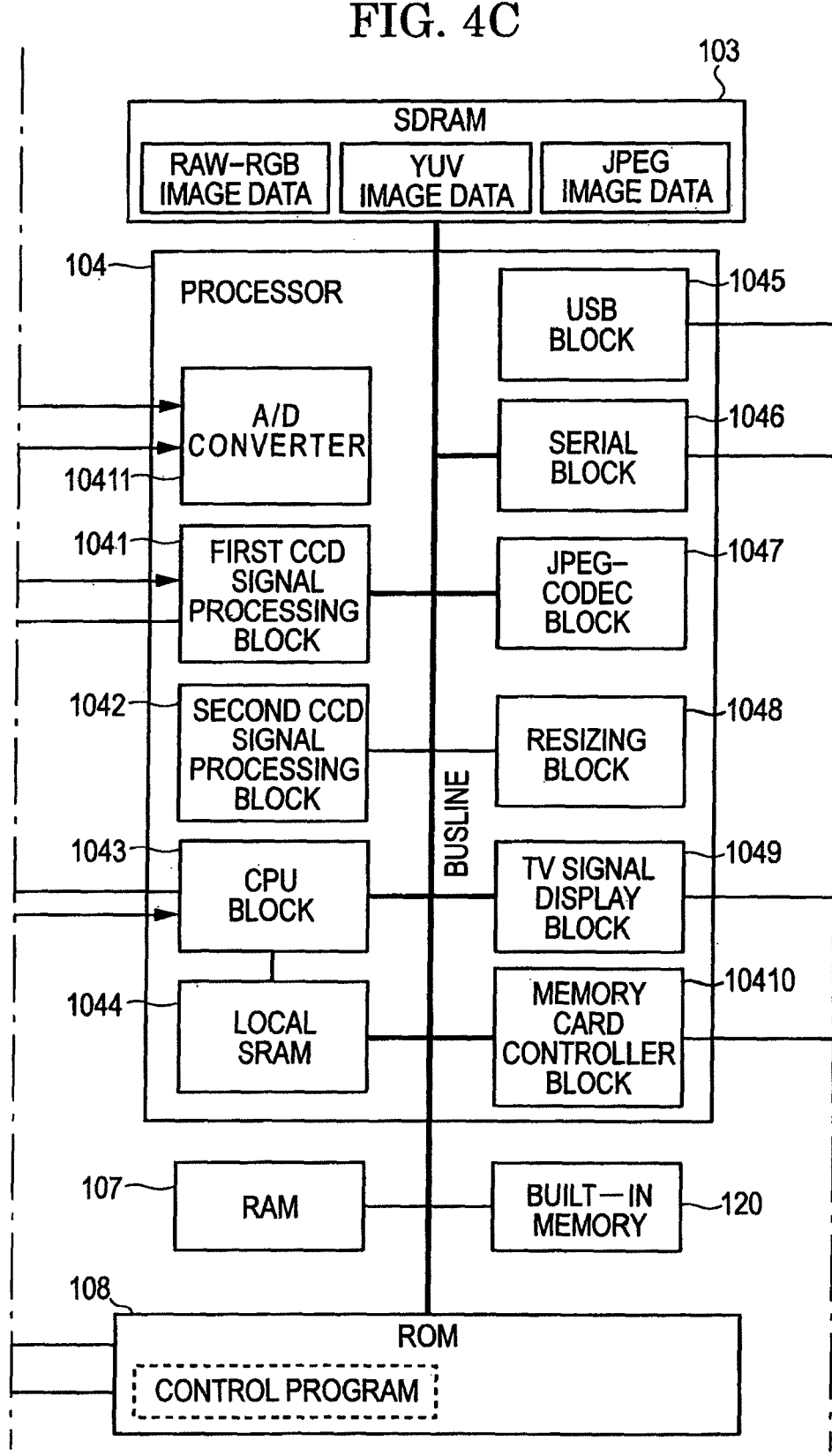
Figure 4D:
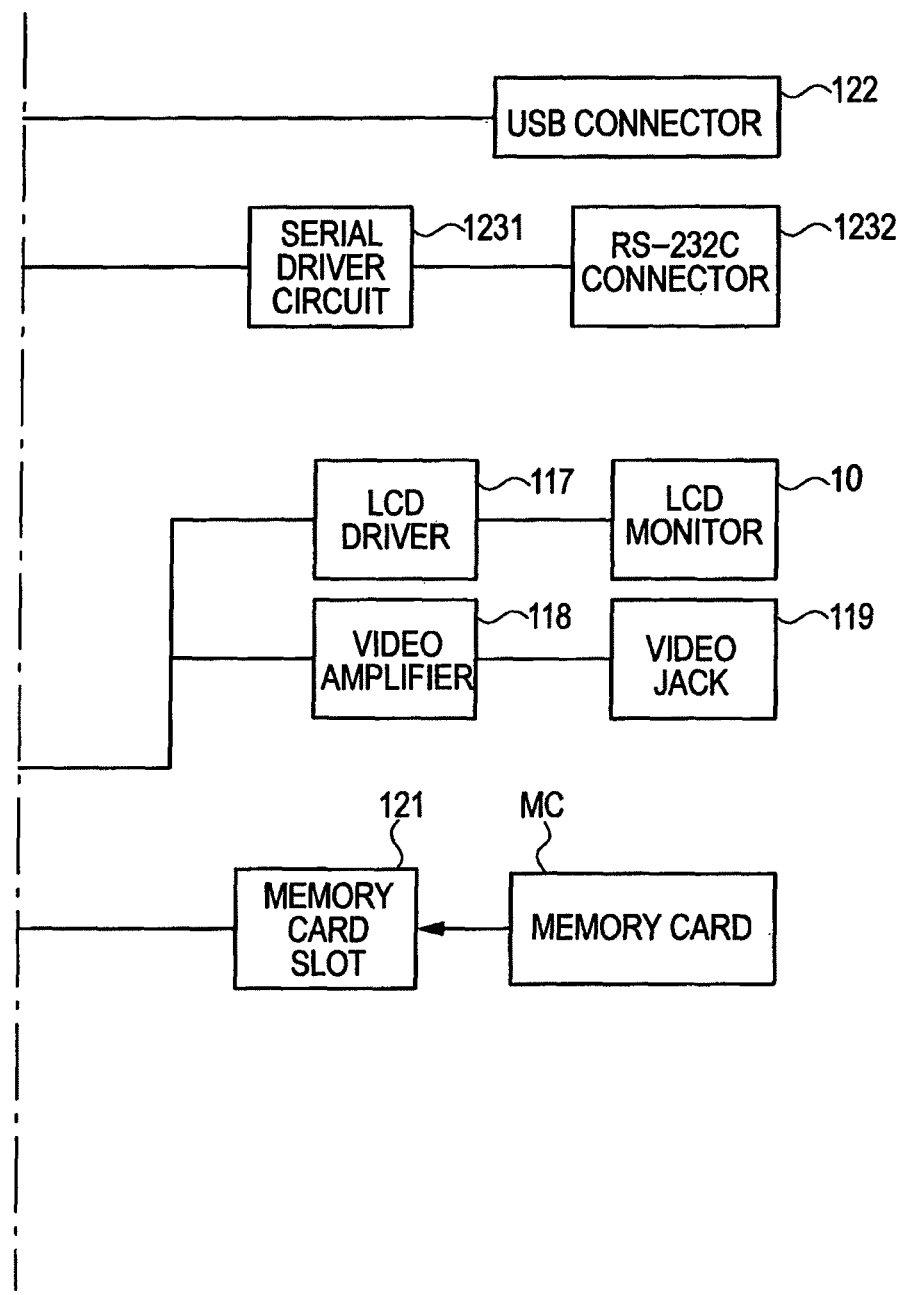

FIGS. 1 to 4 show a structure of the digital camera having a function for suppressing an image blur as an imaging apparatus according to an embodiment of the present invention. FIG. 1 is a front view of the digital camera, FIG. 2 is a back view of the digital camera presented in FIG. 1, FIG. 3 is a plan view of the digital camera presented in FIG. 1, and FIG. 4 is a block diagram illustrating a schematic system structure of the digital camera presented in FIG. 1.

In FIGS. 1 to 3, a camera body has a top plane provided with a release switch (so called a shutter button) SW1, a mode dial SW2, and a sub LCD (liquid crystal display) 1.

The camera body has a front plane provided with a stroboscopic light-emitting section 3, an optical finder 4, a ranging unit 5, and a remote control light-receiving section 6. The optical finder 4 has an object plane positioned at the front plane of the camera body. The barrel unit 7 has an object plane provided toward the front plane of the camera body.

The camera body has a back plane provided with the optical finder 4, a power switch SW13, an LCD monitor 10, an AF (automatic focus)-LED (light-emitting diode) 8, a stroboscopic LED 9, a wide-angle zoom switch SW3, a telephoto zoom switch SW4, a self-timer switch SW5, a menu switch SW6, an up/stroboscopic switch SW7, a right switch SW8, a display switch SW9, a down/macro-switch SW10, a left/image confirmation switch SW11, an OK switch SW12, and a switch for suppressing an image blur SW14. The optical finder 4 has a main part contained in the camera body and an ocular plane disposed on the back plane of the camera body.

The camera body has a side plane provided with a lid 2 of a memory card/battery loading space.

Since general operations of each portion described above are well-known, detailed descriptions are omitted.

Next, the system structure of the processing circuit of the digital camera, which contained in the camera body, will be explained.

Referring to FIG. 4, the processor 104 executes various processes of the digital camera. The processor 104 includes an A/D (analogue/digital) converter 10411, a first CCD signal processing block 1041, a second CCD signal processing block 1042, a CPU (central processing unit) block 1043, a local SRAM (static random access memory) 1044, a USB (universal serial bus) block 1045, a serial block 1046, a JPEG/CODEC block 1047, a resizing block 1048, a TV signal display block 1049, and a memory card controller block 10410. Each of the blocks is connected to each other via bus lines.

An SDRAM (a synchronous dynamic random access memory) 103 is connected to the processor 104 via a bus line. Stored in the SDRAM 103 are RAW-RGB image data, which is raw data of RGB processed only by white balance and γ processing, YUV image data, which are image data converted into luminance data and color difference data, and image data such as JPEG image data, which are compressed by the JPEG method.

Connected to the processor 104 via the bus lines are a RAM (random access memory) 107, an internal memory 120, and a ROM (read only memory) 108.

The internal memory 120 is a memory, which stores photographed image data when a memory card MC is not installed in a memory card slot 121.

At least one control program, parameters, etc., are stored in the ROM 108. The control program is loaded in a main memory of the processor 104 (for example, the RAM 107, the local SRAM 1044, or a memory embedded in the CPU block 1043), when the power switch SW13 is turned on, to allow the processor 104 to control operations of each section according to the control program. Control data, parameters, etc., are stored temporarily in the RAM 107 or the like with the control.

The barrel unit 7 includes a lens barrel containing a zoom optical system 71 having the zoom lens 71*a*, a focus optical system 72 having the focus lens 72*a*, an aperture stop unit 73 having an aperture stop 73*a*, and a mechanical shutter unit 74 having a mechanical shutter 74*a*.

The zoom optical system 71, the focus optical system 72, the aperture stop unit 73, and the mechanical shutter unit 74 are driven by a zoom motor 71*b*, a focus motor 72*b*, an aperture stop motor 73*b*, and a mechanical shutter motor 74*b*, respectively. Each of these motors is driven by a motor driver 75, and the motor driver 75 is controlled by the CPU block 1043 of the processor 104.

A subject image is imaged onto the CCD solid-state image sensing device 101 by the barrel unit 7, and the CCD solid-state image sensing device 101 converts the imaged subject image into an image signal to output the image signal to an F/E-IC (front-end integrated circuit) 102. The F/E-IC 102 is configured to include a CDS (correlated double sampling) 1021, which performs a correlated double sampling for eliminating image noise, an AGC (automatic gain control) 1022 for gain adjustment, and an A/D converter 1023 which conducts an analogue/digital conversion. More particularly, the F/E-IC 102 conducts a predetermined process to the image signal, converts an analogue image signal to a digital signal, and then outputs the digital signal to the first CCD signal processing block 1041 of the processor 104. These signal control processes are performed by driving timing signals, which are output through a TG (timing generator) 1024. The TG 1024 generates driving timing signals for the CDS 1021, the AGC 1022, and the A/D converter 1023 based on vertical synchronization signals VD and horizontal synchronization signals HD which are output from the first CCD signal processing block 1041 of the processor 104.

The first CCD signal processing block 1041 of the processor 104 performs a white balance setting or a γ processing setting to the digital image data input from the CCD solid-state image sensing device 101 via the F/E-IC 102, and also outputs the vertical synchronization signals VD and the horizontal synchronization signals HD.

The second CCD signal processing block 1042 performs a conversion from the input digital image data to luminance data and color difference data by a filtering process.

The CPU block 1043 of the processor 104 controls operations of each section of the digital camera such as that of the motor driver 75, the CCD solid-state image sensing device 101, and the like, based on the signals input from the remote control light-receiving section 6 or an operation unit having the operation switches SW1-SW14 according to the control program stored in the ROM 108.

The local SRAM 1044 temporarily stores data required for a control of the CPU block 1043 and the like.

The USB block 1045 performs a process for communicating with using an external device such as a PC or the like via a USB interface.

The serial block 1046 performs a process for serial communications with the external device such as the PC or the like.

The JPEG/CODEC block 1047 performs a compression and an extension of the image data by the JPEG method.

The resizing block 1048 performs a process for scaling a size of the image data by an interpolating process or the like.

The TV signal display block 1049 converts the image data to a video signal to display on an external display device such as a liquid crystal monitor 10, TV, or the like.

The memory card controller block 10410 controls a memory card MC in which the photographed image data are stored.

The CPU block 1043 of the processor 104 is configured to control a voice recording operation by a voice recording circuit 1151.

The voice recording circuit 1151 records a voice signal, which is detected by a microphone 1153, converted into an electrical signal, and then amplified by a microphone amplifier 1152 according to a predetermined command such as a switch operation.

The CPU block 1043 controls operations of a sound reproducing circuit 1161.

The sound reproducing circuit 1161 amplifies the voice signal appropriately stored in a memory by an audio amplifier 1162 and reproduces via a speaker 1163 according to a predetermined command such as a switch operation.

The CPU block 1043 controls a stroboscopic circuit 114 so as to flash illumination light from the stroboscopic light-emitting section 3.

The CPU block 1043 also controls the ranging unit 5 so as to measure a subject distance.

The CPU block 1043 is connected to a sub CPU 109.

The sub CPU 109 controls the display by the sub LCD 1 via an LCD driver 111. The sub CPU 109 is also connected to the AF-LED 8, the stroboscopic LED 9, the remote control light-receiving section 6, an operation key unit having the operation switches SW1-SW14, and a buzzer 113.

The USB block 1045 is connected to a USB connector 122.

The serial block 1046 is connected to an RS-232C connector 1232 via a serial driving circuit 1231.

The TV signal display block 1049 is connected to the LCD monitor 10 through an LCD driver 117.

The LCD driver 117 converts the video signal output from the TV signal display block 1049 to a signal for displaying on the LCD monitor 10 and then drives the LCD monitor 10 to display the image.

The LCD monitor 10 is used for monitoring a subject's condition before photographing, confirming a photographed image and displaying image data recorded in a memory card or an internal memory 120.

The video signal output from the TV signal display block 1049 is also output to a video jack 119 which connects the digital camera to the external display device such as a TV, via a video amplifier 118 which converts the video signal into a video output, for example, of 75Ω impedance.

The memory card controller block 10410 is connected to the memory card slot 121, and controls a read/write of the memory card MC installed on the memory card slot 121.

The digital camera has the body provided with a fixation cylinder (described later) 12 corresponding to a part of the barrel unit 7. The fixation cylinder 12 is provided with the CCD stage 1251 having a mounting stage 15 (described later) capable of moving in X-Y directions. The CCD solid-state image sensing device 101 is mounted on the CCD stage 1251 corresponding to a part of the mechanism for suppressing an image blur. The details of the mechanical structure of the CCD stage 1251 will be described later.

The CCD stage 1251 is driven by an actuator 1255, and the driving of the actuator 1255 is controlled by a driver 1254. The driver 1254 includes a coil drive MD1 and a coil drive MD2. The driver 1254 is connected to an A/D (analogue/digital) converter IC1 which is connected to the ROM 108. Control data are input to the A/D converter IC1 from the ROM 108.

The fixation cylinder 12 is provided with an original point forced retention mechanism 1263, which retains the CCD stage 1251 at a central position when the suppression switch SW14 is powered off and the power switch SW13 is powered off. The original point forced retention mechanism 1263 is controlled by a stepping motor STM1 as an actuator, which is driven by a driver 1261. Control data are input to the driver 1261 from the ROM 108.

The CCD stage 1251 is provided with a position detection element 1252. A detection output of the position detection element 1252 is input into an operational amplifier 1253 to be amplified, and then is input into the A/D converter 10411.

The camera body is provided with a gyro sensor 1241, which is capable of detecting a rotation of the camera in the X direction and Y direction. A detection output of the gyro sensor 1241 is input to the A/D converter 10411 via an LPF amplifier 1242, which has a function as a low-pass filter.

Figure 5:
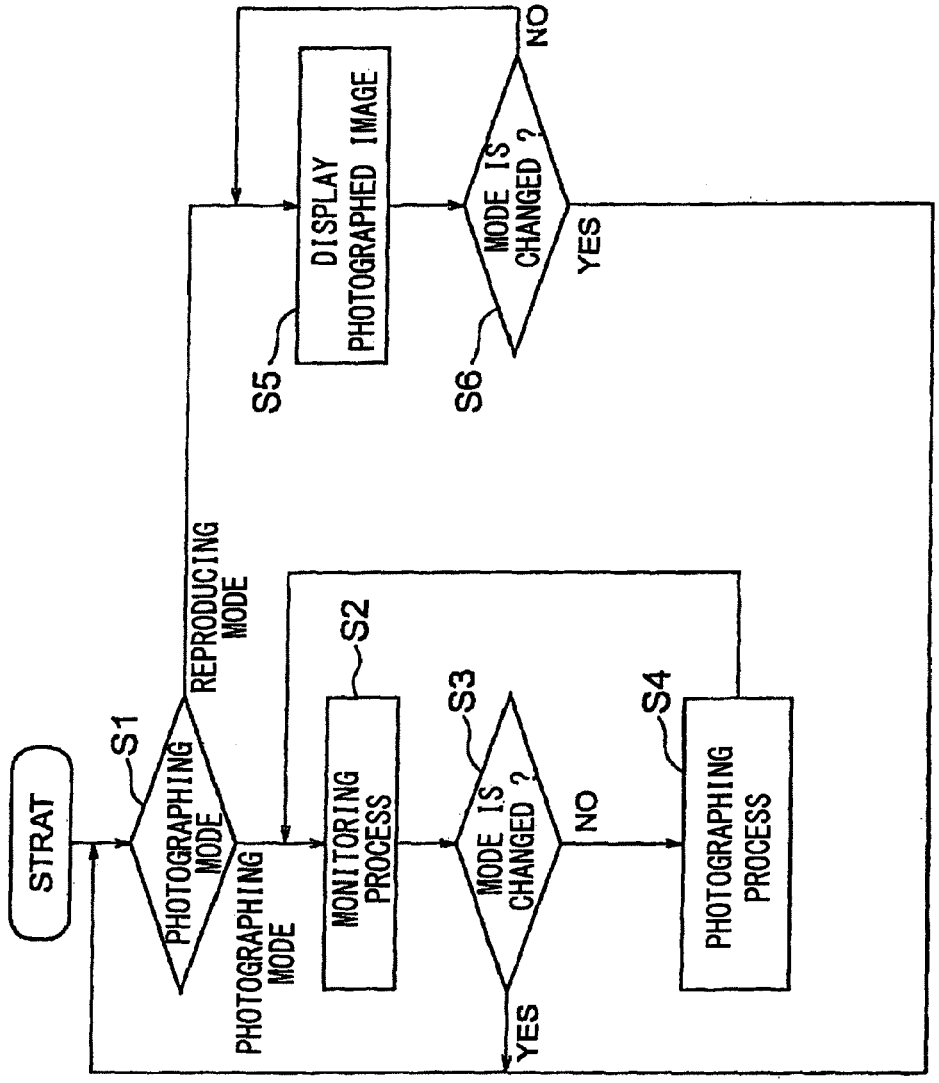
FIG. 5 is a flow chart explaining a general operation of the digital camera according to an embodiment of the present invention.

Next, general operations of a digital camera according to the embodiment of the present invention will be schematically explained with reference to FIG. 5.

If the mode dial SW2 is set to a photographing mode, the camera is activated with the photographing mode. Also if the mode dial SW2 is set to a reproducing mode, the camera is activated with the reproducing mode. The processor 104 determines whether a switch condition of the mode dial SW2 is set to the photographing mode or the reproducing mode (S1).

The processor 104 controls the motor driver 75 to move the lens barrel of the barrel unit 7 to a photographable position. Moreover, the processor 104 powers on each of the circuits of the CCD solid-state image sensing device 101, the F/E-IC 102, the LCD monitor 10, and the like to start the operations. If each of the circuits is powered on, the operation of the photographing mode is initiated.

In the photographing mode, light which has entered into the CCD solid-state image sensing device 101 through the barrel unit 7 is photo-electrically converted on the CCD solid-state image sensing device 101 to be sent to the CDS circuit 1021, the AGC 1022, and the A/D converter 1023 as analogue signals of R, G, B. The A/D converter 1023 converts the input analogue signals into digital signals. The digital signals output from the A/D converter 1023 are converted into YUV (luminance and color difference signals) image data by a YUV conversion function of the second CCD signal processing block 1042 in the processor 104 and are written into the SDRAM 103 as a frame memory.

The YUV signal is read out by the CPU block 1043 of the processor 104 and sent to the external display device such as the TV or the LCD monitor 10 via the TV signal display block 1049 to display the photographed image. This process, which is performed at intervals of 1/30 seconds, provides an electronic finder display renewed at every 1/30 seconds in the photographing mode. Namely, a monitoring process is carried out (S2). Next, the processor 104 determines whether or not a setting of the mode dial SW2 has been changed (S3). If the setting of the mode dial SW2 is not changed, a photographing process is carried out according to the operation of the release switch SW1 (S4).

In the reproducing mode, the processor 104 displays the photographed image onto the LCD monitor 10 (S5). Then, the processor 104 determines whether or not the setting of the mode dial SW2 has been changed (S6). If the setting of the mode dial SW2 has been changed, the operation proceeds to S1. If the setting of the mode dial SW2 has been unchanged, the operation of S5 is repeated.

(Principle of Image Blur Suppression)

A principle of the image blur suppression will be explained with reference to FIGS. 6A and 6B.

Figure 6A:
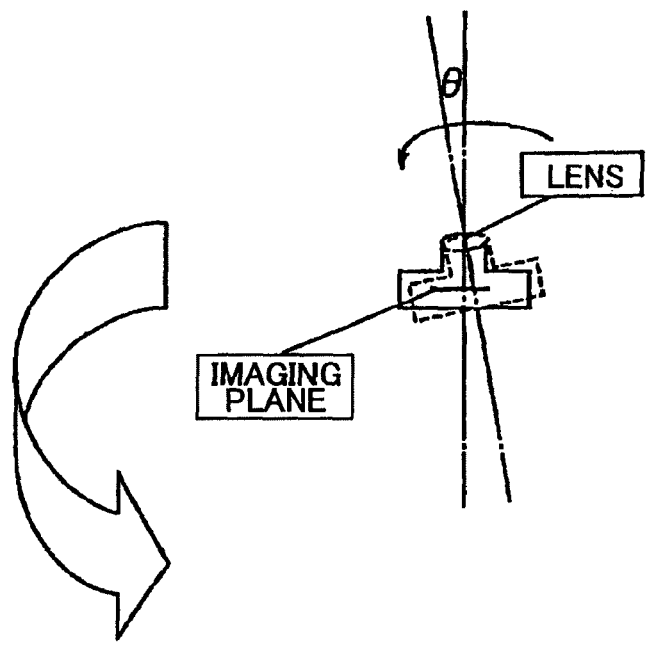
FIG. 6A is a view explaining a principle for suppressing an image blur of the digital camera according to an embodiment of the present invention, and illustrating an inclination of the digital camera.
Figure 6B:
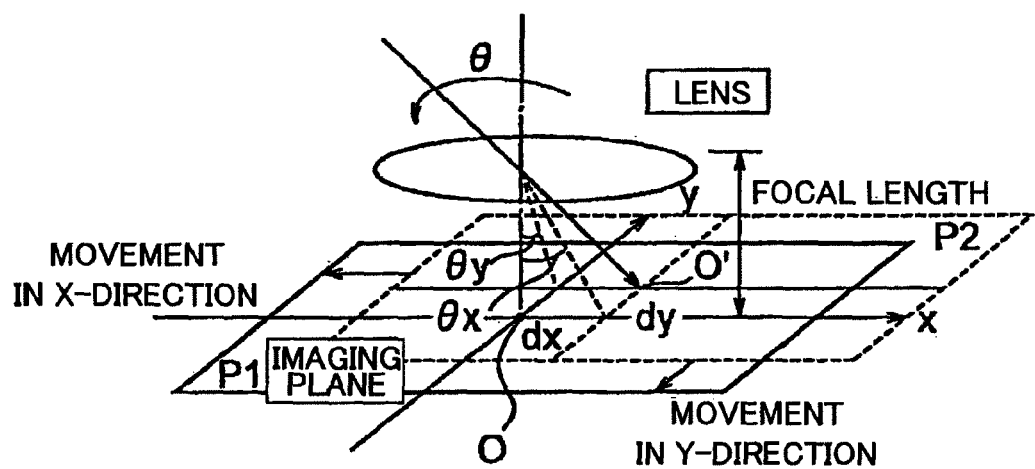
FIG. 6B is a partly enlarged view presenting a relationship between a photographing lens and an imaging surface of an image pickup device (CCD) of the digital camera.

FIG. 6A shows a state where the digital camera as illustrated by the dotted line is inclined with respect to a position at which the digital camera is free from a camera shake as illustrated by the solid line. FIG. 6B is a partially enlarged view illustrating a relationship between a photographing lens of the camera body and an imaging plane of the CCD solid-state image sensing device 101.

If the camera is not moved by the camera shake, and the imaging plane of the CCD solid-state image sensing device 101 is in a position P1, that is to say, in the central position, the subject image is projected on the original point O. Here, if the camera is inclined in a θ direction (θx, θy) by the camera shake, the imaging plane shifts to a position P2 and the subject image shifts to O'. In this case, the imaging plane is moved in parallel by dx in the X-direction and by dy in the Y-direction, such that a position of the imaging plane overlaps with the position P1. Thereby, the subject image returns to the original point O as an original position.

(Mechanical Structure of Suppression Function)

Figure 7:
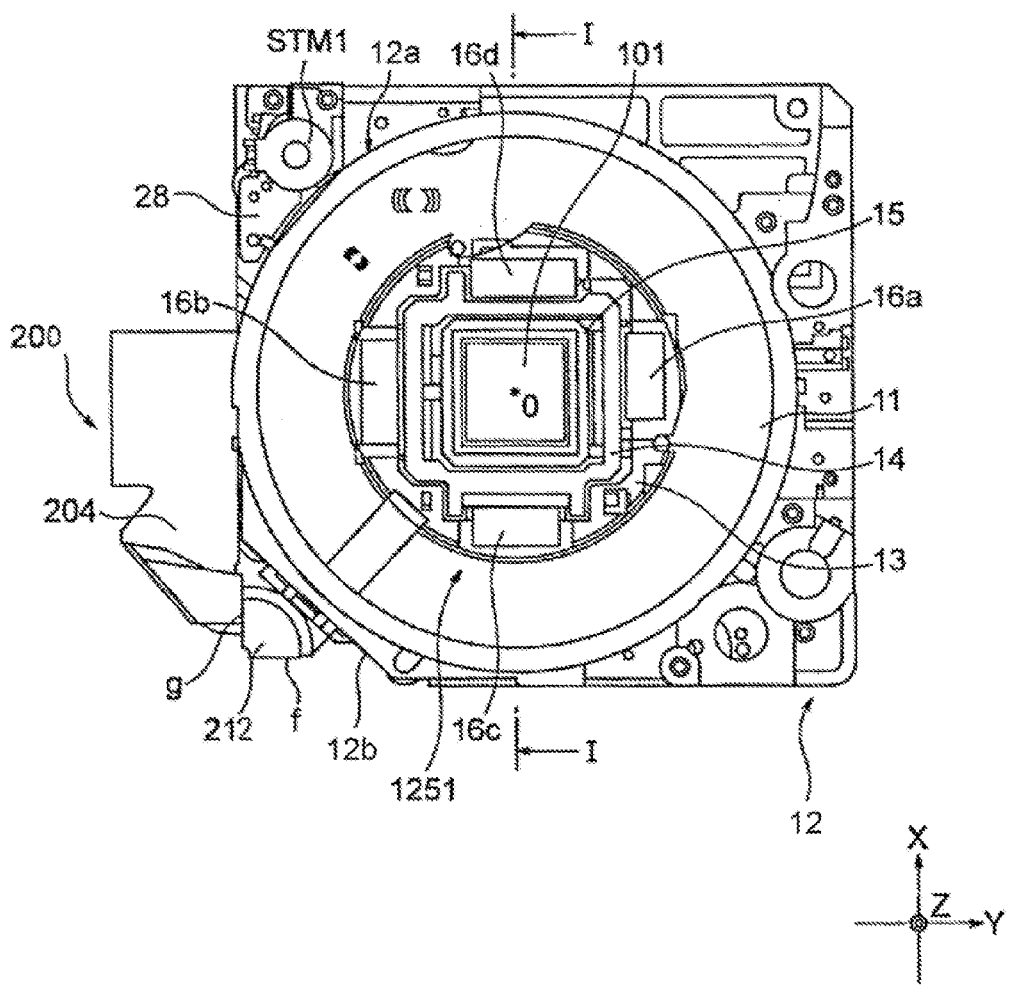
FIG. 7 is a front view of a fixation cylinder of the digital camera presented in FIG. 1.
Figure 8:
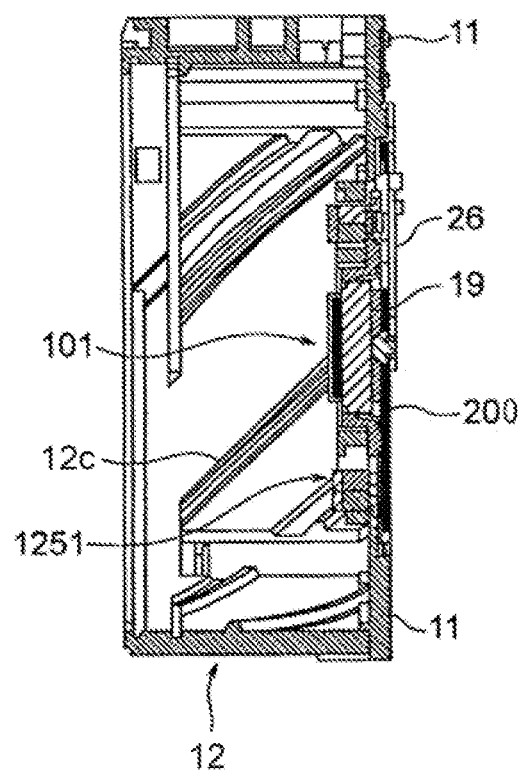
FIG. 8 is a longitudinal sectional view of the fixation cylinder illustrated in FIG. 7.

FIG. 7 illustrates a front view of the fixation cylinder 12, FIG. 8 a sectional view of the fixation cylinder 12 taken along I-I line, and FIG. 9 a back view of the fixation cylinder 12. In FIGS. 7 to 9, the fixation cylinder 12 has a box-shaped form and a storage space of the barrel unit 7 for receiving the lens barrel in an inner side of the fixation cylinder 12. The fixation cylinder 12 is provided to be fixed in the camera body and is set such that a positional relationship between the fixation cylinder 12 and a photographing optical axis is constant. The fixation cylinder 12 has a back plane provided with a base member 11 as a fixing unit formed in a plate-like and substantially rectangular shape on the whole. The fixation cylinder 12 has an inner circumference wall formed with a helicoid 12c for extending and retracting the optical system of the barrel unit 7. The fixation cylinder 12 includes at least two notched corner portions. One of the corner portions 12a is used as an installation portion of the stepping motor STM1, and the other corner portion 12b is used as a bending portion of the flexible board 200.

The CCD stage 1251 is provided on the base member 11. The CCD stage 1251 is generally configured to include an X-direction stage 13 having a circular frame shape, a Y-direction stage 14 having a rectangular shape and the mounting stage 15, as separately illustrated in FIG. 10.

The X-direction stage 13 is fastened to the base member 11. The X-direction stage 13 is provided with a pair of guide shafts 13a, 13b extending in the X-direction at an interval in the Y-direction. The X-direction stage 13 is provided with four permanent magnets 16a to 16d, each having a rectangular-solid shape. The four permanent magnets 16a to 16d form two pairs, in which one pair of the permanent magnets 16a, 16b is disposed in parallel at an interval in the Y-direction within an X-Y plane. In this embodiment, although the guide shafts 13a, 13b are configured to penetrate the permanent magnets 16a, 16b, respectively, the permanent magnets 16a, 16b and the guide shafts 13a, 13b may be mounted in parallel. One pair of the permanent magnets 16c, 16d is disposed in parallel at an interval in the X-direction within the X-Y plane.

The Y-direction stage 14 is provided with a pair of guide shafts 14a, 14b extending in the Y-direction at an interval in the X-direction. The Y-direction stage 14 is also provided with a pair of supported portions 17a, 17a', which face each other at an interval in the X-direction, and a pair of supported portions 17b, 17b', which face each other at an interval in the X-direction. Each of the two pairs of supported portions (17a, 17a'), (17b, 17b') is supported so as to be capable of sliding on the guide shafts 13a, 13b of the X-direction stage 13, respectively. Thereby, the Y-direction stage 14 is capable of sliding in the X-direction.

The CCD solid-state image sensing device 101 is fastened onto the mounting stage 15. The mounting stage 15 includes a pair of coil attachment plate portions 15a, 15b overhanging in the X-direction and a pair of coil attachment plate portions 15c, 15d overhanging in the Y-direction. The CCD solid-state image sensing device 101 is fastened to a center of the mounting stage 15. The mounting stage 15 is provided with a pair of supported portions (not shown), which faces each other at an interval in the Y-direction toward the same side as the imaging plane of the CCD solid-state image sensing device 101. The supported portions are provided with an interval in the X-direction. Each of the pairs of supported portions is supported so as to be capable of sliding on the guide shafts 14a, 14b of the Y-direction stage 14, which face each other, respectively. Thereby, the mounting stage 15 is disposed so as to be capable of sliding in the X-Y direction on the whole. Therefore, the mounting stage 15 is supported so as to be capable of sliding by the X-direction stage 13 and the Y-direction stage along the X-Y plane, which serve as guide stages. The X-direction stage is provided on the base member 11 of the fixation cylinder 12 to be fixed with respect to the photographing optical axis in the body case.

A protection plate 19 is attached to a back plane opposite to the imaging plane of the CCD solid-state image sensing device 101. Provided on a center of the protection plate 19 is a concave portion formed in a tapered shape. The function of the concave portion 19a will be described later.

The pair of coil attachment plate portions 15a, 15b are provided with flat and scroll-like coil members COL1, COL1', respectively, which are serially connected. The pair of coil attachment plate portions 15c, 15d are provided with flat and scroll-like coil members COL2, COL2', respectively, which are serially connected.

The coil members COL1, COL1' are disposed to face the permanent magnets 16c, 16d, respectively. The coil members COL2, COL2' are also disposed to face the permanent magnets 16a, 16b, respectively. The pair of coil members COL1, COL1' is used to move the CCD solid-state image sensing device 101 in the X-direction, and the pair of coil members COL2, COL2' is used to move the CCD solid-state image sensing device 101 in the Y-direction. Therefore, in this embodiment, the pair of coil members COL1, COL1' serves as a first coil, the permanent magnets 16c, 16d as a first permanent magnet, the pair of coil members COL2, COL2' as a second coil, and the permanent magnets 16a, 16b as a second permanent magnet.

Figure 10:
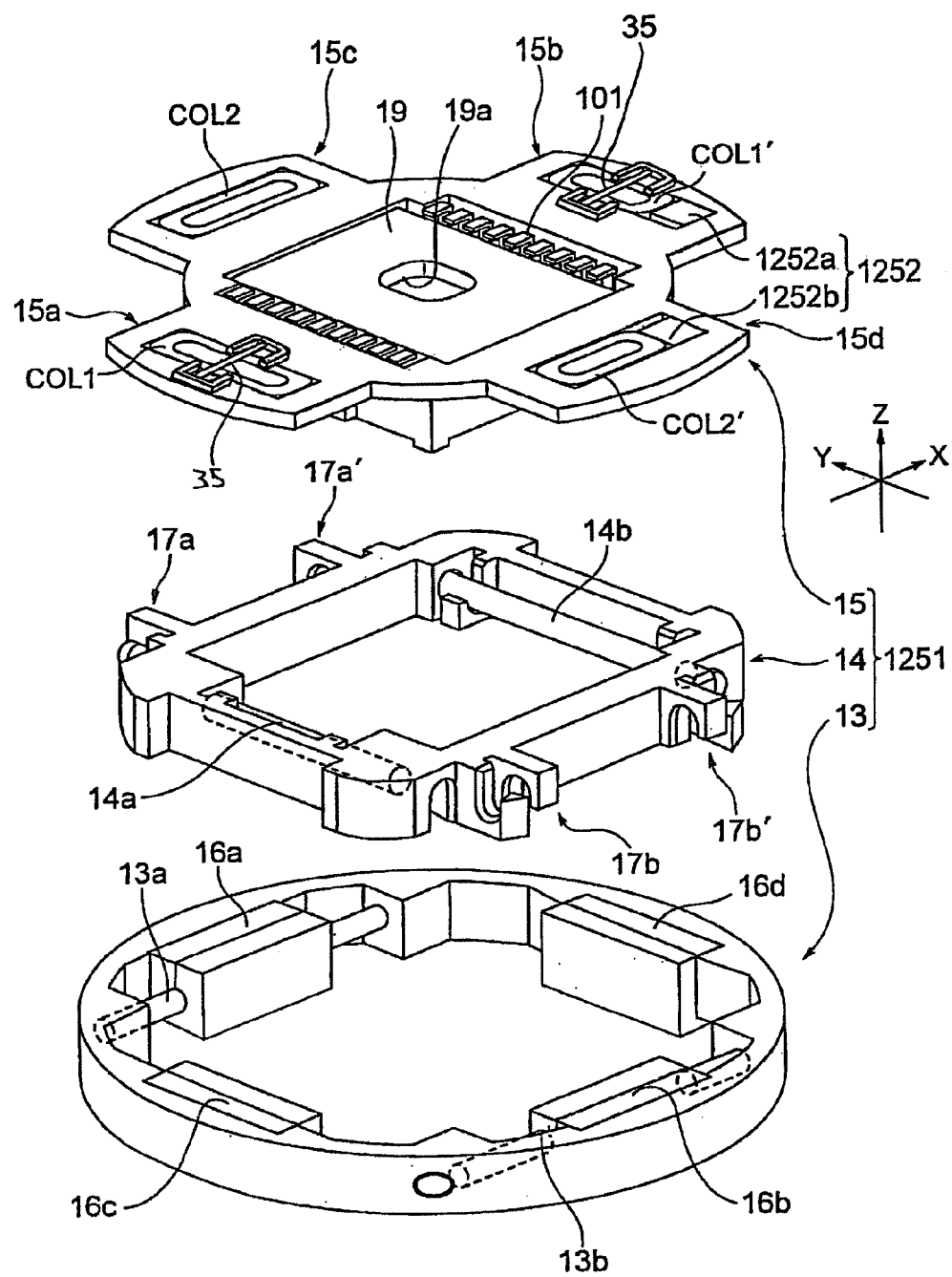
FIG. 10 depicts an exploded perspective view of a mounting stage according to the digital camera presented in FIG. 1.

Each of the coil members COL1, COL1' is provided with an adsorption bar 35 including a magnetic material in a direction so as to intersect each of the coil members COL1, COL1' in the X-direction, as shown in FIG. 10. Therefore, the adsorption bars 35 are configured to face each other via the CCD solid-state image sensing device 101 in the X-direction. The adsorption bars 35 face the permanent magnets 16c, 16d, in the Z-direction, respectively, which face the coil members COL1, COL1'. In this embodiment, each adsorption bar 35 is provided so as to cross over substantially a center of each of the coil members COL1, COL1'.

In this case, Hall elements 1252a, 1252b are used for the position detection element 1252. The coil attachment plate portion 15b is provided with the Hall element 1252a as the position detection element 1252. Similarly, the coil attachment plate portion 15d is provided with the Hall element 1252b.

The CCD solid-state image sensing device 101 is electrically connected to the F/E IC 102 via the flexible board 200 (see FIG. 4). The Hall elements 1252a, 1252b are electrically connected to the operational amplifier 1253 (see FIG. 4) via the flexible board 200, and each of the coil members COL1, COL1', COL2, COL2' is electrically connected to the coil driver 1254 (see FIG. 4).

Figure 11:
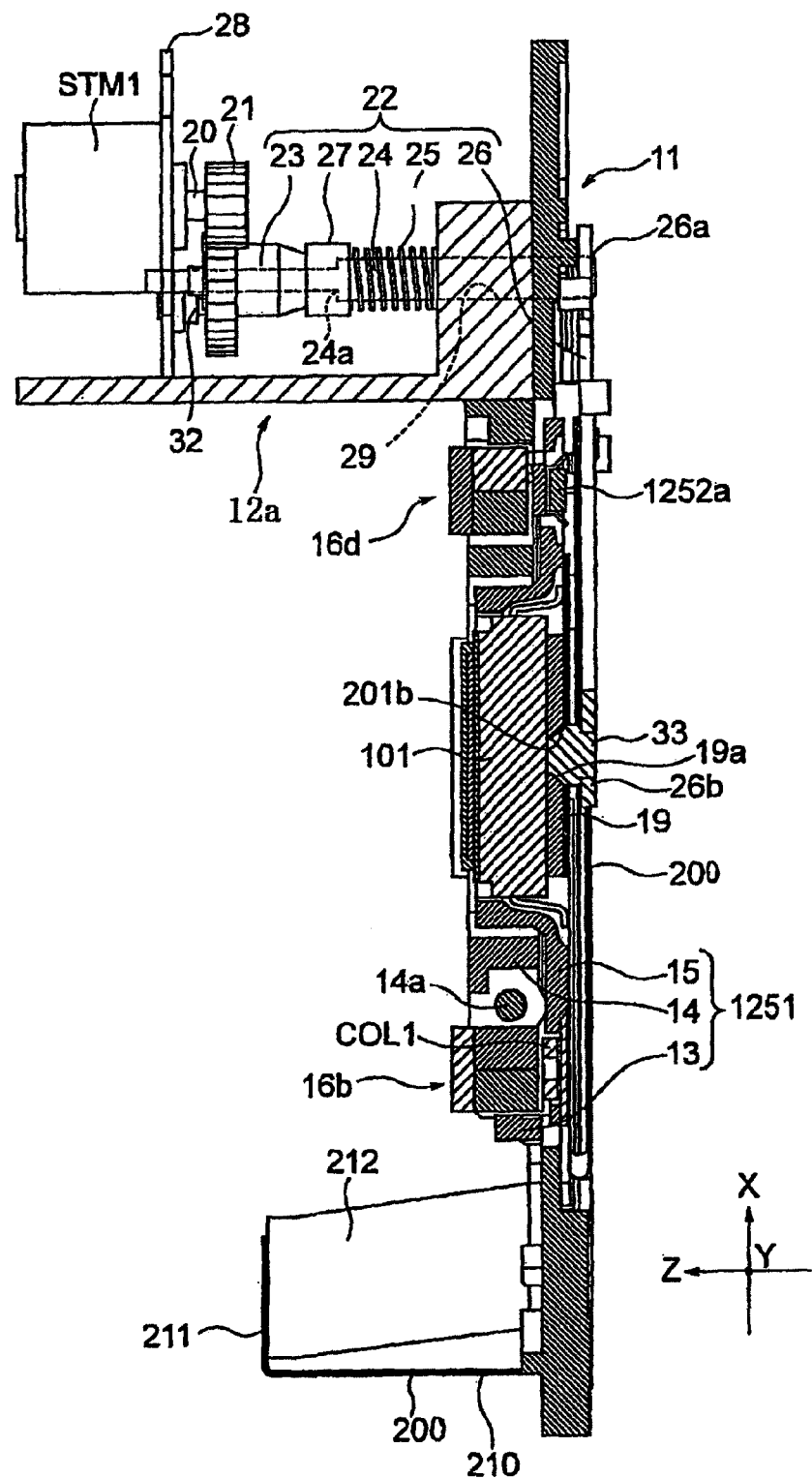
FIG. 11 depicts a partly enlarged sectional view along a II-II line in FIG. 9B.
Figure 12B:
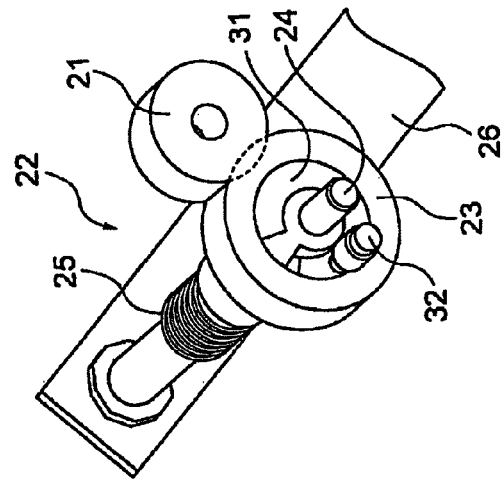
FIG. 12B is a partly enlarged perspective view illustrating a conversion mechanism.
Figure 12A:
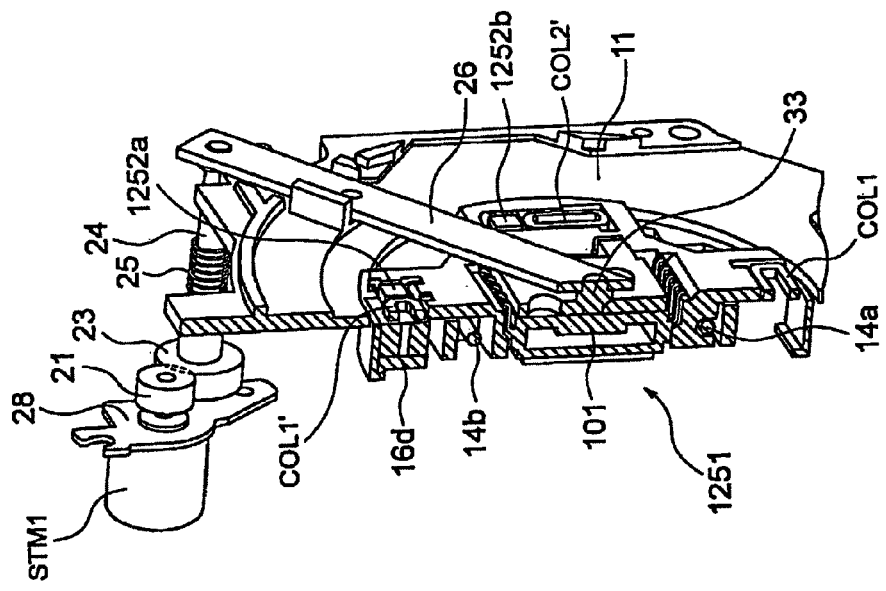
FIG. 12A is an explanatory view illustrating a major portion of an original point forced retention mechanism according to the digital camera presented in FIG. 1, and is a perspective view illustrating a connection relationship among a CCD stage, a stepping motor and a conversion mechanism.

As illustrated in the enlarged views of FIGS. 11 and 12, the original point forced retention mechanism 1263 includes the stepping motor STM1. The mechanical structure of the original point forced retention mechanism 1263 will be described in detail, and a control of driving of the stepping motor STM1 will be described.

As illustrated in FIGS. 7 and 11, the stepping motor STM1 is provided on the corner portion 12a of the fixation cylinder 12. The stepping motor STM1 has an output shaft 20 provided with an output gear 21. The corner portion 12a of the fixation cylinder 12 is provided with a conversion mechanism 22, which converts rotational movements to linear movements.

The conversion mechanism 22 includes generally a rotation transferring gear 23, a reciprocating shaft 24, a coil biasing spring 25, a forced retainer plate 26, and a spring supporting member 27. The corner portion 12a of the fixation cylinder 12 is formed with a pair of supporting portions 28, 29 at an interval in the Z-axis direction. The supporting portion 28 includes a motor attachment plate. The reciprocating shaft 24 is supported between the supporting portion 29 and the motor attachment plate 28. The rotation transferring gear 23 is located between the pair of supporting portions 28 and 29 to be rotatably supported on the reciprocating shaft 24 and is engaged with the output gear 21.

The reciprocating shaft 24 has a portion of one end side, which penetrates the supporting portion 29 to reach the back plane side of the base member 11. The coil biasing spring 25 is provided between the spring supporting portion 27 and the supporting portion 29. The reciprocating shaft 24 is biased toward the supporting portion 28 by the coil biasing spring 25. The reciprocating shaft 24 includes a step portion 24a, which engages with a shaft hole at an end plane of the rotation transferring gear 23.

As shown in FIGS. 13A to 13E, the rotation transferring gear 23 has an end plane portion provided with a cam groove 31, which extends in a circumference direction of the rotation transferring gear 23, and includes a flat valley portion 31a, a flat top portion 31b, and an inclined surface portion 31c inclining continuously from the flat valley portion 31a toward the flat top portion 31b. A cliff 31d is formed between the flat valley portion 31a and the flat top portion 31b as a contact wall with which an after-mentioned cam pin 32 has contact from the rotation direction.

The cam pin 32 is fastened to the supporting portion 28, and has a leading end, which slides in contact with the cam groove 31. The length of the flat valley portion 31a in a rotational direction from the cliff 31d to an incline start position 31e of the inclined surface portion 31c corresponds to 2 pulses as converted to a rotation control signal of the stepping motor STM1.

The length of the inclined surface portion 31c in a rotational direction from the incline start position 31e to an incline end position 31f leading to the flat top portion 31b corresponds to 30 pulses as converted to the rotation control signal of the stepping motor STM1.

The length of the peak flat portion 31b in a rotation direction between the incline end position 31f and the cliff 31d corresponds to 3 pulses as converted to the rotation control signal of the stepping motor STM1. 35 pulses in the stepping motor STM1 corresponds to one rotation of the rotation transferring gear 23 to cause the reciprocating shaft 24 to be reciprocated once in the Z-axis direction.

Figure 9A:
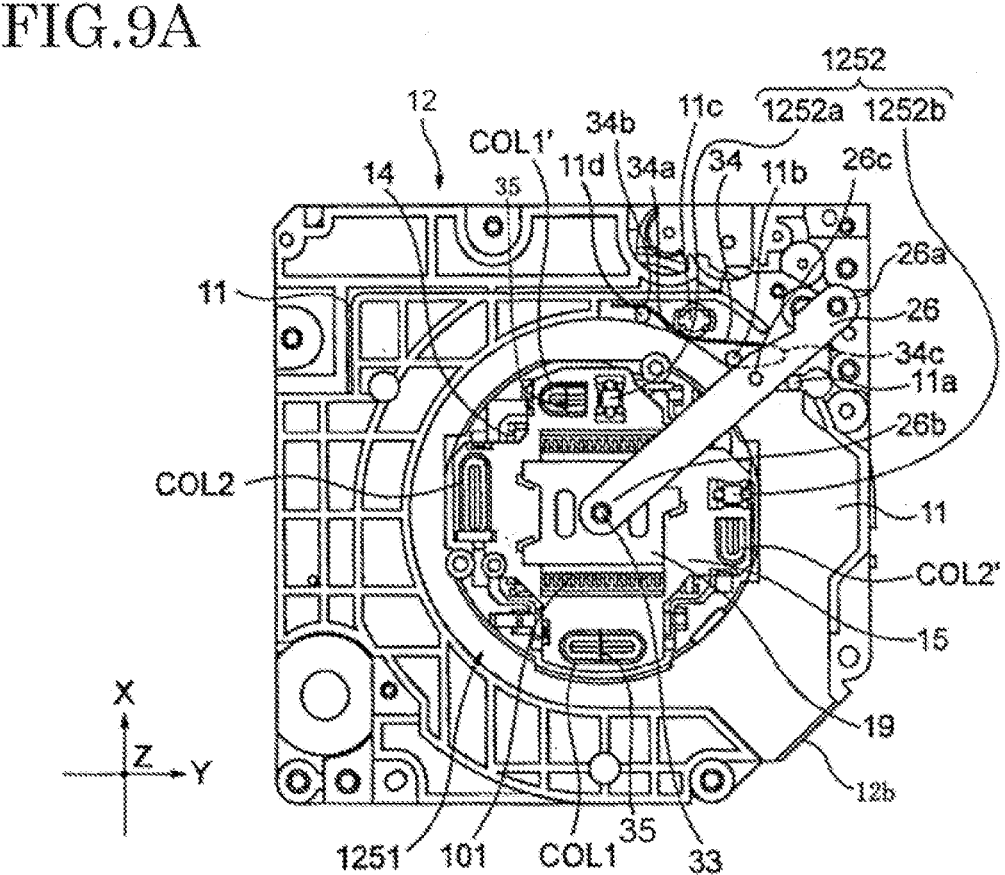
FIG. 9A is a back view of the fixation cylinder illustrated in FIG. 7, presenting a state where a flexible board is not attached.
Figure 9B:
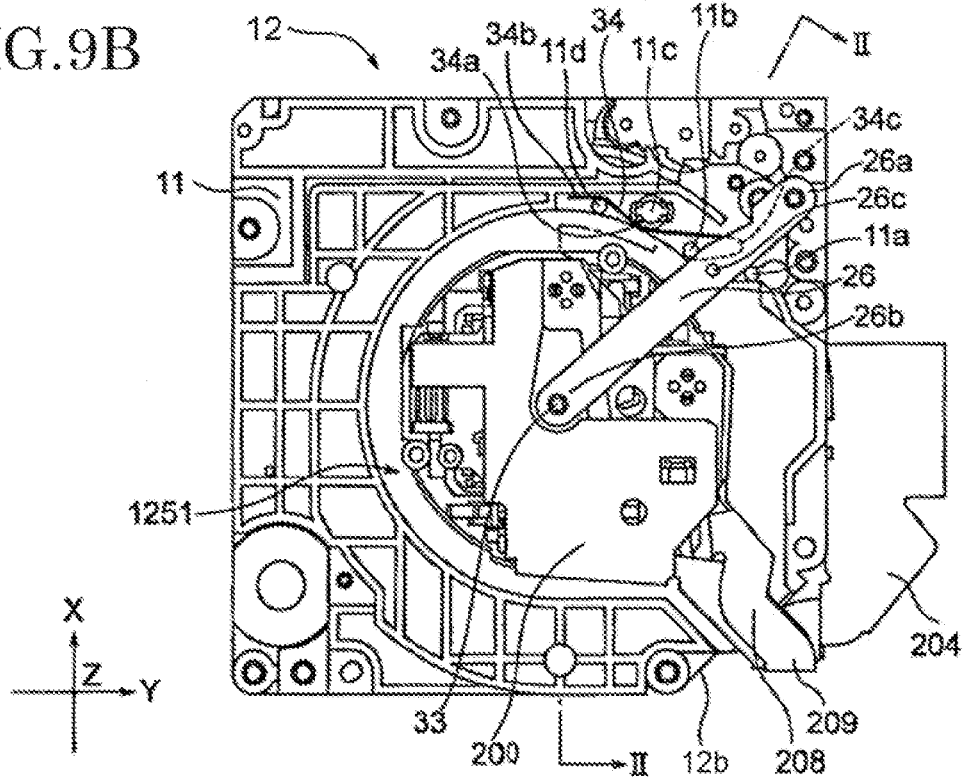
FIG. 9B is a back view of the fixation cylinder illustrated in FIG. 7, presenting a state where the flexible board is attached.

The base member 11 has a back plane side provided with the forced retainer plate 26, which extends to be elongated toward the center of CCD solid-state image sensing device 101 as shown in FIGS. 9A, 9B. The forced retainer plate 26 has an end portion 26a fastened to one end portion of the reciprocating shaft 24. The forced retainer plate 26 also has a free end portion 26b to which a taper shaped compressing pin 33 is fastened. A guide shaft 26c is formed to project in a middle of the forced retainer plate 26 in an extending direction of the forced retainer plate 26.

The base member 11 is provided with position determination projections 11a, 11b, a coil attachment projection 11c and an engagement projection 11d (see FIGS. 9A, 9B). The coil attachment projection 11c is provided with a wound portion 34a of a torsion spring 34. The torsion spring 34 has one end portion 34b engaged with the engagement projection 11d and the other end portion 34c engaged with the guide shaft 26c. The base member 11 is formed with a guide hole (not shown), which guides the guide shaft 26c provided on the forced retainer plate 26.

The forced retainer plate 26 has contact with the position determination projection 11a by the torsion spring 34 while reciprocating in a direction leaving or approaching (the Z-axis direction) with respect to the base member 11 according to a reciprocation of the reciprocating shaft 24. The guide shaft 26c functions to stabilize the reciprocation of the forced retainer plate 26.

Figure 14A:
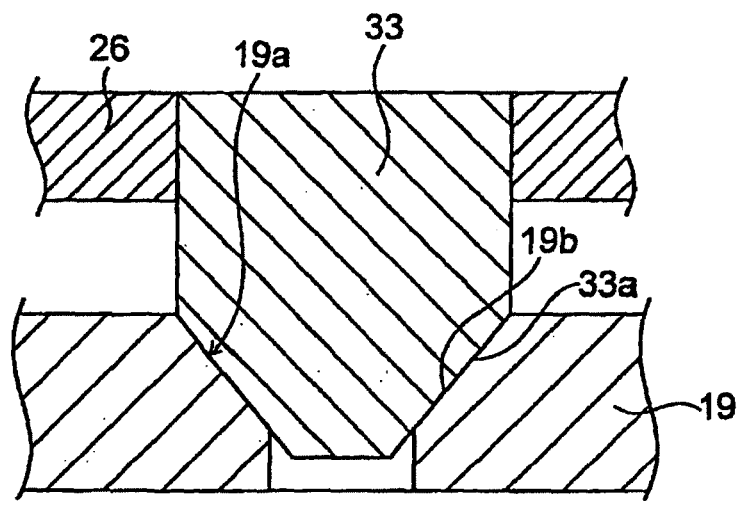
FIG. 14A is an explanatory view explaining a state where a retainer pin presented in FIG. 12A is fitted to a concave peripheral wall, illustrating a partly enlarged cross-sectional view presenting a state where the retainer pin is closely fitted to a circumference wall of the concave peripheral wall.
Figure 14B:
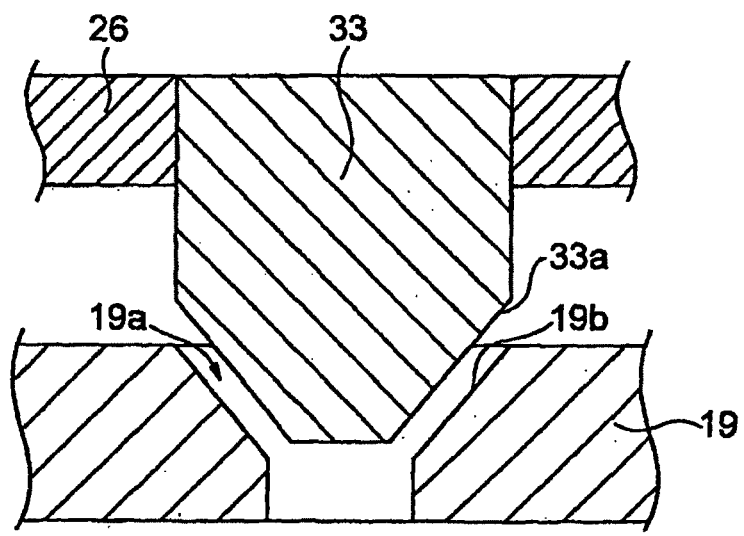
FIG. 14B is an explanation view for explaining a state where a retainer pin presented in FIG. 12A is fitted to a concave portion, illustrating a partly enlarged cross sectional view presenting a state where the retainer pin is separated from the circumference wall of the concave portion.

The compressing pin (fitting projection) 33 engages with the concave portion (fitting hole) 19a so as to fulfill the function for mechanically retaining the mounting stage 15 on the position of the original point. As illustrated in the enlarged view of FIG. 14A, a state in which a peripheral wall 33a of the compressing pin 33 is closely fitted to a peripheral wall 19b of the protection plate 19 corresponds to a holding standby position of the cam pin 32. As illustrated in the enlarged view of FIG. 14B, a state in which the peripheral wall 33a of the compressing pin 33 is separated from a peripheral wall 19b of the protection plate 19 at the maximum intervals corresponds to a release standby position of the cam pin 32. The holding standby state of the cam pin 32 is a position of the forced original point of the mounting stage 15.

(Folding of Flexible Board)

The flexible board 200 according to this embodiment of the present invention will be explained below.

Figure 15:
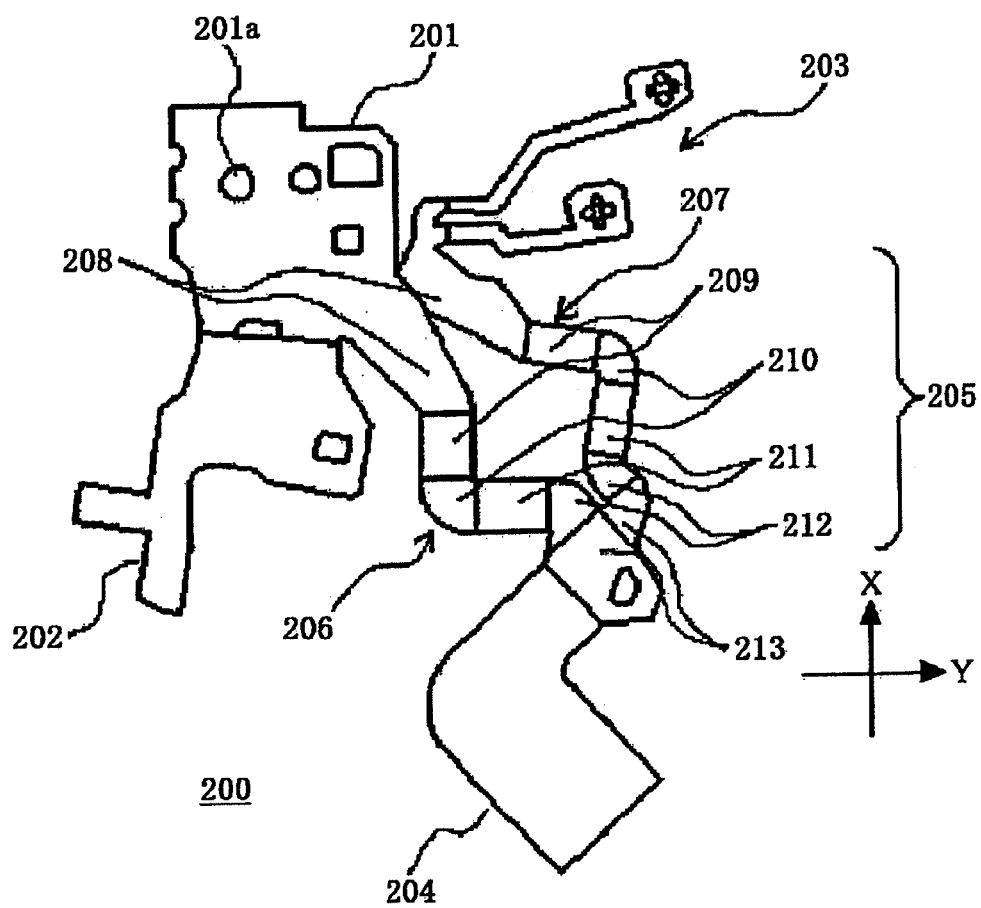
FIG. 15 is a view illustrating a flexible board before being folded according to the digital camera presented in FIG. 1.
Figure 16:
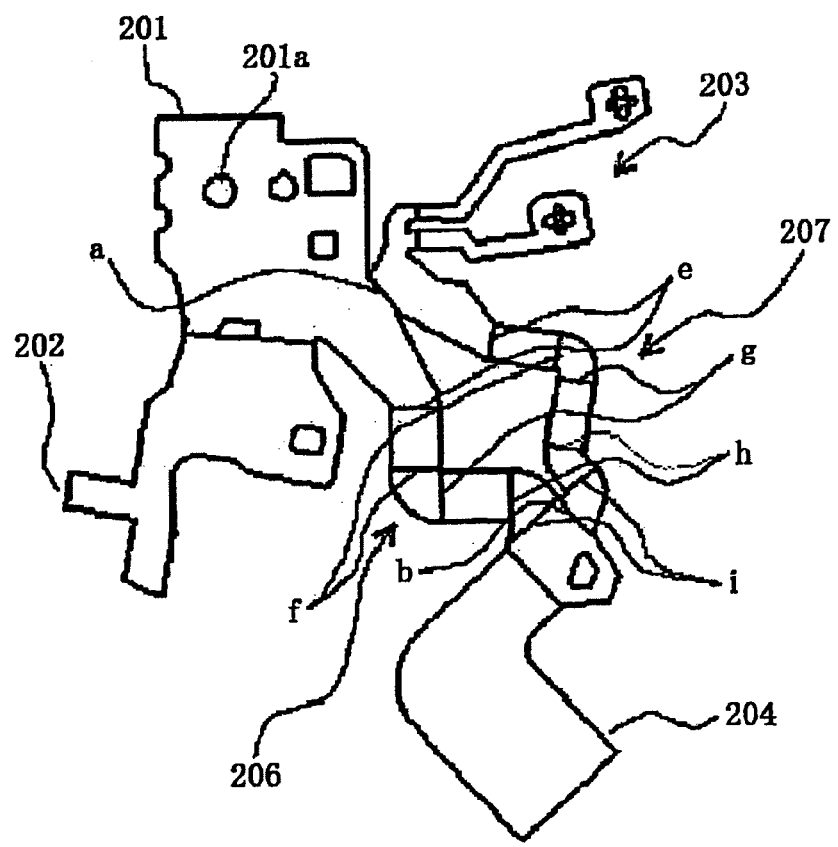
FIG. 16 is a view explaining how to fold the flexible board presented in FIG. 15.
Figure 17:
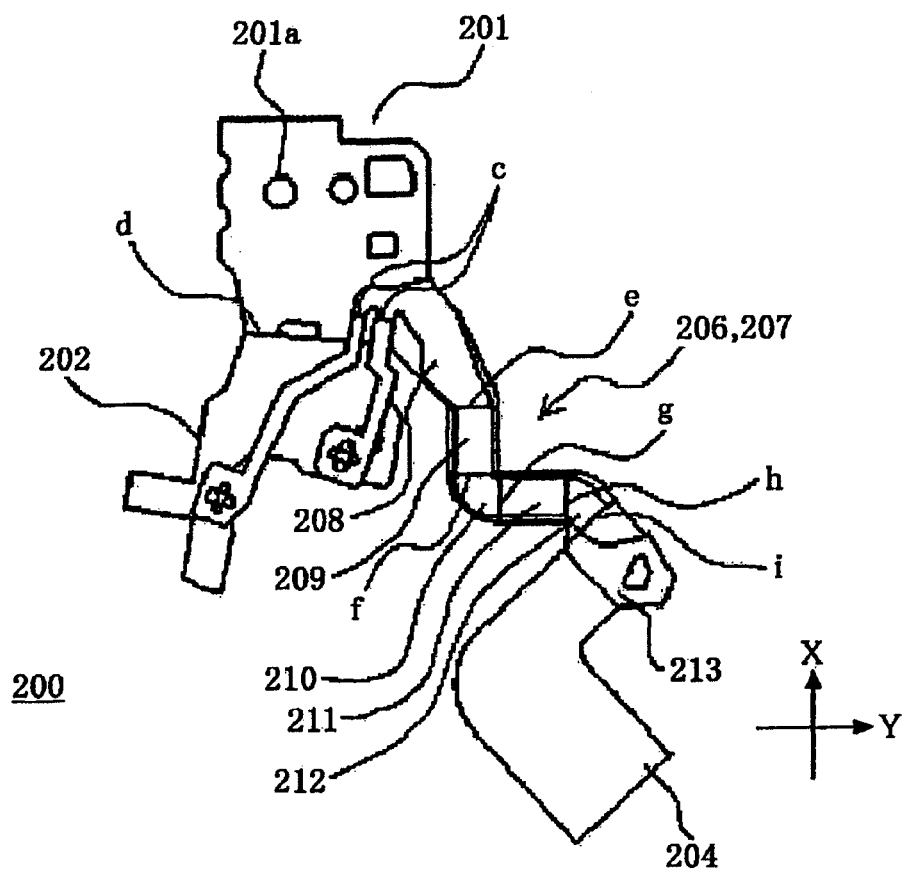
FIG. 17 is a view explaining a state where an extension connection portion of the flexible board presented in FIG. 15 is overlapped and folded.

As illustrated in FIGS. 15 to 17, the flexible board 200 includes a CCD connection portion 201, a coil connection portion 202, a position detection element connection portion 203, a processing circuit connection portion 204, and an extension connection portion 205. FIG. 15 is a development view of the flexible board 200 viewed from a backside of the CCD connection portion 201 and FIG. 16 is a view for explaining folding of the flexible board 200 shown in FIG. 15.

The CCD connection portion 201 also includes a connection pattern portion corresponding to a connection pin of the CCD solid-state image sensing device 101, a through-hole 201a corresponding to the concave portion 19a of the protection plate 19, and the like (not shown). Moreover, the coil connection portion 202 is provided with a connection pattern portion (not shown), which is electrically connectable to each of the coil members COL1, COL1', COL2, COL2' (hereinafter, referred to as "each of the coil members COL"). Furthermore, the position detection element connection portion 203 is provided with a connection pattern portion, which is electrically connectable to the position detection element 1252. The processing circuit connection portion 204 includes a connection pattern portion, which is electrically connected to the F/E-IC 102, the operational amplifier 1253, and the coil driver 1254. Thereby, the processing device of the digital camera is electrically connected to the CCD connection portion 201, the coil connection portion 202 and the position detection element connection portion 203 through the extension connection portion 205.

In this embodiment, as shown in FIGS. 15 and 16, the extension connection portion 205 is configured to branch into a first extension connection portion 206 and a second extension connection portion 207. The second extension connection portion 207 is configured to overlap with the first extension connection portion 206 when the extension connection portion 205 is folded along straight lines a, b shown in FIG. 16. The second extension connection portion 207 has the same structure as that of the first extension connection portion 206 if the upper side and the under side of the second extension connection portion 207 are reversed; thus, the detailed explanations will be omitted.

The first extension connection portion 206 includes a first extension portion 208, a second extension portion 209, a third extension portion 210, a fourth extension portion 211, a fifth extension portion 212, and a sixth extension portion 213, in order from a side of the CCD connection portion 201. The first extension portion 208 extends from the CCD connection portion 201, which is disposed in the back plane of CCD solid-state image sensing device 101, in a direction inclined at about 45 degrees with respect to the Y-axis direction and the X-axis direction (a direction toward the corner portion 12b).

The second extension portion 209 extends linearly along the X-axis direction with an angle inclined at about 45 degrees with respect to the first extension portion 208.

The third extension portion 210 has a fan shape as a whole, and an apex angle of about 90 degrees, and links the second extension portion 209 and the fourth extension portion 211 without changing their width dimension.

The fourth extension portion 211 is configured to have a same length as that of the second extension portion 209, and extends along a direction orthogonal to the second extension portion 209, that is to say, the Y-axis direction.

The fifth extension portion 212 has a fan shape as a whole, and an apex angle of about 45 degrees, and links the fourth extension portion 211 and the sixth extension portion 213 without changing their width dimension.

The sixth extension portion 213 is connected to the processing circuit connection portion 204.

(Attachment of Flexible Board)

Next, the attachment of the flexible board 200 will be explained.

The flexible board 200 is mounted on the CCD stage 1251 from a side of the protection plate 19 such that the connection pattern portion of the CCD connection portion 201 is disposed to correspond to the connection pin of the CCD solid-state image sensing device 101 and the through-hole 201a is disposed to correspond to the concave portion 19a (FIG. 10).

The flexible board 200 is folded at 180 degrees as a valley fold with straight lines a, b shown in FIG. 16 so that the second extension connection portion 207 is folded and then overlaps with the first extension connection portion 206 as shown in FIG. 17.

The flexible board 200 is folded at 180 degrees as a valley fold with a straight line c shown in FIG. 17 so that the position detection element connection portion 203 overlaps with the CCD connection portion 201 to connect electrically the position detection element connection portion 203 to the position detection element 1252.

The flexible board 200 is folded at 180 degrees as a valley fold with a straight line d shown in FIG. 17 so that the coil connection portion 202 overlaps with the CCD connection portion 201 to connect electrically the coil connection portion 202 to each of the coil members COL. As mentioned above, the flexible board 200 is mounted on the CCD stage 1251 to be positioned in the X-Y plane on the base member 11.

Next, as illustrated in FIGS. 9B, 11, 18, and 19, the flexible board 200 is folded substantially at a right angle as a mountain fold along a straight line e shown in FIG. 17 so that the second extension portion 209 extends along the Y-Z plane at the corner portion 12b of the fixation cylinder 12.

Moreover, the flexible board 200 is folded substantially at a right angle as a mountain fold along a straight line f shown in FIG. 17, so that the third extension portion 210 extends in the X-Y plane where the third extension portion 210 is displaced along the Z axis from the base member 11 toward the lens barrel side and extends to be closer to the fixation cylinder 12 side than the second extension portion 209.

Next, the flexible board 200 is folded substantially at a right angle as a valley fold along a straight line g shown in FIG. 17 so that the fourth extension portion 211 extends along the X-Z plane near the corner portion 12b of the fixation cylinder 12.

Furthermore, the flexible board 200 is folded substantially at a right angle as a valley fold along a straight line h shown in FIG. 17, so that the fifth extension portion 212 extends in the X-Y plane where the fifth extension portion 212 is displaced along the Z axis from the base member 11 toward the lens barrel side, and extends to be closer to the fixation cylinder 12 side than the fourth extension portion 211.

The flexible board 200 is folded substantially at a right angle as a valley fold along a straight line i shown in FIG. 17, so that the sixth extension portion 213 extends to be adjacent to the corner portion 12b of the fixation cylinder 12 and in parallel substantially to the corner portion 12b.

The processing circuit connection portion 204 is curved from the sixth extension portion 213 folded along the line i to be along a circumference surface of the fixation cylinder 12 and forms a plane which is substantially parallel to the X-Z plane. An end portion of the processing circuit connection portion 204 is curved in a direction to deviate from the central portion of the base member 11 in the substantially same plane as the base member 11 and forms the same plane as that of the base member 11. The end portion of the processing circuit connection portion 204 is electrically connected to a printed circuit board PCB (described later) on which the F/EIC 102, the operational amplifier 1253, the coil driver 1254, and the like are disposed.

The above-mentioned positioning unit will be explained.

(Flexible Board Positioning Member)

Figure 20:
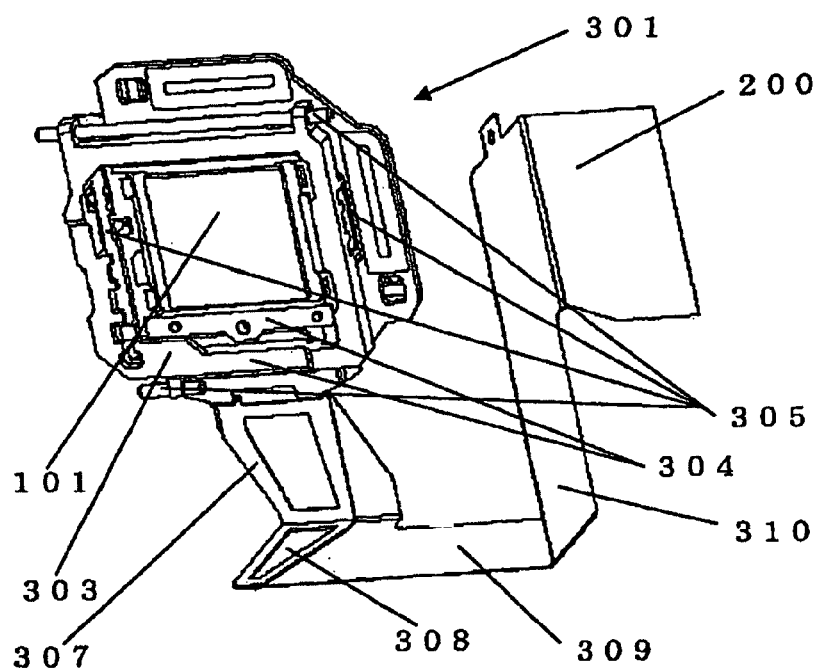
FIG. 20 is a schematic view illustrating a configuration of a flexible board positioning member of the imaging apparatus according to an embodiment of the present invention.

FIG. 20 is a schematic view showing a flexible board positioning member 307 used as the positioning unit according to an embodiment of the present invention.

Figure 18:
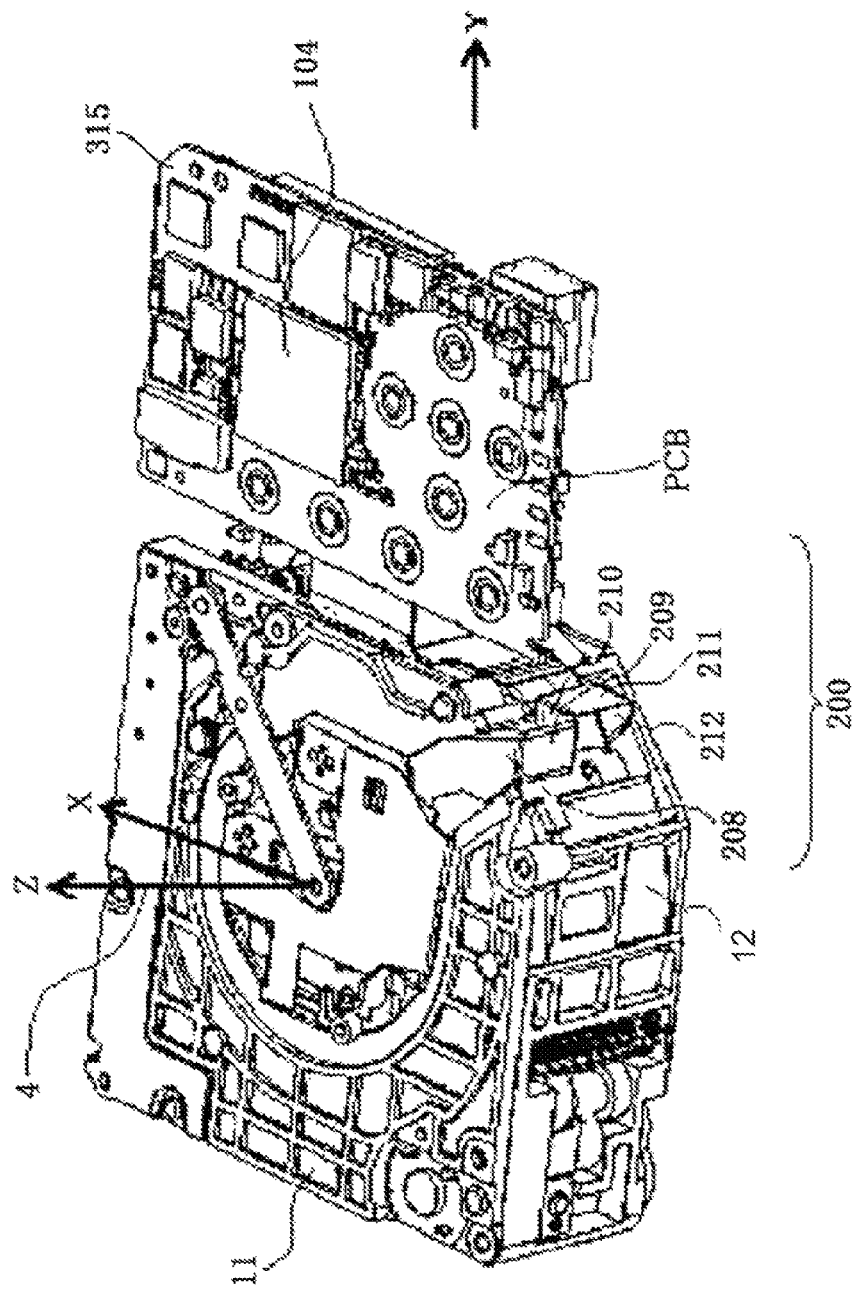
FIG. 18 is a perspective view presenting a location relationship among a fixation cylinder portion, the flexible board and a processing device.
Figure 19:
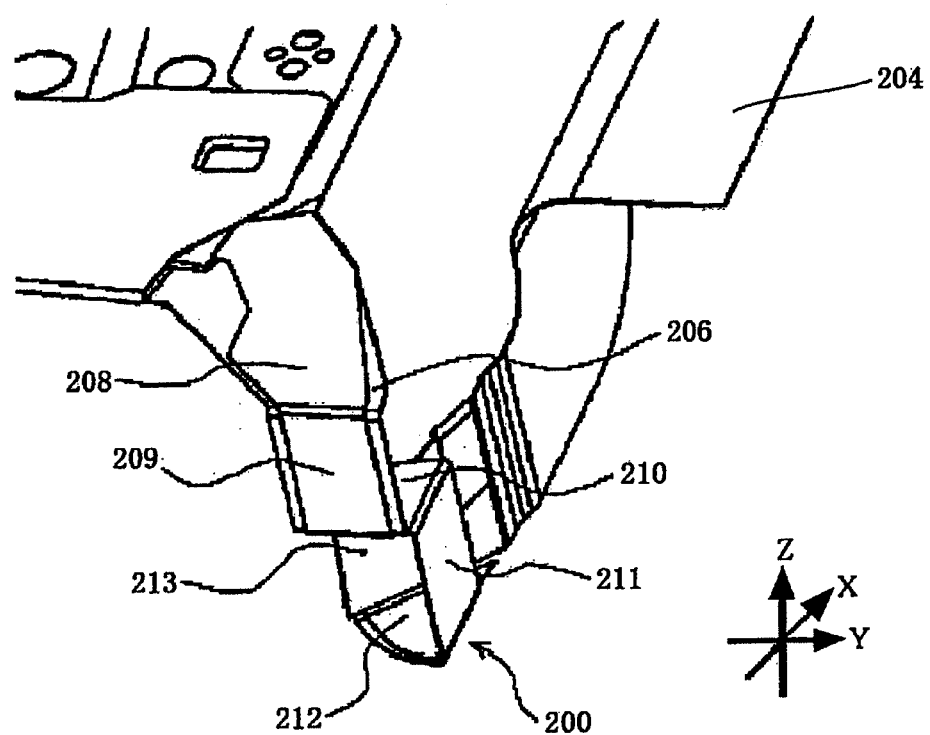
FIG. 19 is a perspective view illustrating an enlarged folded portion presented in FIG. 18.

An imaging apparatus 301 includes a movable unit 303 configured to move the image pickup device 101. The movable unit 303 includes two frames 304 corresponding to the above-mentioned X- and Y-direction stages 13, 14, respectively, and four shafts 305 corresponding to the above-mentioned guide shafts 13a, 13b, 14a, 14b, respectively. The image pickup device 101 is connected to a processing device 315 (not shown) through the flexible board 200 so that electrical signals from the image pickup device 101 are transmitted to the processing device 315. The flexible board 200 includes a bending portion 308, a first flexible portion 309, a second flexible portion 310, and is positioned by a flexible board positioning member 307. The folded configuration of the flexible board 200 shown in each of FIGS. 18 and 19 is simplified in FIG. 20.

The flexible board positioning member 307 may be made of known materials such as plastic resins, ceramics, metals, and the like. As the metals, SUS materials, spring materials, and the like are preferably used because of the durability and the corrosion resistance of these materials. The flexible board positioning member 307 preferably has a thin plate-like shape.

In this embodiment, a thin steel-plate made of SUS material is used as the flexible board positioning member 307.

Figure 21:
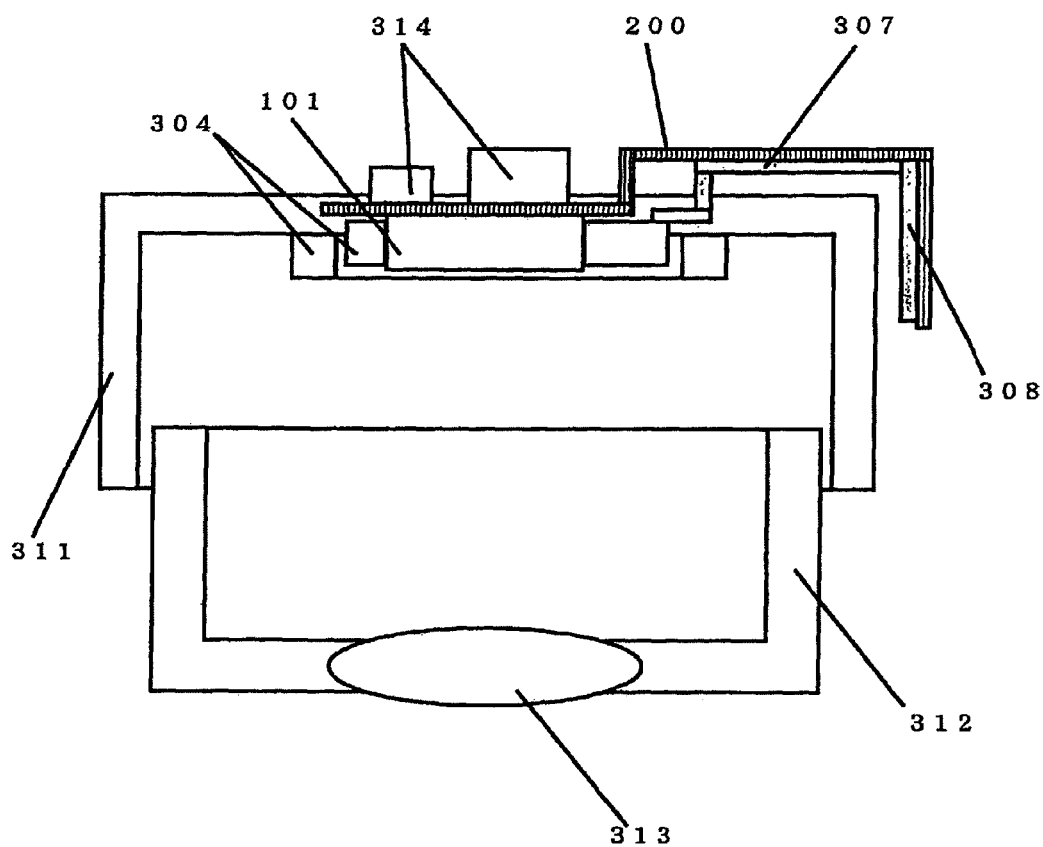
FIG. 21 is a schematic sectional view illustrating the imaging apparatus according to an embodiment of the present invention in a photographing state.

FIG. 21 is a sectional view showing the imaging apparatus according to the embodiment of the present invention in a photographing state. In the photographing state, a movable frame 312 (corresponding to the lens barrel of the barrel unit 7), having a photographing lens 313 (corresponding to the zoom lens 71a), is rendered far from a fixing frame 311 (corresponding to the fixation cylinder 12), having the image pickup device 101, electronic parts 314, and the like.

Figure 22:
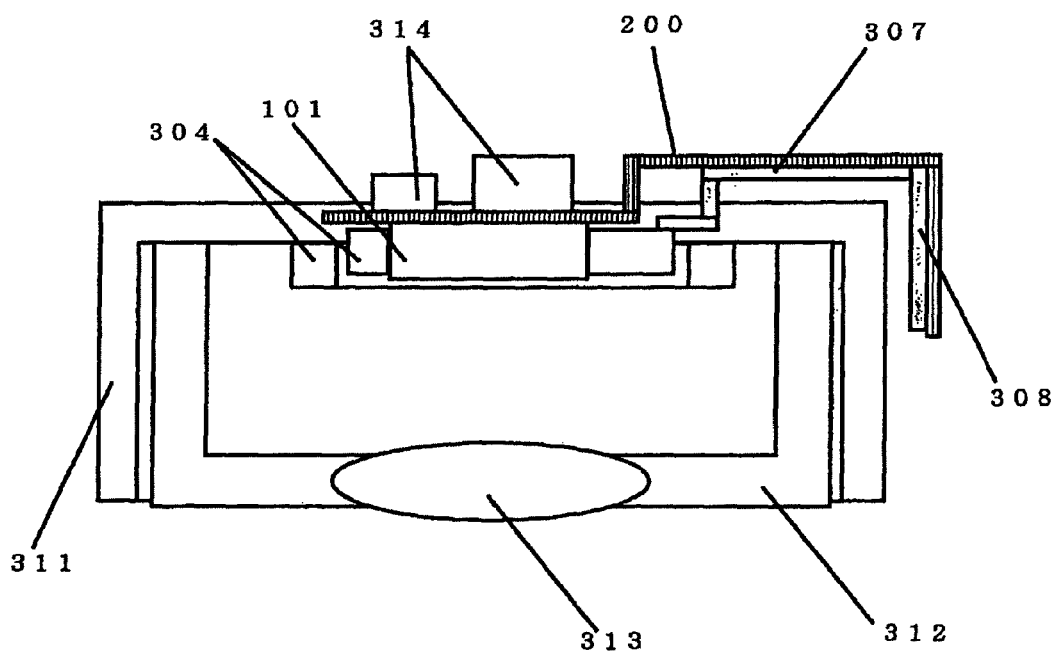
FIG. 22 is a schematic sectional view illustrating the imaging apparatus according to an embodiment of the present invention in a state where a lens barrel is housed.

FIG. 22 is a sectional view showing the imaging apparatus according to the embodiment of the present invention in a state where the movable frame 312 having the photographing lens 313 is housed in the fixing frame 311 having the image pickup device 101, the electronic parts 314, and the like.

Figure 23:
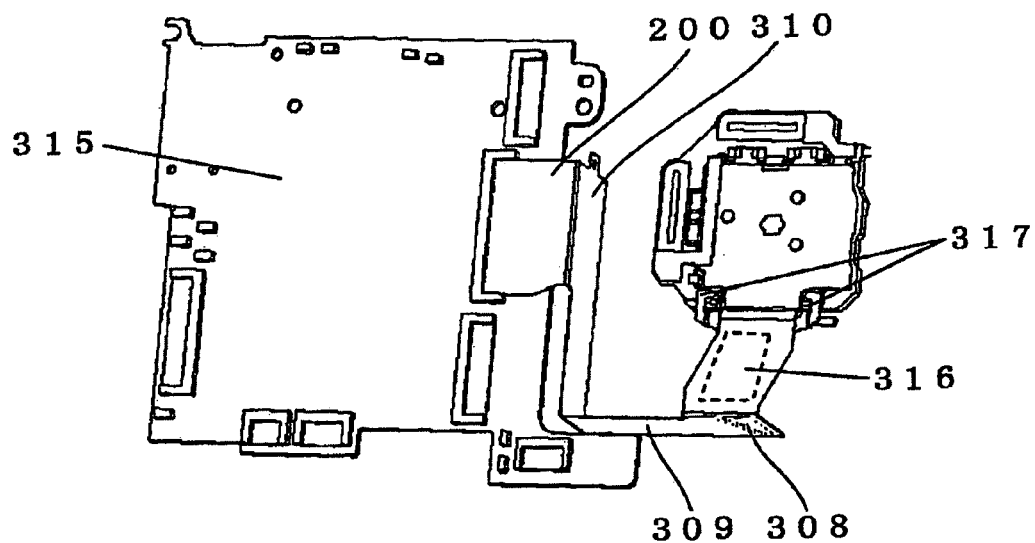
FIG. 23 is a schematic view illustrating the configuration of the imaging apparatus according to an embodiment of the present invention, viewed from a backside of FIG. 20.

FIG. 23 is a schematic view showing configurations of imaging apparatus according to the embodiment of the present invention, viewed from a back side of the flexible board illustrated in FIG. 20.

The image pickup device 101 (see FIG. 20) is connected to the processing device 315, which processes signals from the image pickup device 101 through the flexible board 200. The flexible board positioning member 307 is fixed to the flexible board 200 by means of a double faced tape 316. The flexible board positioning member 307 is connected to the movable unit 303 via a connection portion 317.

Figure 24:
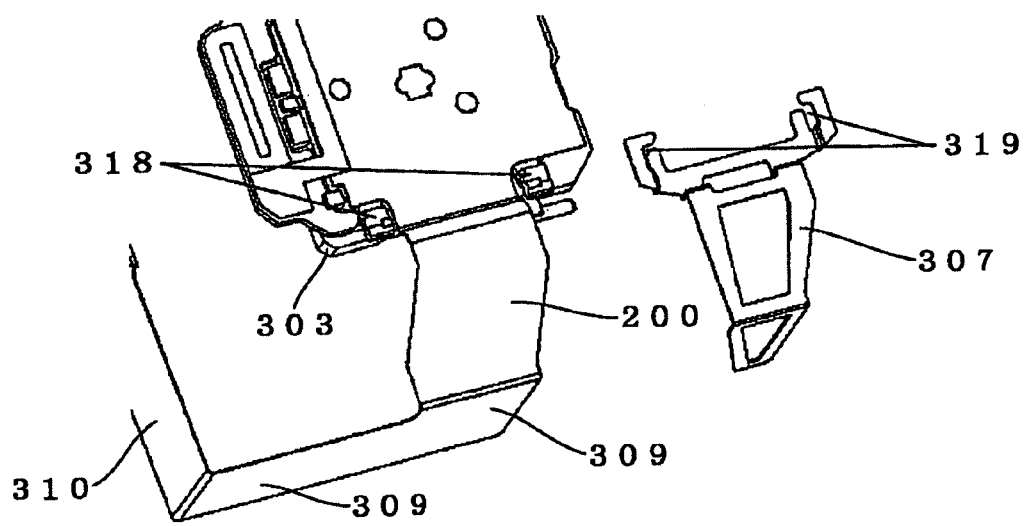
FIG. 24 is a schematic view illustrating a connection portion shown in FIG. 23 in a state before a flexible board positioning member is connected.

FIG. 24 is an enlarged view illustrating the connection portion 317 shown in FIG. 23, the connection portion 317 being in a state before the flexible board positioning member 307 is connected to the movable unit 303.

A convex portion 318 and a concave portion 319 are provided on the movable unit 303 and the flexible board positioning member 307, respectively.

FIG. 25 is an enlarged X-Y plan view, illustrating the connection portion 317 shown in FIG. 23, the connection portion 317 being in a state where the flexible board positioning member 307 is connected to the movable unit 303.

The convex portion 318 is connected to the concave portion 319 of the flexible board positioning member 307 with margins 320 so that the flexible board positioning member 307 is capable of being adjusted to be positioned in the X and Y directions.

Here, it is possible for the convex portion and the concave portion to be provided on the flexible board positioning member 307 and the movable unit 303, respectively.

FIG. 26 is a schematic sectional view viewed from the X-direction, illustrating a configuration of the connection portion 317 in a state where the flexible board positioning member 307 is connected to the movable unit 303.

The convex portion 318 of the movable unit 303 has a cylindrical portion 321 formed in a circular arc form. The movable unit 303 is connected to the flexible board positioning member 307 in a state where the flexible board positioning member 307 is disposed on the cylindrical portion 321, so that the flexible board positioning member 307 has line-contact with the cylindrical portion 321. The flexible board positioning member 307 is supported rotatably in a rotational direction about an axis of the X-direction by the convex portion 318 within regions 322.

In other words, the flexible board positioning member 307 is disposed movably in the X-Y directions and Y-Z directions with respect to the movable unit 303. Accordingly, due to the above-mentioned configurations, if variations of a position to which the flexible board 200 is fixed, or of a form of the flexible board 200 occur, the variations can be suppressed. That is to say, a flex of the flexible board 200, which occurs in a case where the flexible board 200 is fixed to a certain position of the movable unit 303, is suppressed so that the flex can be prevented from affecting a moving operation of the image pickup device 101 in the image blur suppression operation.

Figure 27:
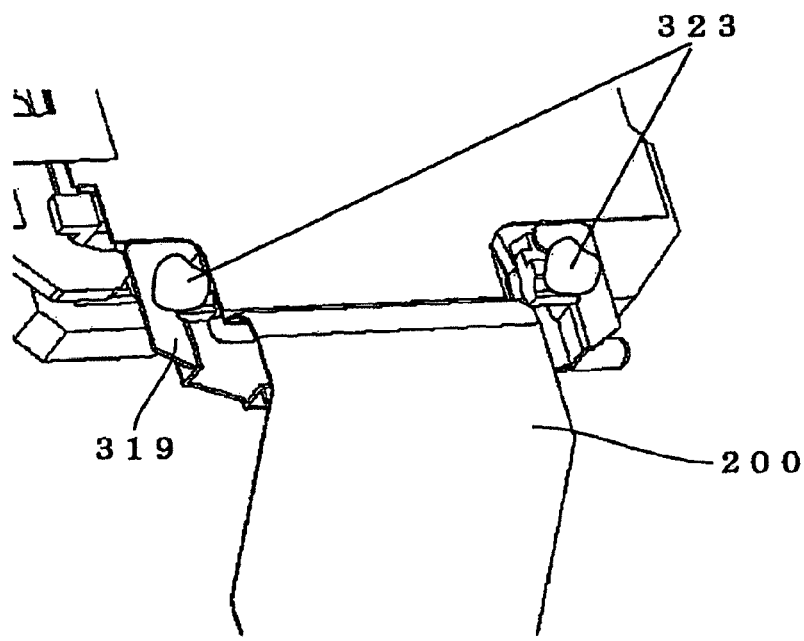
FIG. 27 is a schematic view illustrating another embodiment of the present invention in a state where a flexible board positioning member is fixed on a movable unit.

FIG. 27 is a schematic view illustrating an example according to an embodiment of the present invention, in a state where the flexible board positioning member 307 is fixed to the movable unit 303 with an adhesive 323.

In this example, although the connection portion 317 is fixed with the adhesive 323, a double-faced tape can be used.

Therefore, the flexible board positioning member 307 is fixed to the movable unit 303 so that the position of the flexible board 200 with respect to the movable unit 303 is not affected even when a positional deviation of an end of the flexible board 200 occurs thus causing the flex of the flexible board 200 when the end of the flexible board 200 is connected to the processing device. Accordingly, the flex of the flexible board 200 is prevented from affecting the moving operation of the image pickup device 101 in the image blur suppression operation (Retention Control Circuit of Suppression Mechanism)

The suppression mechanism will be explained below.

Figure 28:
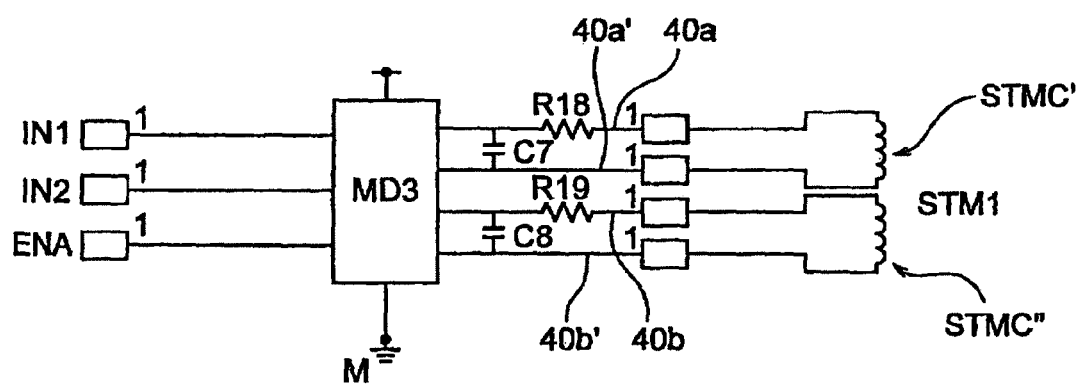
FIG. 28 is a block diagram of an original point forced retention control circuit according to an embodiment of the present invention.

The stepping motor STM1 is controlled by a retention control circuit illustrated in FIG. 28. The stepping motor STM1 includes a two-phase control structure, and includes a first coil STMC' (corresponding to the above-mentioned coil members COL1, COL1') and a second coil STMC" (corresponding to the above-mentioned coil members COL2, COL2'). The first coil STMC' has terminals connected a motor driver MD3 (corresponding to the above-mentioned driver 1261) via output lines 40a, 40a', respectively. The second coil STMC" has terminals connected to the motor driver MD3 via output lines 40b, 40b', respectively. The output line 40a is provided with a resistance R18 for limiting current, and also the output line 40b is provided with a resistance R19 for limiting current. A capacitor C7 is disposed between the output line 40a and the output line 40a' and a capacitor C8 is also disposed between the output line 40b and the output line 40b'.

Retention control signals are input to the motor driver MD3 from ports IN1, IN2 of the processor 104, and an enable signal is input to a port ENA of the processor 104. The motor driver MD3 controls the power distribution to the stepping motor STM1 based on the retention control signals and the enable signal.

Figure 29:
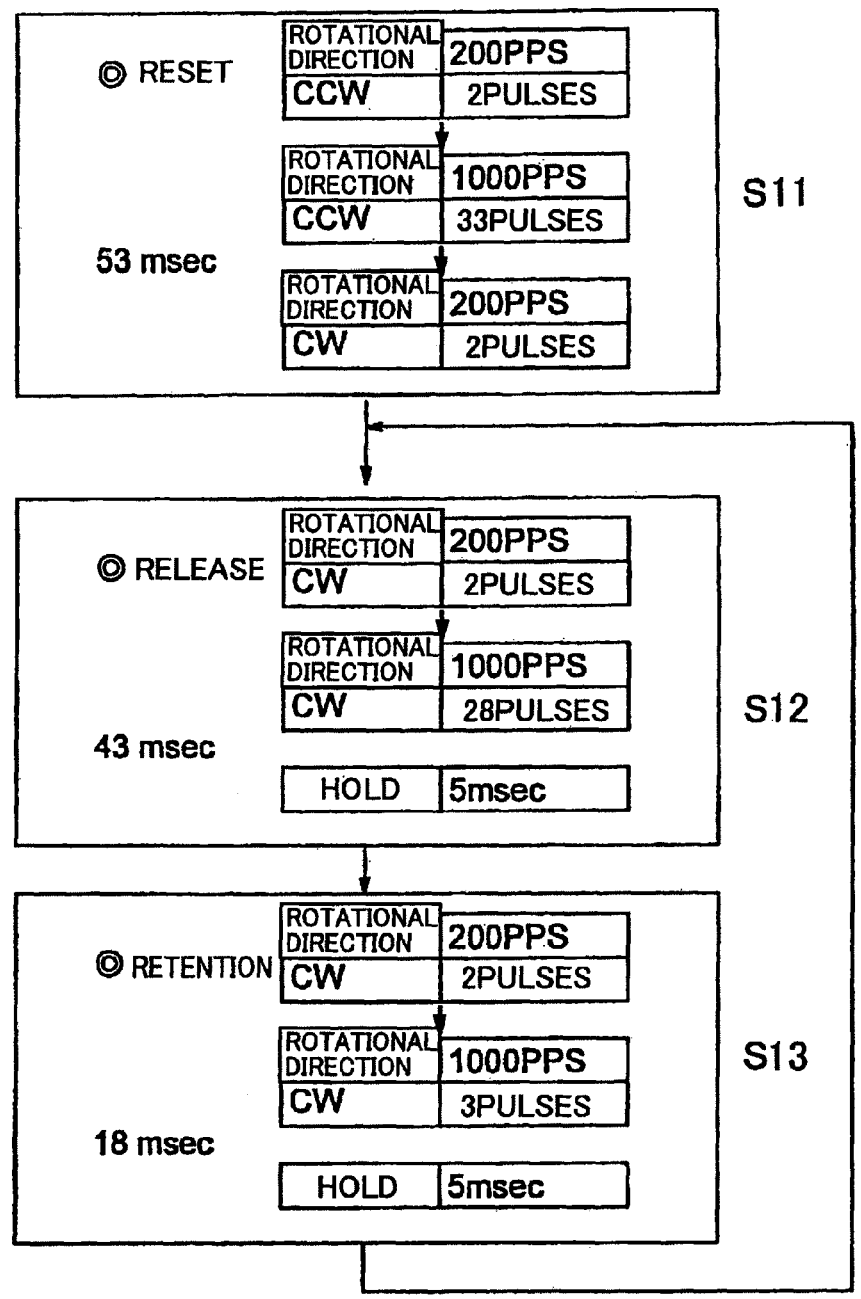
FIG. 29 is a flow chart illustrating one example of a control process of the original point forced retention mechanism of a mechanism for suppressing an image blur according to the embodiments of the present invention.

FIG. 29 is a flow chart for explaining the operations of the retention control circuit, including three steps such as a reset process, a release process and a retention process.

When the power switch SW13 of the digital camera is turned on, at first, the reset process is performed according to the control of the processor 104 (S11). In this reset process, the stepping motor STM1 is rotationally driven according to 2 pulses in the counter-clockwise direction at a slow rate of 200 pps (pulse per second) by the control of the processor 104. Next, the stepping motor STM1 is rotationally driven according to 33 pulses in the counter-clockwise direction at a fast rate of 1000 pps. Finally, the stepping motor STM1 is rotationally driven according to 2 pulses in the clockwise direction at a slow rate of 200 pps.

Wherever the cam pin 32 is in the rotational direction of the cam groove 31, the cam pin 32 physically has contact with the cliff 31d of the cam groove 31 by rotating the stepping motor STM1 according to 35 pulses in the counter-clockwise direction.

Figure 13B:
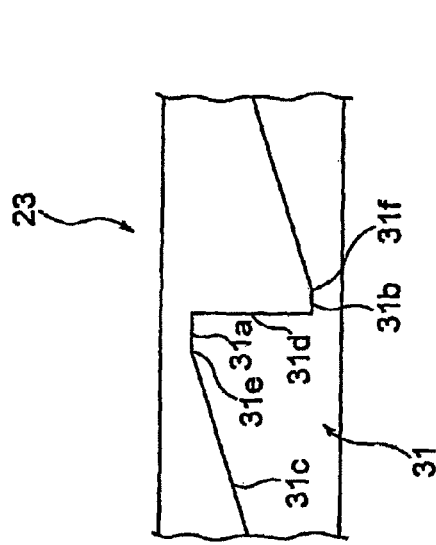
FIG. 13B is a view showing a frame format of a cam groove of a rotation transferring gear according to the digital camera presented in FIG. 1, illustrating a cross-section obtained along a circulated one-point dotted line V presented in FIG. 13A.
Figure 13A:
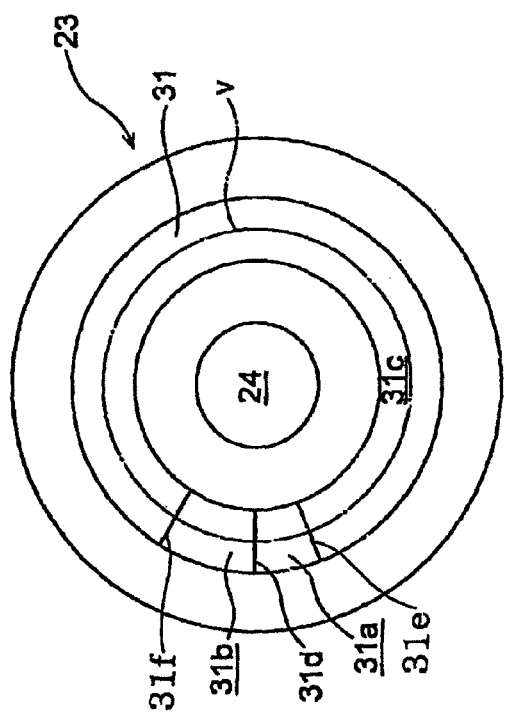
FIG. 13A is a view showing a frame format of a cam groove of a rotation transferring gear according to the digital camera presented in FIG. 1, and presenting a bottom plane view of the rotation transferring gear.
Figure 13E:
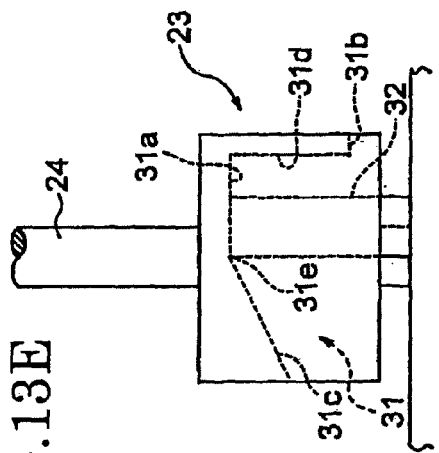
FIG. 13E is a view showing a frame format of a cam groove of a rotation transferring gear according to the digital camera presented in FIG. 1, illustrating a state where the cam pin passes through a cliff to have contact with a flat valley portion, and the transferring gear is pushed up to the maximum.

If the stepping motor STM1 is driven according to 2 pulses in the clockwise direction from the contact position, the cam pin 32 is set to the incline start position 31e of the cam groove 31 (reference to FIG. 13E).

The state where the cam pin 32 is set in the incline start position 31e of the cam groove 31 is a state of the reset position, in which the CCD solid-state image sensing device 101 is forcibly retained in the position of original point O. The position of original point O is the central position of the movable area of the mounting stage 15. The time required from the power on to the completion of reset is about 53 msec (millisecond).

In this suppression mechanism according to this embodiment of the present invention, the image blur suppression is carried out by turning on the suppression switch SW14, and the image blur suppression is released at the same time as the suppression switch SW14 is turned off or the photographing is completed.

When the suppression switch SW14 is turned on, the release process is performed by the control of the processor 104 (S12). In this release process, at first, the stepping motor STM1 is rotationally driven according to 2 pulses in the clockwise direction at a slow rate of 200 pps. Next, the stepping motor STM1 is rotationally driven according to 28 pulses in the clockwise direction at a fast rate of 1000 pps. Finally, the power distribution to the stepping motor STM1 is maintained for 5 msec. Next, the power distribution to the stepping motor STM1 is stopped by the motor driver MD3.

Figure 13D:
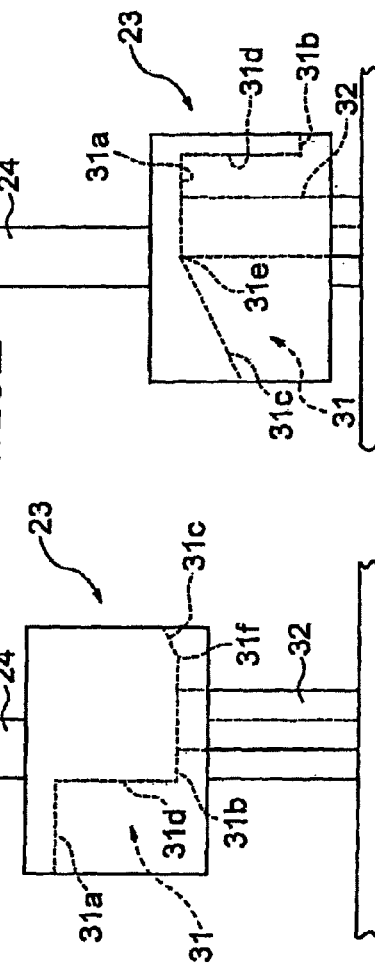
FIG. 13D is a view showing a frame format of a cam groove of a rotation transferring gear according to the digital camera presented in FIG. 1, illustrating a state where the cam pin has contact with a flat top portion of the cam groove, and the rotation transferring gear is pushed up to the maximum.
Figure 13C:
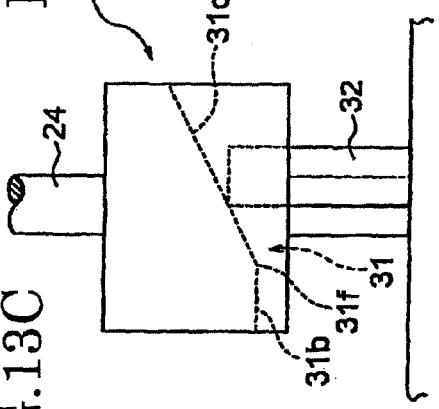
FIG. 13C is a view showing a frame format of a cam groove of a rotation transferring gear according to the digital camera presented in FIG. 1, illustrating a state where a cam pin slides an inclined surface portion of the cam groove, and the rotation transferring gear is pushed up toward a base member.

With this release process, the cam pin 32 is located in the incline end position 31f of the cam groove 31 (see FIG. 13D). The time required from the incline start position 31e to the incline end position 31f is about 43 msec. More particularly, the time required for the cam pin 32 to move from the holding standby position to the release standby position is about 43 msec. The suppression control is performed in this release standby position.

Next, when the suppression switch SW14 is turned off or the photographing is performed, the processor 104 carries out the retention process (S13). In this retention process, the stepping motor STM1 is rotationally driven according to 2 pulses in the clockwise direction at a slow rate of 200 pps by the control of the processor 104, and then is rotationally driven according to 3 pulses in the clockwise direction at a fast rate of 1000 pps. The cam pin 32, thereby, comes down to the flat valley portion 31a by passing through the flat top portion 31b of the cam groove 31 to have contact with the flat valley portion 31a. After that, the power distribution to the stepping motor STM1 is held for 5 msec.

Next, the power distribution to the stepping motor STM1 is stopped by the motor drive MD3. The cam pin 32 is, therefore, set to the incline start position 31e (holding standby position) of the cam groove 31, and the central position of CCD solid-state image sensing device 101 is retained. While the power is supplied, if the reset process is once performed, these release and retention processes are carried out. Moreover, the time required for the cam pin 32 to move from the release standby position to the retention standby position is about 18 msec.

Since the suppression mechanism includes the structure for forcibly retaining the mounting stage 15 of CCD solid-state image sensing device 101 at the central position by the compressing pin 33 formed in the forced retainer plate 26, it is not necessary to control the power distribution for keeping the retention of the mounting stage 15 at the position of original point; thus, the power consumption can be reduced when operating the suppression mechanism.

(Circuit Structure of Camera Shake Detection Circuit)

Figure 30:
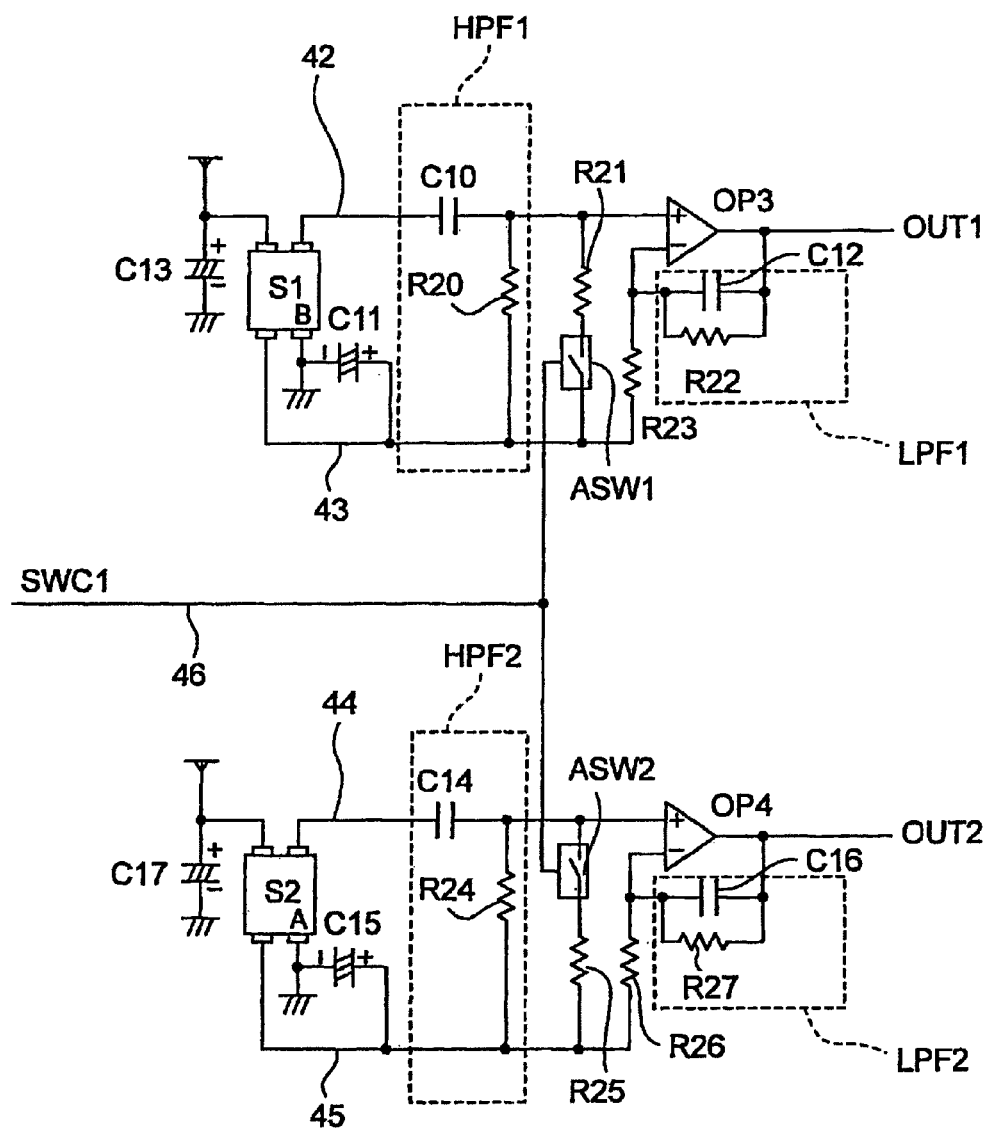
FIG. 30 is a circuit diagram presenting one example of a camera shake detection circuit according to the embodiments of the present invention.

FIG. 30 is a view illustrating a circuit structure of a camera shake detection circuit. The camera shake detection circuit includes an X direction rotation detector, which detects the rotation in the X direction, and a Y direction rotation detector, which detects the rotation in the Y direction.

The X direction rotation detector includes, for example, a piezoelectric vibration gyro sensor S1B having a first terminal grounded via a capacitor C13, a second terminal connected to a non-inverting input terminal (+) of an operational amplifier OP3 via a capacitor C10 provided in a connection line 42, a third terminal connected to an inverting input terminal (−) of the operational amplifier OP3 via a resistance R23 provided in a connection line 43, and a fourth terminal grounded and also connected to the connection line 43 via a capacitor C11.

The operational amplifier OP3 has the non-inverting terminal (+) connected to the connection line 43 via a resistance R20. A series circuit having a resistance R21 and an analogue switch ASW1 is connected between the connection line 42 and the connection line 43 in parallel with the resistance R20.

The operational amplifier OP3 has an output terminal connected to an inverting input terminal (−) of the operational amplifier OP3 via a capacitor C12. A resistance R22 is connected to the capacitor C12 in parallel. The capacitor C10 and the resistance R20 make up a high-pass filter HPF1, and the capacitor C12 and the resistance R22 make up a low-pass filter LPF1. The operational amplifier OP3 amplifies the output of piezoelectric vibration gyro sensor S1B and outputs an X direction detection signal OUT1 from the output terminal of operational amplifier OP3.

The Y direction rotation detector includes a piezoelectric vibration gyro sensor S2A having a first terminal grounded via a capacitor C17, a second terminal connected to a non-inverting input terminal (+) of an operational amplifier OP4 via a capacitor C14 provided in a connection line 44, a third terminal connected to an inverting input terminal (−) of the operational amplifier OP4 via a resistance R26 provided in a connection line 45, and a fourth terminal grounded and also connected to the connection line 45 via a capacitor C15.

The operational amplifier OP4 has the non-inverting input terminal (+) connected to the connection line 45 via a resistance R24. A series circuit having a resistance R25 and an analogue switch ASW2 is connected between the connection line 44 and the connection line 45 in parallel with the resistance R24.

The operational amplifier OP4 has an output terminal connected to the inverting input terminal (−) of the operational amplifier OP4 via a capacitor C16. A resistance R27 is connected to the capacitor C16 in parallel. The capacitor C14 and the resistance R24 make up a high-pass filter HPF2, and the capacitor C16 and the resistance R27 make up a low-pass filter LPF2. The operational amplifier OP4 amplifies the output of the piezoelectric vibration gyro sensor S2A and outputs a Y direction detection signal OUT2 from the output terminal of operational amplifier OP4.

A switching control signal SWC1 is input to the analogue switches ASW1, ASW2 via a signal line 46. The analogue switches ASW1, ASW2 include functions for accelerating the charge of the capacitors C11, C15, respectively, so as to increase the response speed of the high-pass filters HPF1, HPF2, respectively. The processor 104 outputs the switching control signal SWC1 to the analogue switches ASW1, ASW2 for a predetermined time after turning on the power. Thereby, the analogue switches ASW1, ASW2 are turned on for a predetermined time. The detection outputs OUT1, OUT2 of the gyro sensors S1B, S2A are loaded into the A/D converter 10411 every T seconds.

Where,

ω yaw (t) . . . instant angular velocity in YAW direction

ω pitch (t) . . . instant angular velocity in PITCH direction

θ yaw (t) . . . angular variation in YAW direction

θ pitch (t) . . . angular variation in PITCH direction

Dyaw (t) . . . movement amount of image in X-direction corresponding to rotation in YAW direction.

Dpitch (t) . . . movement amount of image in Y-direction corresponding to rotation in PITCH direction, and θ yaw (t) and θ pitch (t) are obtained by the following relational expressions, $$\theta\ yaw\ (t) = \Sigma\ \omega\ yaw\ (i) \cdot T$$

$$\theta\ pitch\ (t) = \Sigma\ \omega\ pitch\ (i) \cdot T.$$

Moreover, a focal length f is determined from a zoom point zp and a focal point fp. The following equations are established among Dyaw (t), which is the movement amount of the image corresponding to rotation in the YAW direction, Dpitch (t), which is the movement amount of the image corresponding to rotation in the PITCH direction, θ yaw (t), which is the angular variation in the YAW direction, and θ pitch (t), which is the angular variation in the PITCH direction.

$$D\text{yaw}(t) = f * \tan(\theta \text{ yaw}(t)) \quad (i)$$

$$D\text{pitch}(t) = f * \tan(\theta \text{ pitch}(t)) \quad (ii)$$

Namely, Dyaw (t), which is the movement amount of the image in the X-direction corresponding to rotation in the YAW direction, and Dpitch (t), which is the movement amount of the image in the Y-direction corresponding to rotation in the PITCH direction, correspond to the movement amount of the CCD solid-state image sensing device 101 which should be moved in the X-Y direction.

If the rotation displacements in the YAW direction and in the PITCH direction occur due to the camera shake, a reference position (as a target position) of the CCD solid-state image sensing device 101 is calculated by the above equations (i) and (ii) and drives the mounting stage 15 such that a difference between the actual position of the CCD solid-state image sensing device 101 in the X-Y direction detected by the position detection element 1252 and the target position of the CCD solid-state image sensing device 101 becomes zero. This control is performed every T seconds.

In addition, if the detection output of the gyro sensors S1B, S2A is zero, the mounting stage 15 is controlled such that the CCD solid-state image sensing device 101 is translational-displaced by following a translational motion displacement Xd of the camera body.

(Suppression Control Circuit)

Figure 31:
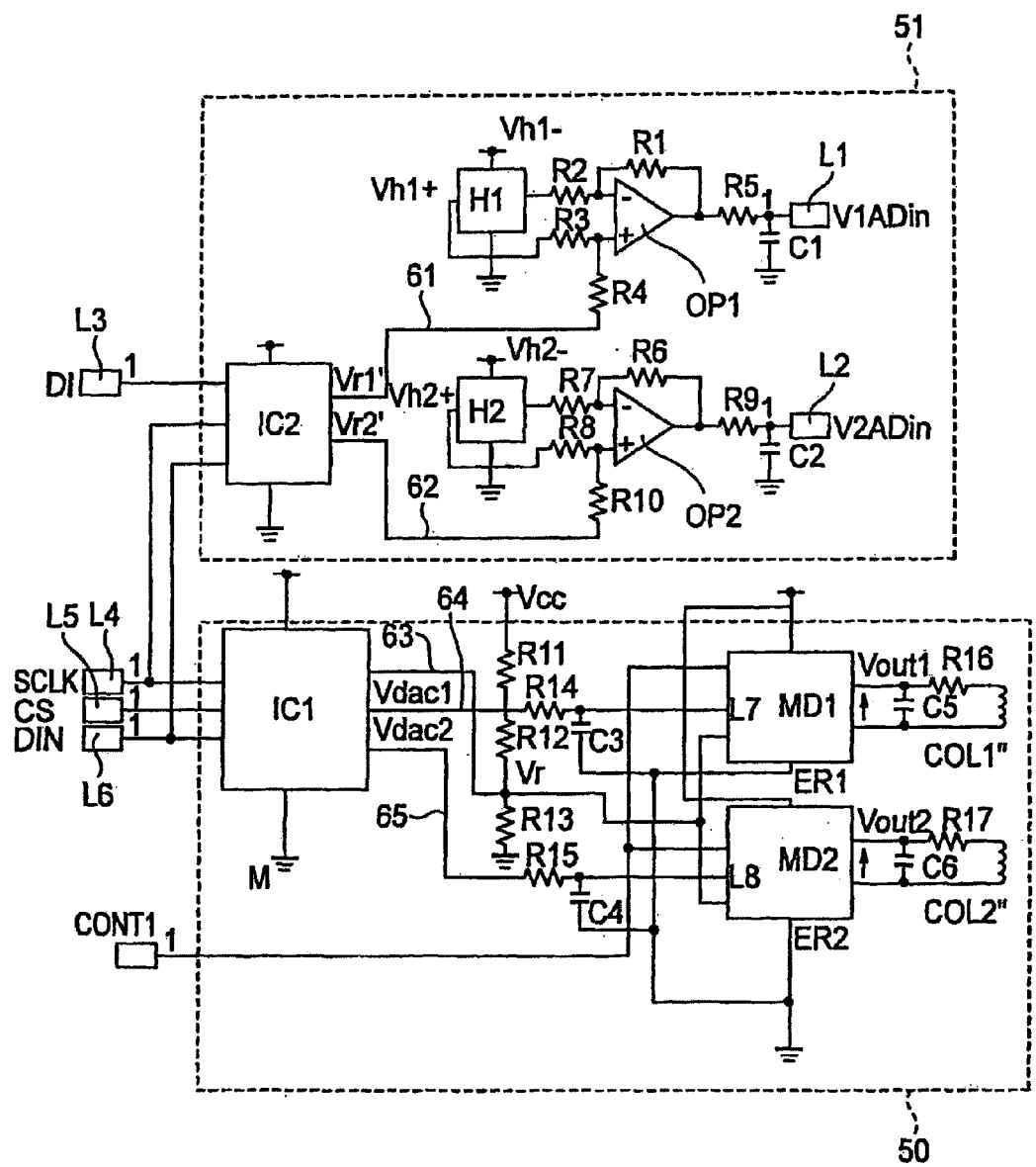
FIG. 31 is a block diagram of a control circuit for suppressing an image blur according to an embodiment of the present invention.

FIG. 31 is a block diagram illustrating an example of a control circuit for suppressing an image blur. The suppression circuit includes a feedback circuit 50 and a position correspondence voltage setting circuit 51.

Hall elements H1, H2 constitutes a part of the position correspondence voltage setting circuit 51. A voltage Vh1– is applied to the Hall element (1252a) H1. The Hall element H1 has a terminal connected to an inverting input terminal (–) of an operational amplifier OP1 via a resistance R2 and another terminal connected to a non-inverting input terminal (+) of the operational amplifier OP1 via a resistance R3.

The operational amplifier OP1 has an output terminal connected to an input port L1 of the processor 104 via a resistance R5 and also connected to the inverting input terminal (–) of the operational amplifier OP1 via the resistance R1. In addition, a connection point between the resistance R5 and the input port L1 is grounded via a capacitor C1.

A voltage Vh2– is applied to the Hall element (1252b) H2. The Hall element H2 has one terminal connected to an inverting input terminal (–) of an operational amplifier OP2 via a resistance R7 and the other terminal connected to a non-inverting input terminal (+) of the operational amplifier OP2 via a resistance R8.

The operational amplifier OP2 has an output terminal connected to an input port L2 of the processor 104 via a resistance R9 and also connected to the one terminal of the operational amplifier OP2 via a resistance R6. In addition, a connection point between the resistance R9 and the input port L2 is grounded via a capacitor C2.

The processor 104 has an output port L3 connected to a D/A conversion circuit IC2 constituting a part of the position correspondence voltage setting circuit 51, output ports L4, L6 connected to the D/A conversion circuit IC2 and the D/A conversion circuit IC1, and an output port L5 connected to the D/A conversion circuit IC1.

Connected to the D/A conversion circuit IC2 are two output lines 61, 62, one output line 61 being input to the non-inverting input terminal (+) of the operational amplifier OP1 via a resistance R4 and the other output line 62 being input to the non-inverting input terminal (+) of operational amplifier OP2 via a resistance R10.

A chip selector signal D1 from the output port L3, a clock signal SCLK from the output port L4, and correction digital data DIN from the output port L6 are input to the D/A conversion circuit IC2 having a function which converts the correction digital data DIN into the analogue data.

The D/A conversion circuit IC1 constitutes a part of the feedback circuit 50. A common line 63 and two output lines 64, 65 are connected to the D/A conversion circuit IC1. The common line 63 is connected to a coil drive circuit as the coil driver MD1 and a coil drive circuit as the coil driver MD2. The output line 64 is connected to an input terminal L7 of the coil drive circuit MD1 via a resistance R14. The output line 65 is connected to an input terminal L8 of the coil drive circuit MD2 via a resistance R15.

A connection point between the resistance R14 and the input terminal L7 is connected to a ground terminal ER1 of the coil drive circuit MD1 via a capacitor C3. A connection point between the resistance R15 and the input terminal L8 is connected to a ground terminal ER2 of the coil drive circuit MD2 via a capacitor C4.

The common line 63 is connected to a power source Vcc via resistances R12, R11, and a connection point between the common line 63 and the resistance R12 is grounded via a resistance R13.

A control signal CONT1 is input to the coil drive circuits MD1, MD2 from the processor 104. The coil drive circuit MD1 has an output terminal connected to a coil COL1" (serial connection body of the coil member COL1 and the coil member COL1') via a resistance R16. A capacitor C5 is connected in parallel with a serial circuit of the resistance R16 and the coil COL1". The coil drive circuit MD2 has an output terminal connected to a coil COL2" (serial connection body of the coil member COL2 and the coil member COL2') via a resistance R17. A capacitor C6 is connected in parallel with a serial circuit of the resistance R17 and the coil COL2". The coil COL1" is used to move the mounting stage 15 in the X direction, and the coil COL2" is used to move the mounting stage 15 in the Y direction.

Here, predetermined voltages Vh1–, Vh2– are applied to the Hall elements H1, H2, respectively, and the detection output voltage levels of the Hall elements H1, H2 when the detection outputs of the gyro sensors S1B, S2A are zero and also the CCD solid-state image sensing device 101 exists in the central position (original point) of the movable area are named as Vh1, Vh2, respectively. In this case, analogue output voltage levels of the input ports L1, L2 of the processor 104 are named as V1ADin, V2ADin, respectively. These output voltage levels V1ADin, V2ADin are actually measured.

The output voltage levels (actually measured values) V1ADin, V2ADin are varied based on an assembling error factor regarding the mechanical positional relationship between the magnets (permanent magnets) 16a to 16d and the Hall elements H1, H2, and an assembling error factor between the mounting positions of the Hall elements H1, H2 and the mounting positions of the coils COL1", COL2" with respect to the mounting stage 15, or the like. In addition, the output voltage levels V1ADin, V2ADin vary also according to the characteristics of the Hall elements H1, H2.

Therefore, if correction is not performed, the output voltage levels V1ADin, V2ADin corresponding to the position of the original point of the Hall elements H1, H2 vary for each of cameras; thus, accurate image blur suppression can not be conducted.

Consequently, correction voltages Vr1', Vr2', which are input to the operational amplifiers OP1, OP2 respectively from the A/D converter IC2, are set, such that the output voltage levels V1ADin, V2ADin before corrected become constant voltage levels (setting reference voltage levels). More particularly, the correction voltages Vr1', Vr2' are set so as to correct the variations in the output voltage levels (detection values) V1ADin, V2ADin when the CCD solid-state image sensing device 101 exists in the position of original point and the CCD solid-state image sensing device 101 is not controlled (when the power is not supplied to the coil members COL1", COL2").

In this embodiment, in order to set the setting reference voltage level at a generally middle value in an operable voltage range of the operational amplifiers OP1, OP2, the processor 104 performs the following arithmetical operation.

Here, for the sake of convenience, the resistances are set to R2=R3=R7=R8, R1=R4=R6=R10, but not limited thereto.

Under the conditions of R2=R3=R7=R8, R1=R4=R6=R10, the following relational formulas are realized.

$$V1ADin=R1/R2*((Vh1+)-(Vh1-))+Vr1'$$

$$V2ADin=R1/R2*((Vh2+)-(Vh2-))+Vr2'$$

The processor 104 calculates the correction voltages Vr1', Vr2' by the arithmetical operation based on the above relational formulas. As a result, the output voltage levels V1ADin, V2ADin are constant even if the detection values of the Hall elements H1, H2 in the position of the original point of the CCD solid-state image sensing device 101 vary based on the assembling error factor regarding the mechanical positional relationship between the magnets (permanent magnets) 16a to 16d and the Hall elements H1, H2, the assembling error factor between the mounting positions of the Hall elements H1, H2 and the mounting positions of the coils COL1", COL2" with respect to the mounting stage 15, or the like.

The processor 104 constitutes, together with the D/A conversion circuit IC2, a part of a variation correction circuit, which outputs corrected values for setting the detection values to the setting reference voltage levels regardless of the variations in the detection values of the Hall elements H1, H2, and also serves as a correction value arithmetic device which obtains the setting reference voltage values by the arithmetical operations.

Figure 32:
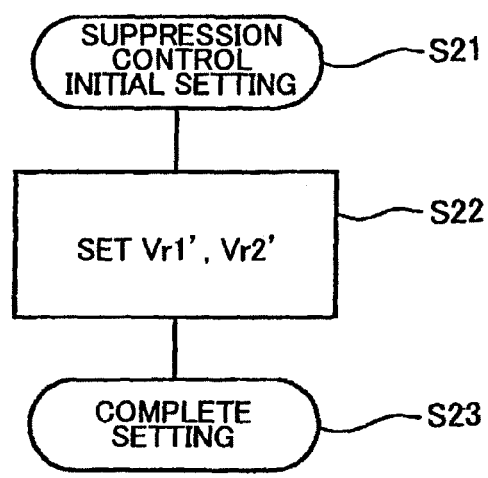
FIG. 32 is a flow chart presenting one example of a variation correction setting process according to an embodiment of the present invention.

This initial setting operation for setting the above-mentioned output voltage levels V1ADin, V2ADin to the setting reference voltage levels is performed when shipment in which a final inspection is carried out in a factory for assembling a camera, as illustrated in the flow chart of FIG. 32 (see S21-S23).

Figure 33:
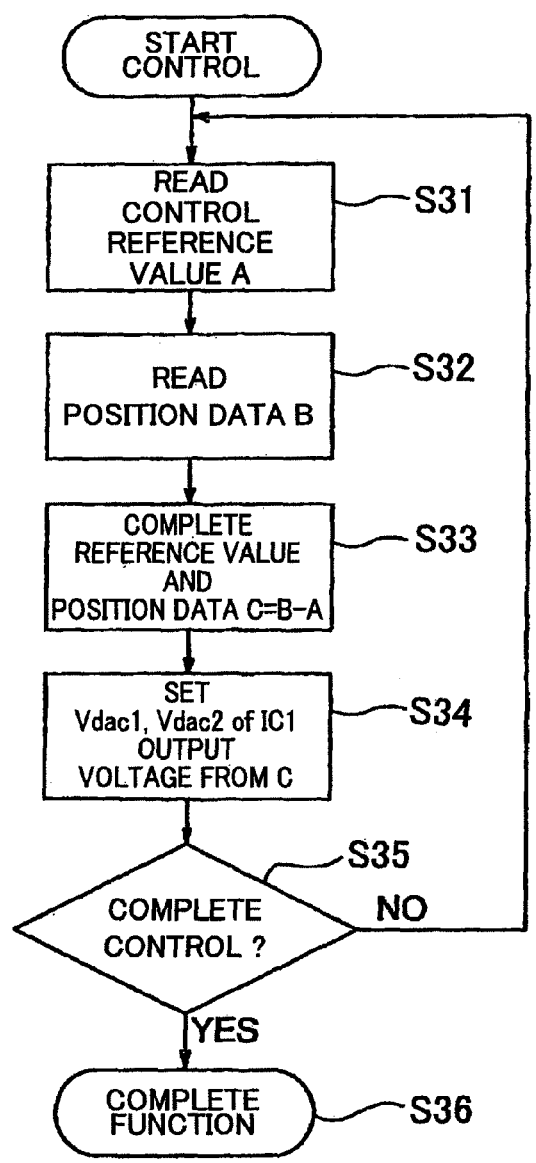
FIG. 33 is a flow chart presenting one example of a process of the control circuit for suppressing an image blur according to an embodiment of the present invention.

In the flow chart of FIG. 33, an actual control of image blur suppression is illustrated. The processor 104 loads the control reference values obtained by the arithmetic operations based on the detection outputs OUT1, OUT2 of the camera shake detection circuit (S31), and then loads the actual position correspondence voltage levels V1ADin, V2ADin obtained by the Hall elements H1, H2 (S32). Thereby, the processor 104 calculates a difference between the control reference values and the position correspondence voltage values V1ADin, V2ADin (S33).

The processor 104 outputs the control data to the digital/analogue conversion circuit IC1 based on the output difference. The digital/analogue conversion circuit IC1 outputs control voltages Vdac1, Vdac2 corresponding to the control data (S34). The control voltages Vdac1, Vdac2 are input to the coil drive circuits MD1, MD2. The coil drive circuits MD1, MD2 output driving voltages Vout1, Vout2 to the COL1", COL2", respectively.

The driving voltages Vout1, Vout2 are set according to the following equations.

$$Vout1=(Vdac1-Vr)*K$$

$$Vout2=(Vdac2-Vr)*K$$

Where, Vr is a fractional voltage,
where reference number K is a ratio constant based on the fractional voltage, Vr.

The CCD solid-state image sensing device 101 is attracted and repelled by magnetic fields of the magnets 16a-16d and the coils COL1", COL2" to move in a direction which is controlled due to whether each of the driving voltages Vout1, Vout2 is a positive voltage or a negative voltage. The detected values of the Hall elements H1, H2 are, thereby, changed according to the movement of the CCD solid-state image sensing device 101. The position correspondence voltage levels V1ADin, V2ADin are changed corresponding to the change in the detected values, and the position correspondence voltage levels are fed back to the processor 104, so that the CCD solid-state image sensing device 101 can be smoothly followed to the target position when the control reference values are changed by the detection output values of the camera shake detection circuit (S35). If the photographing is completed, the suppression function for suppressing image blur is concluded (S36).

(Modification Example of Feedback Circuit)

Figure 34:
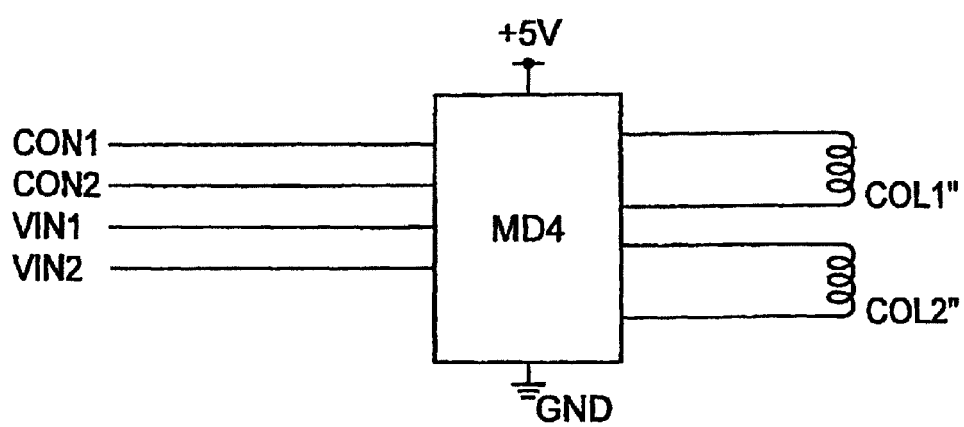
FIG. 34 is a block diagram illustrating a modification example of a feedback circuit presented in FIG. 31.

FIG. 34 is a circuit diagram illustrating a modification example of the feedback circuit 50. In this example, the processor 104 controls the driving of a coil driver MD4 by means of a PWM control (pulse-width modulation control), so as to control the power distribution to the coils COL1", COL2".

More particularly, a normal direction signal CON1 and a reverse direction signal CON2 are input to the coil driver MD4, and pulse voltages Vin1 and Vin2 are input. The power distribution voltages to the coils COL1", COL2" increase as the duration of a high level pulse signal gets longer.

(Details of Photographing with Suppression Mechanism)

Figure 35:
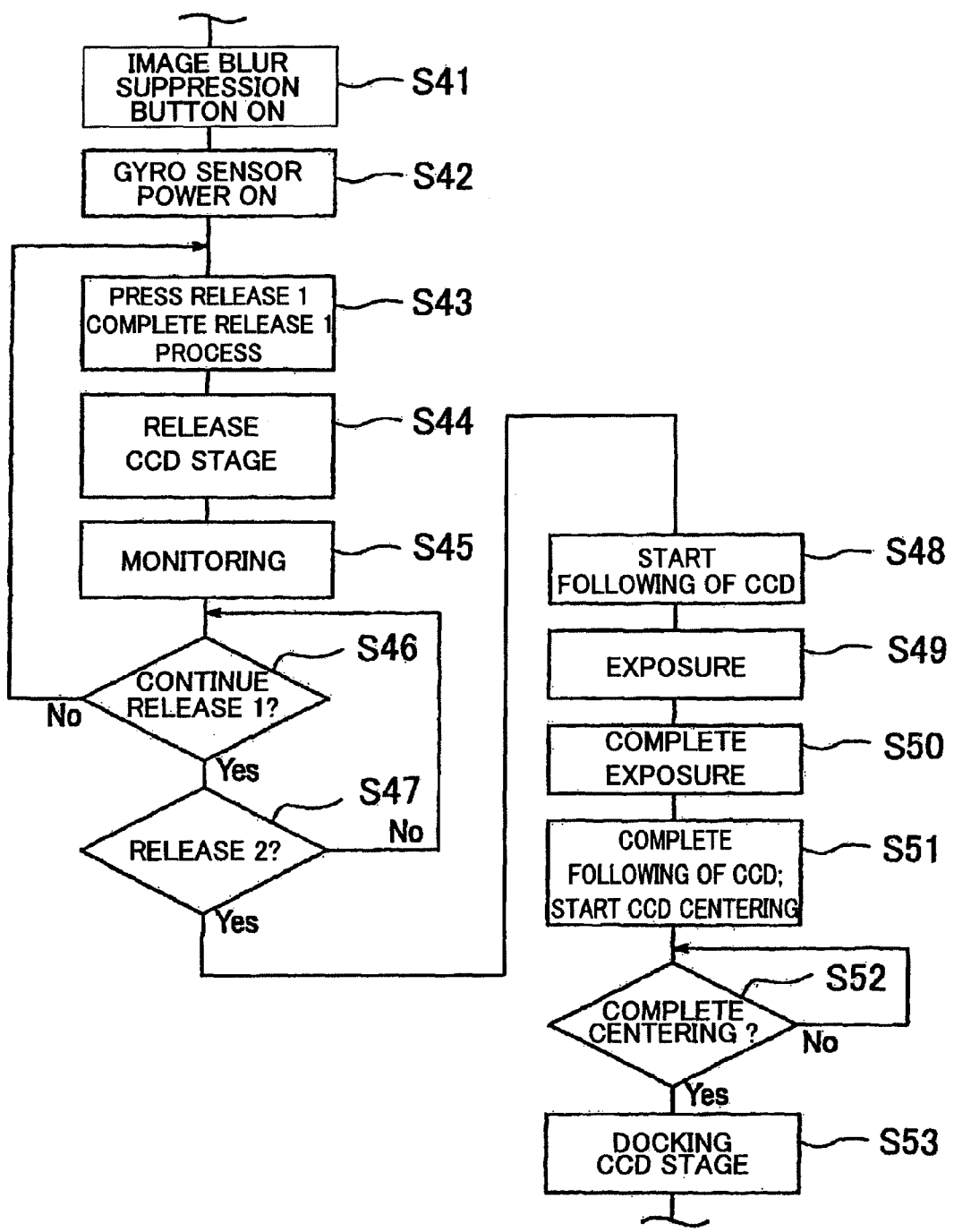
FIG. 35 is a flow chart illustrating a flow of a process for suppressing an image blur of the imaging apparatus according to an embodiment of the present invention.

As illustrated in FIG. 35, if the suppression switch SW14 is turned on (S41), the gyro sensors S1B, S2A are powered on (S42). If the release switch SW1 is pressed to complete a half-pressing (S43), an auto focusing operation (focusing operation) is initiated (S44). At the same time, the mechanical forced fixation of the mounting stage 15 is released, and the CCD central retention control is initiated by the power distribution to the coils COL1", COL2" (S44).

Next, a monitoring process of a camera shake is initiated (S45). The processor 104 determines whether or not the half-pressing of the release switch SW1 is continued (S46). If the half-pressing (first release) of the release switch SW1 is released, the process goes back to S43. If the half-pressing (first release) of the release switch SW1 is continued, the processor 104 determines whether or not the full-pressing (second release) of the release switch SW1 is performed (S47). If the full-pressing (second release) of the release switch SW1 is not performed, the process goes back to S46.

If the full-pressing (second release) of the release switch SW1 is completed, following of the CCD solid-state image sensing device 101 in the moving direction of the image is started (S48). Next, an exposure is performed (S49). When the exposure is completed (S50), the following of the CCD solid-state image sensing device 101 is stopped, and then the mounting stage 15 is returned to the position of the original point by the power distribution control to the coils COL1", COL2" (S51). It is determined whether or not the mounting stage 15 is returned to the position of the original point (S52), and the CCD solid-state image sensing device 101 is forcibly fastened to the position of the original point in a mechanical manner (S53).

There are two modes for the operation timing of the release switch SW1.

Figure 36:
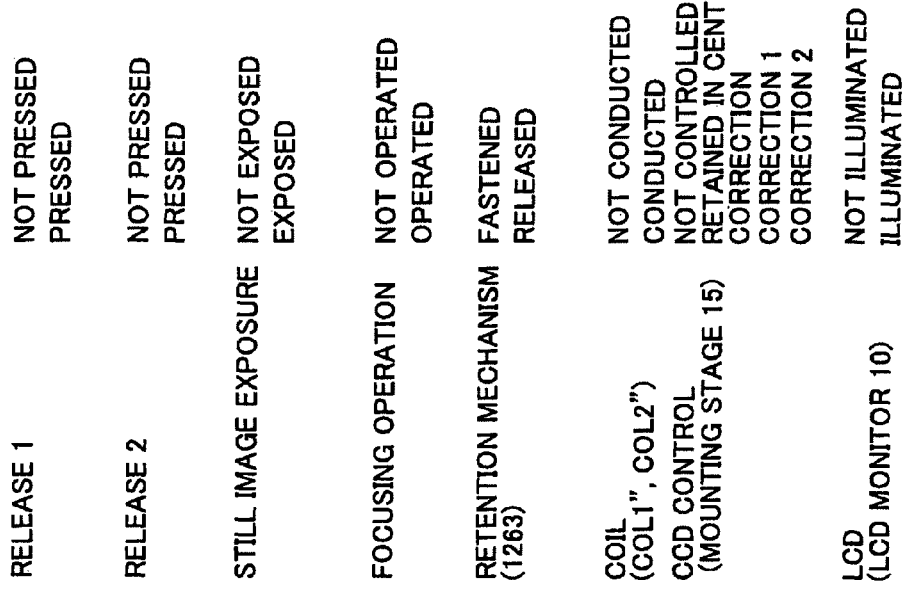
FIG. 36 is a timing chart illustrating one example of a process for suppressing an image blur in a case of a full-pressing of the imaging apparatus according to an embodiment of the present invention.

FIG. 36 is a timing chart of a process for suppressing an image blur in the case of a full-pressing of the release switch SW1. In this case, the full-pressing means a release operation having discontinuity from the half-pressing operation of the release switch SW1 to the full-pressing operation of the release switch SW1, for example, a photographing operation which shifts to an exposure start operation at the right moment after the half-pressing operation.

If the release switch SW1 is half-pressed, a focusing operation of the digital camera is started. In this state, the original point forced retention mechanism 1263 has not released the forced retention of the mounting stage 15 yet. The power is not supplied to the coils COL1", COL2", that is, the coils are not conducted. In addition, the mounting stage 15 is mechanically fixed to the central position, and the subject image is displayed onto the LCD monitor 10.

If the focusing operation is completed, the processor 104 starts supplying power to the stepping motor STM1 of the original point forced retention mechanism 1263. The mechanical forced retention of the mounting stage 15 is, thereby, released. At the same time, supplying power to the coils COL1", COL2" is started. The suppression process during the half-pressing operation of the release switch SW1 (suppression 1) is performed by the control of the power supply to the coils COL1", COL2". If the release switch SW1 is fully pressed (release 2), the mounting stage 15 is once returned to the central position by the control of power distribution to the coils COL1", COL2", and then the LCD monitor 10 is turned off after some time so as not to display the subject image.

Next, if a still image exposure is started, the mounting stage 15 is controlled to follow the movement of the image based on the camera shake (suppression 2). If the still image exposure is completed, the mounting stage 15 is returned to the central position based on the control of power distribution to the coils COL1", COL2". Next, the processor 104 starts the power distribution to the stepping motor STM1 of the original point forced retention mechanism 1263. The mechanical forced fixation of the mounting stage 15 is, thereby, performed, and then the power distribution to the coils COL1", COL2" is stopped.

As described above, even if the camera is shaken, a user can recognize the LCD monitor 10 which monitors the subject image without having the camera shake during the first release.

In addition, once the mounting stage 15 is returned to the central position during the second release, a composition during the second release is displaced from a composition of the subject image during the first release. However, according to the embodiment of the present embodiment, it is possible to confirm the subject image right before photographing in a state where the mounting stage 15 is once returned to the central position. Therefore, it is possible to confirm the composition of the subject image right before photographing (right before exposing).

Figure 37:
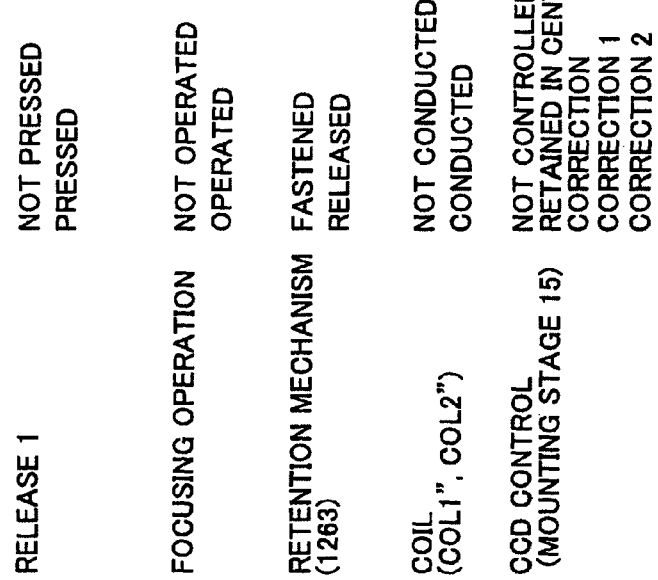
FIG. 37 is a timing chart illustrating one example of a release process of a process for suppressing an image blur of the imaging apparatus according to an embodiment of the present invention.

If the release switch SW1 is half-pressed, and the half-pressing of the release switch SW1 is released without fully pressing the release switch SW1, as shown in FIG. 37, the focusing operation is started at the same time as the half-pressing. If the focusing is completed, the processor 104 starts the power distribution to the stepping motor STM1 of the original point forced retention mechanism 1263; thereby, the mechanical forced retention of the mounting stage 15 is released. At the same time, the power supply to the coils COL1", COL2" is started, and the suppression process during the half-pressing operation of the release switch SW1 (first release) is performed by the control of power supply to the coils COL1", COL2".

If the half-pressing operation of the release switch SW1 is released during the half-pressing operation of the release switch SW1, the mounting stage 15 is retuned to the central position based on the control of power supply to the coils COL1", COL2". Next, the processor 104 starts the power supply to the stepping motor STM1 of the original point forced retention mechanism 1263; thereby, the mechanical fixation and retention of the mounting stage 15 are conducted. Next, the power distribution to the coils COL1", COL2" is stopped.

Figure 38:
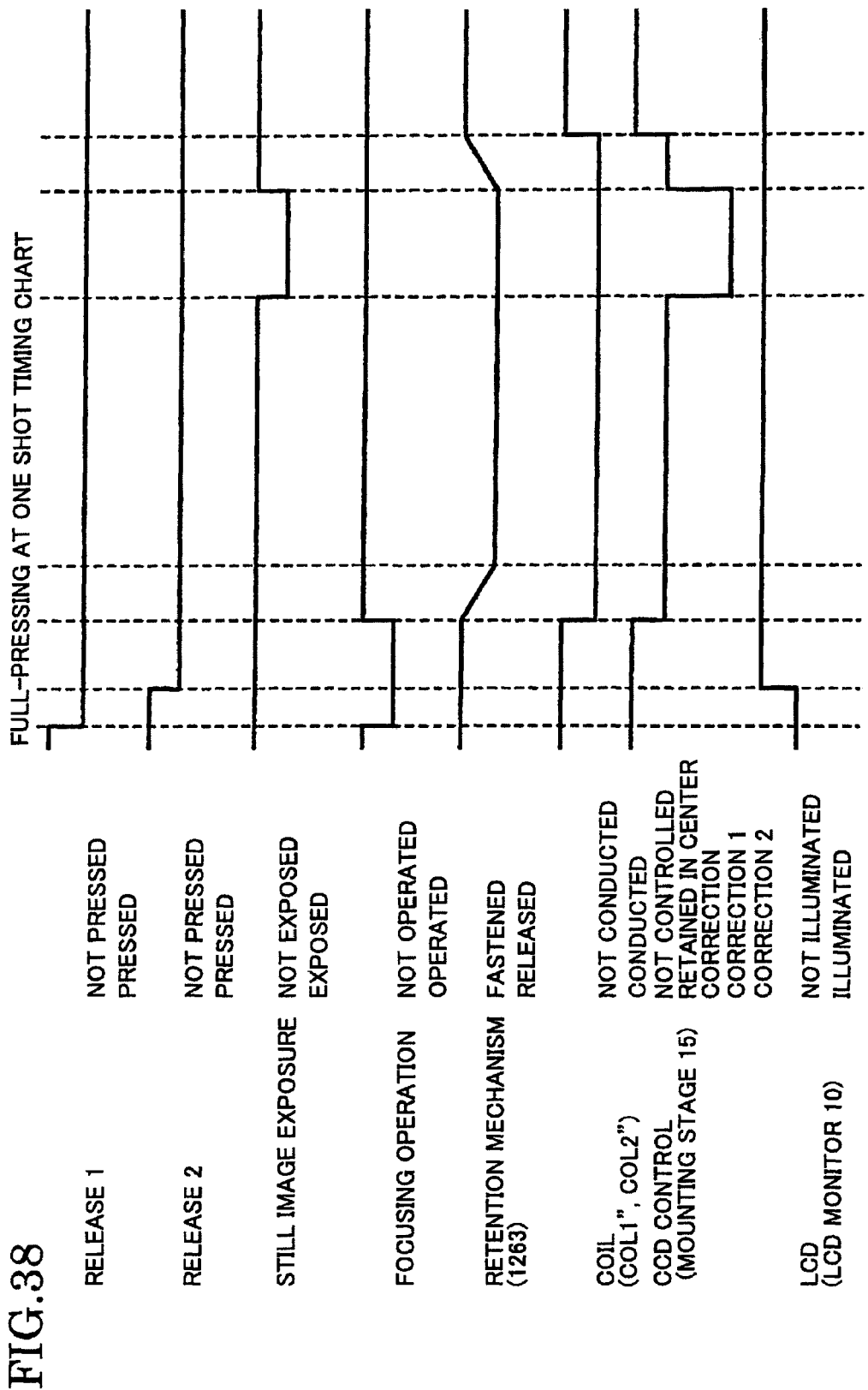
FIG. 38 is a timing chart illustrating one example of a process for suppressing an image blur in a case of a full-pressing at one shot of the imaging apparatus according to an embodiment of the present invention.

FIG. 38 is a timing chart illustrating the suppression process when the release switch SW1 is fully pressed at one shot. In this case, the full-pressing at one shot means a release operation having continuousness from the half-pressing operation (first release) of the release switch SW1 to the full-pressing operation (second release) of the release switch SW1, for example, a photographing operation which immediately shifts to an exposure start operation after the half-pressing. If the release switch SW1 is half-pressed, the focusing operation of the digital camera is started. The subject image is displayed on the LCD monitor 10. In addition, the full-pressing operation of the release switch SW1 is immediately performed right after the half-pressing of the release switch SW1. At the same time, the LCD monitor 10 is turned off so as not to display the subject image.

If the focusing operation is completed, the processor 104 starts the power supply to the stepping motor STM1 of the original point forced retention mechanism 1263; thereby, the mechanical retention of the mounting stage 15 is released. At the same time, the power supply to the coils COL1", COL2" is started, that is, the coils are conducted, and the mounting stage 15 is retained in the central position by the power supply control to the coils COL1", COL2". Therefore, the suppression process is performed.

If the mounting stage 15 is maintained in the central position by the power supply to the coils COL1", COL2", and the still image exposure is started, the mounting stage 15 is controlled to follow the movement of the image based on the camera shake. If the still image exposure is completed, the mounting stage 15 is returned to the central position based on the power supply control to the coils COL1", COL2". Next, the processor 104 starts the power supply to the stepping motor STM1 of the original point forced retention mechanism 1263; thereby, the mechanical fixation and retention of the mounting stage 15 are performed. Next, the power distribution to the coils COL1", COL2" is stopped.

In the case of the above-described full-pressing at one shot, it is considered that the confirmation of the composition is completed during the operation of the first release, so that it is not necessary to confirm the composition during the second release. Accordingly, it is considered that the reconfirmation of the composition is not necessary even if the mounting stage 15 is once returned to the central position during the second release, so the suppression control process can be simplified.

Moreover, since the LCD monitor 10 is turned off during the focusing operation, battery drainage can be avoided. Furthermore, since the adsorption bars 35 (see FIG. 10) can be adsorbed to the magnets 16c, 16d to be retained when the mounting stage 15 is forcibly pressed to the position of the original point in a mechanical manner, chattering of the mounting stage 15 in the Z-axis direction is controlled. In addition, the adsorption bars 35 are absorbed to the magnets 16c, 16d to be retained so that the chattering of the mounting stage 15 in the Z-axis direction is controlled even if the mounting stage 15 is not positioned at the position of the original point.

In the imaging apparatus with a function for suppressing the image blur according to an embodiment of the present invention, that is, a digital camera, the adsorption bars 35 are adsorbed to the permanent magnet 16c and the permanent magnet 16d, which are facing the adsorption bars 35 in the Z axis direction, so that the mounting stage 15 can be attracted to the guide stage including the Y-direction stage 14 and the X-direction stage 13, that is to say, the mounting stage 15 can be attracted to the X-direction stage 13 via the Y direction stage. Therefore, the position of the mounting stage 15 viewed in the Z axis direction can be set at a position so as to have contact with the guide stage (a position where the mounting stage 15 has contact with the X-direction stage 13 via the Y-direction stage 14). The chattering of the CCD solid-state image sensing device 101 mounted on the mounting stage 15 can be avoided in the Z axis direction (photographing optical axial direction). The CCD solid-state image sensing device 101 can receive light to capture a subject image by a suitable focal distance.

Moreover, since the adsorption bars 35 intersect each of the coil members COL1, COL1' in the X-direction, that is to say, extend across each of the coil members COL1, COL1', the adsorption bars 35 are adsorbed to the permanent magnet 16c and the permanent magnet 16d regardless of the position of the mounting stage 15 moved on the base member 11 during the image blur suppression. Since the mounting stage 15 is moved by use of the magnetic force between each of the coil members COL1, COL1' and each of the coil members COL2, COL2' and each of the permanent magnets 16a to 16d, the adsorption bars 35 intersecting each of the coil members COL1, COL1' are adsorbed to the permanent magnet 16c and the permanent magnet 16d regardless of the position of the mounting stage, because the permanent magnet 16c and the permanent magnet 16d can apply the magnetic force to the coil members COL1, COL1' regardless of the position of the mounting stage 15.

The adsorption bars 35 substantially cross over a center of each of the coil members COL1, COL1' in the X-direction, and the mounting stage 15 moves in the Y-direction with substantially a center of each of the coil members COL1, COL1' as a base point. Therefore, the magnetic force of the permanent magnet 16c and the permanent magnet 16d can be applied to the adsorption bar 35 even if the mounting stage 15 moves in the Y-direction.

Since each of the permanent magnet 16c and the permanent magnet 16d, which faces the adsorption bar 35, has a long shape in the Y-direction, the magnetic force can be applied even if the mounting stage 15 moves in the Y-direction.

The adsorption bars 35 cross over each of the coil members COL1, COL1', and are adsorbed to the permanent magnet 16c and the permanent magnet 16d at both sides of the CCD solid-state image sensing device 101. Therefore, the mounting stage 15 can be adsorbed to the guide stage without a bias so as to have contact with the guide stage parallel to the X-Y plane. Therefore, the chattering of the CCD solid-state image sensing device 101 in the Z axis direction can be avoided in a state where the CCD solid-state image sensing device 101 is perpendicular to the photographing optical axis to suitably receive the signal of the subject image.

Moreover, although in the above-mentioned embodiments, the adsorption bars 35 are configured to cross over each of the coil members COL1, COL1', they may be configured to be provided on each of the coil members COL2, COL2', and also provided only on the coil member COL1. That is, the present invention is not limited to the above-mentioned embodiments.

In the above-mentioned embodiments, the coil members COL1, COL1' and the coil members COL2, COL2' are provided on the mounting stage, and the permanent magnets 16a to 16d are provided on the X-direction stage 13 included in the guide stage. It may be, however, configured such that the permanent magnets 16a to 16d are provided on the mounting stage 15 and the coil members COL1, COL1' and the coil members COL2, COL2' are provided on the X-direction stage. That is, the present invention is not limited to the above-mentioned embodiments. In the case that the coil members COL1, COL1' and the coil members COL2, COL2' are provided on the X-direction stage, the adsorption bars 35 which are provided on an X-direction stage side, that is to say, provided for at least one of the coil members COL1, COL1' and the coil members COL2, COL2', can be adsorbed to each of the permanent magnets 16a to 16d.

In the above-mentioned embodiments, the adsorption bars 35 are provided so as to cross over each of the coil members COL1, COL1'. That is, the present invention is not limited to the above-mentioned embodiments and the adsorption bars 35 are merely required to be adsorbed to the permanent magnets (in this embodiment, the permanent magnet 16c and the permanent magnet 16d) which face the adsorption bars 35. Therefore, the adsorption bars 35 may be provided so as to be located near each of the coil members COL1, COL1' and each of the coil members COL2, COL2'.

In the above-mentioned embodiments, the gyro sensor 1214 detects a rotation of the camera body (body case) in the X direction and Y direction to detect a camera shake occurring in the camera body. That is, the present invention is not limited to the above-mentioned embodiments and, for example, the detection of the camera shake can be performed by processing monitoring images.

In the above-mentioned embodiments, the guide stage includes the Y-direction stage 14 supporting the mounting stage 15 movably in the Y-direction and the X-direction stage 13 supporting the Y-direction stage movably in the X-direction. However, the present invention is not limited to the above-mentioned embodiments, and may be configured such that the mounting stage 15 is supported movably along the X-Y plane, and is fixed with respect to the photographing optical axis in the camera body.

(Second Embodiment)
(Positioning Mechanism of Flexible Board)

A second embodiment of the present invention will be explained.

Figure 39:
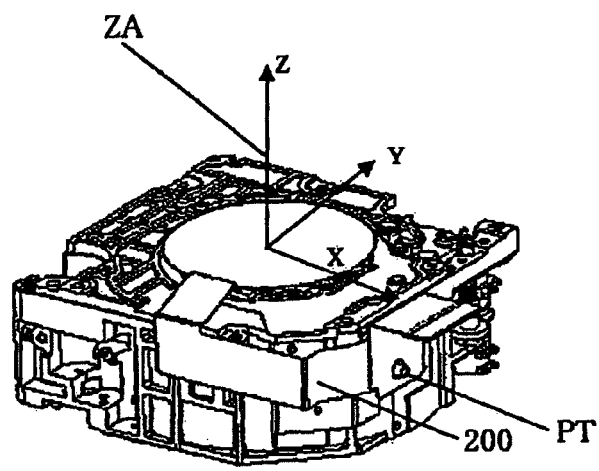
FIG. 39 is a perspective view illustrating a positioning mechanism PT of the imaging apparatus according to an embodiment of the present invention.

FIG. 39 is a view showing the imaging apparatus having a positioning mechanism PT used as the positioning unit according to the second embodiment of the present invention. Reference number ZA denotes the Z axis directing the photographing optical axis of the imaging apparatus. The X-Y plane is a plane orthogonal to the Z axis ZA.

The positioning mechanism PT includes for example, a concave portion such as a hole provided on the flexible board and a convex portion such as a boss provided on the fixing unit and configured to be fitted in the convex portion.

Figure 40:
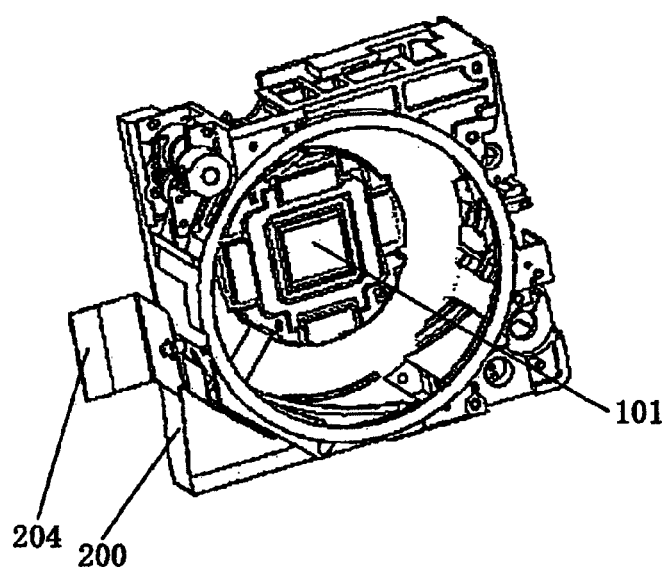
FIG. 40 is a view illustrating the imaging apparatus viewed from a light-receiving side of the imaging apparatus shown in FIG. 39.

FIG. 40 is a view from the front side of the imaging apparatus according to the embodiment of the present invention.

The image pickup device 101 is shown in the center of FIG. 40. The signals from the image pickup device 101 are transmitted to the processing device 315 through an end 204 of the flexible board 200.

FIG. 41 is an enlarged view showing the positioning mechanism PT. Reference number FP denotes a fixing unit such as the base member 11, or the like, which is a part of the camera body of the imaging apparatus. Reference numbers BS and HL denote a boss extending from the fixing unit FP and a hole provided on the flexible board 200. As shown in FIG. 41, the hole HL is configured to be larger than a diameter of the boss BS so that the flexible board 200 is capable of moving in the Z, Y directions. Therefore, due to the configuration, if the form or the position of the flexible board 200 varies, the variation of the form or position of the flexible board 200 can be absorbed. That is to say, the flex occurring in the flexible board 200 when the flexible board 200 is fixed to a predetermined position of the imaging apparatus can be suppressed, so that the flex is prevented from affecting the moving operation of the image pickup device 101 during the image blur suppression operation.

FIG. 42 is a view showing the positioning mechanism PT viewed from the Y-axis direction. A space is provided between the fixing unit FP and the flexible board 200, so that a variation in the position of the flexible board 200 in the X-axis direction can be absorbed.

Figure 43:
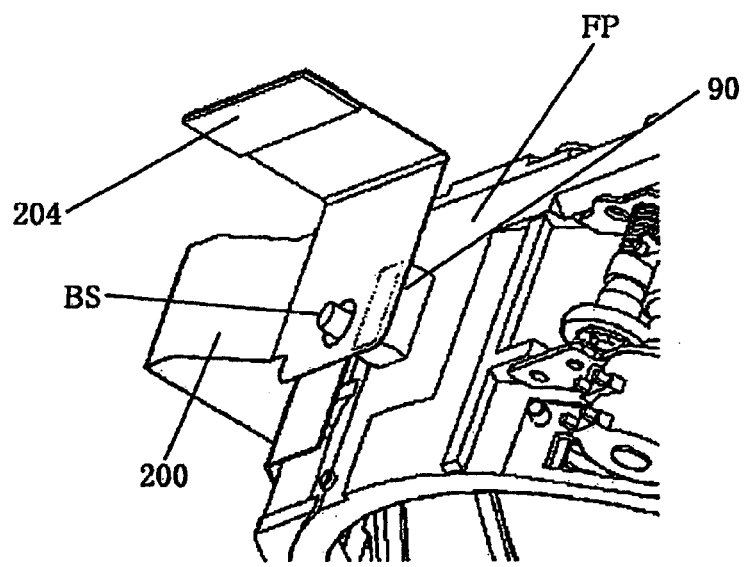
FIG. 43 is a perspective view illustrating an example of a positioning mechanism PT of a flexible board in the imaging apparatus according to an embodiment of the present invention.

Next, another example of the positioning mechanism PT according to the embodiment of the present invention will be explained. FIG. 43 shows an example in which the imaging apparatus has generally the same structure as the embodiment shown in FIGS. 39 to 42. There are differences from the above-mentioned embodiments in that the flexible board 200 is fixed to the fixing unit FP with an adhesive 90, as shown in FIG. 43. As mentioned above, since the flexible board 200 is fixed to the fixing unit FP with the adhesive 90, the form of the flexible board 200 is not affected at the imaging apparatus side, even if the variations of the position of the end 204 of the flexible board 200 occur when the end 204 of the flexible board 200 is connected to the processing device 315. Accordingly, the flex of the flexible board 200 is suppressed so that adverse affects on the moving operation of the image pickup device 101 in the image blur suppression operation can be prevented.

Figure 44:
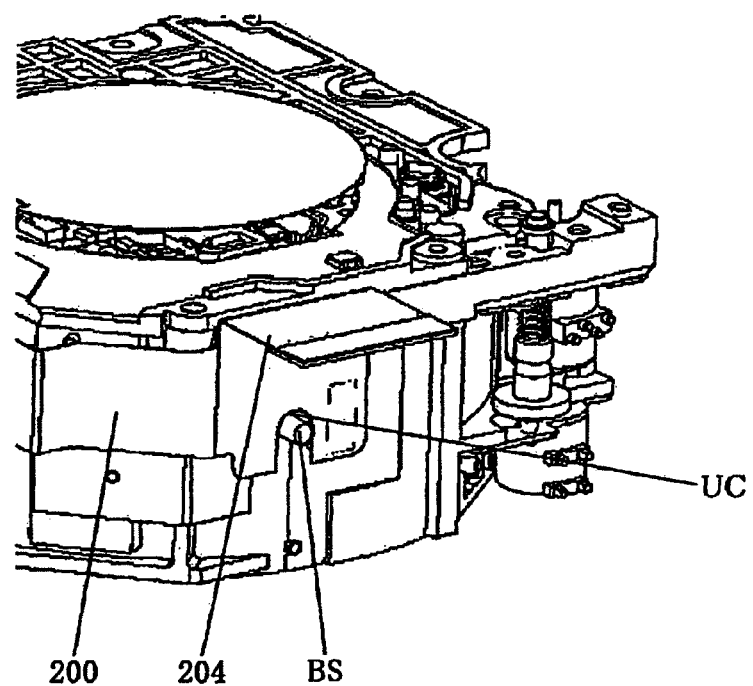
FIG. 44 is a perspective view illustrating another example of a positioning mechanism PT of a flexible board in the imaging apparatus according to an embodiment of the present invention.

A further example of the positioning mechanism PT according to the embodiment of the present invention will be explained. FIG. 44 shows the further example in which the imaging apparatus has generally the same structure as the imaging apparatus shown in FIGS. 39 to 42. There are differences from the above-mentioned embodiments in that the hole HL has an opening at an end, that is to say, a U-shaped notch UC is substituted for the hole HL. Advantageous effects of the example are the same as the above-mentioned examples.

(Third Embodiment)

Next, a third embodiment of the present invention will be explained.

Figure 45:
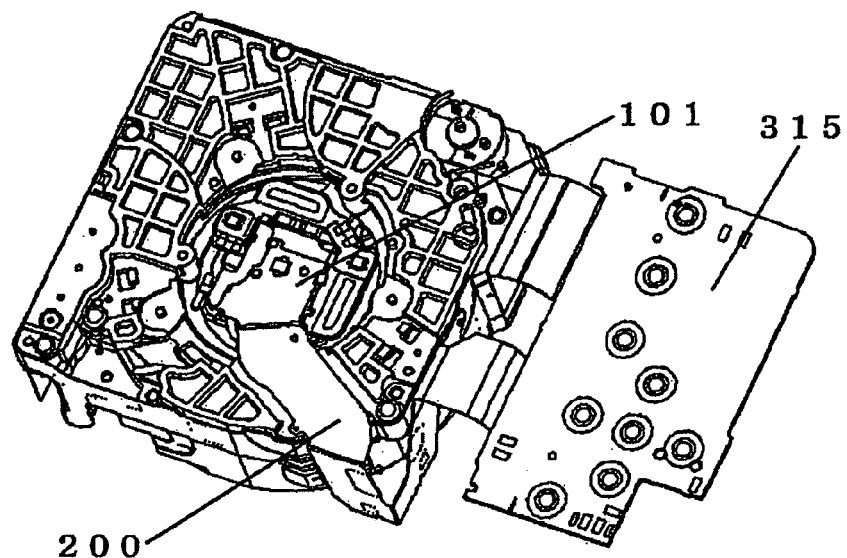
FIG. 45 is a perspective view illustrating the imaging apparatus according to an embodiment of the present invention.

FIG. 45 is a perspective view showing the imaging apparatus according to the third embodiment of the present invention, viewed from a backside of the imaging apparatus having the movable image pickup device 101.

Figure 46:
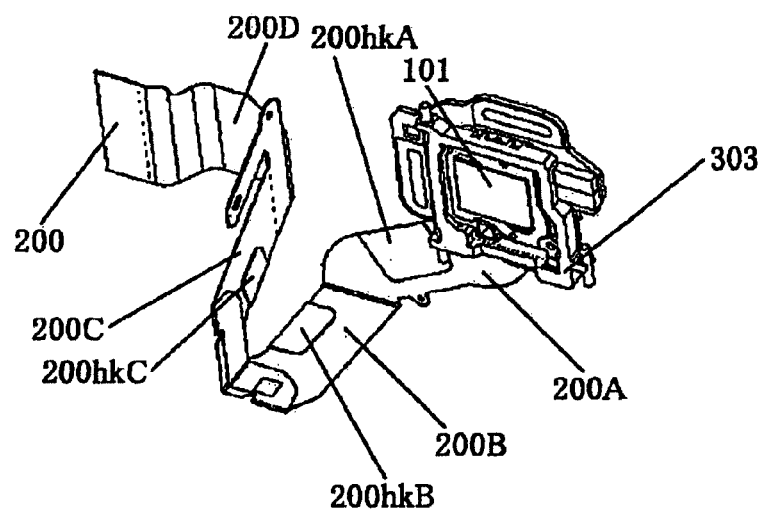
FIG. 46 is a perspective view illustrating an image pickup device and a flexible board viewed from a light-receiving surface of the image pickup device.

FIG. 46 is a perspective view showing the image pickup device 101 and the flexible board 200 viewed from a backside of a light-receiving surface of the image pickup device 101.

As mentioned above, the image pickup device 101 is configured to be capable of moving in a direction parallel to a surface of the image pickup device 101 (the X-Y plane) by the movable unit 303. The flexible board 200 has a plurality of surfaces including a first surface 200A disposed parallel to the image pickup device 101, a second surface 200B extending from the first surface 200A and disposed perpendicularly to the first surface 200A, a third surface 200C extending from the second surface 200B and disposed perpendicularly to the second surface 200B and a fourth surface 200D extending from the third surface 200C and connected to the processing device 315.

Reinforcing members 200hkA, 200hkB, and 200hkC used as the positioning unit, for example, in a plate-like form, are provided at centers of the first surface 200A, the second surface 200B, and the third surface 200C, respectively, to restrain each of the first surface 200A, the second surface 200B, and the third surface 200C from deforming due to slack. Since these reinforcing members 200hkA, 200hkB, and 200hkC are attached at the centers, where the deformation due to slack can easily occur, the deformation due to slack in each of surface the first surface 200A, the second surface 200B, and the third surface 200C, can be effectively avoided. On the other hand, the flexible board 200 is configured to be deformed at vicinities of each of folded portions provided on each of the ends of the flexible board 200, which are important to absorb reactive forces occurring on the flexible board 200 due to the movement of the image pickup device 101.

Figure 47:
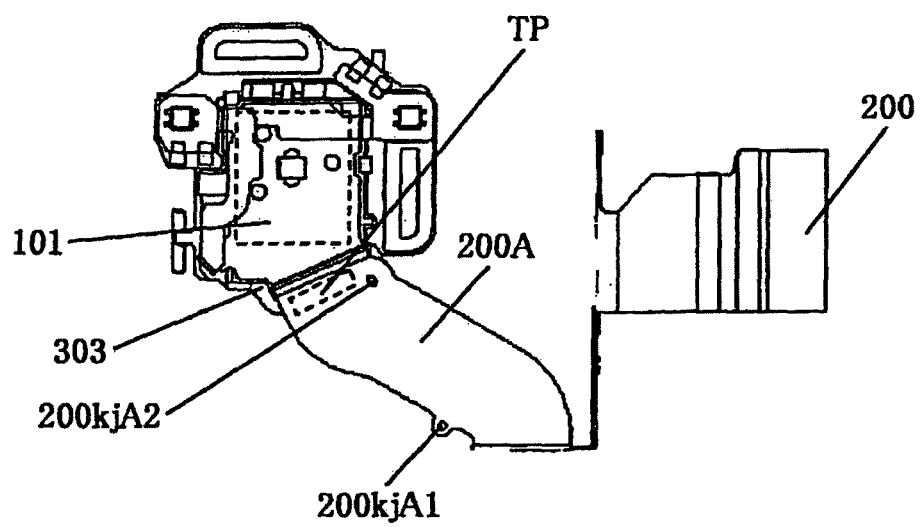
FIG. 47 is a plan view illustrating a flexible board of the imaging apparatus according to an embodiment of the present invention, viewed from a backside of an image pickup device.

FIG. 47 is a plan view illustrating the flexible board 200 shown in FIG. 45, viewed from the backside of the image pickup device 101.

Figure 48:
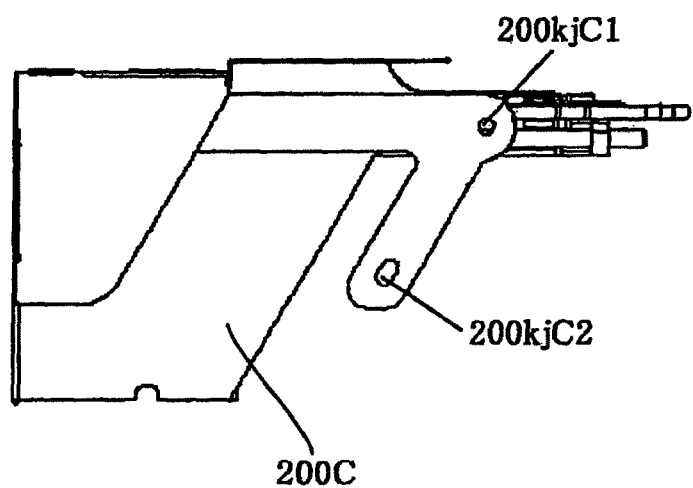
FIG. 48 is a plan view illustrating a flexible board of the imaging apparatus according to an embodiment of the present invention, viewed from a side of a third surface of the flexible board.

FIG. 48 is a plan view illustrating the flexible board 200 viewed from a side of the third surface 200C. At the third surface 200C, a main positioning hole 200kjC1 and a following positioning hole 200kjC2 are formed. A boss (not shown) provided on the fixing unit FP is fitted to each of the main positioning hole 200kjC1 and the following positioning hole 200kjC2 so that the third surface 200C is accurately positioned with respect to the barrel unit 7. The first surface 200A and the third surface 200C are accurately positioned so that a position of the second surface 200B disposed between these surfaces is determined. Accordingly, all of the first surface 200A, the second surface 200B, and the third surface 200C are accurately positioned within limited regions in the camera body.

FIG. 49 is an enlarged perspective view illustrating the imaging apparatus according to the embodiment of the present invention. The flexible board 200 is configured such that when the image pickup device 101 is moved in the X direction, the third surface 200C is mainly deformed, and when moved in the Y direction, the second surface 200B is mainly deformed. Furthermore, the first surface 200A is deformed according to the positional variation of the image pickup device 101 in the Z direction. Thereby, the flexible board 200 is configured such that the positional variation of the image pickup device 101 in the Z direction does not affect the second surface 200B and the third surface 200C. In addition, it is possible for a notch configured to be engaged with the boss formed on the flexible board 200 to be substituted for each of a main positioning hole 200kjA1 and a following positioning hole 200kjA2 shown in FIG. 47 and the main positioning hole 200kjC1 and the following positioning hole 200kjC2.

(Fourth Embodiment)

A fourth embodiment of the present invention will be explained.

The flexible board 200 according to the embodiment of the present invention is formed in a predetermined flat-plate form by punching, as shown in FIG. 46, and is configured to form at least three planes (including the first surface 200A, the second surface 200B, and the third surface 200C) by being folded along at least two predetermined portions (folded portions). The folded portions are shown in FIG. 46 as connecting portions between the first surface 200A and the second surface 200B, between the second surface 200B and the third surface 200C. As mentioned above, these three surfaces are configured such that the flexible board 200 can be disposed at an appropriate position, that is to say, such that each of these three surfaces is configured to be deformed in a different direction perpendicular to each other (X, Y, Z directions). Accordingly, the adverse affect of the positional variation of the flexible board 200 in the X, Y, Z directions of the image pickup device 101 can be prevented. Therefore, the flexible board 200 is required to be folded accurately along the folded portions and to be housed in the predetermined position.

As a result of considerations by the inventors, a method to form simply and accurately the flexible board in the predetermined form was found and thereby the desired flexible board 200 can be obtained. A method to process the flexible board 200 according to the embodiment of the present invention will be explained as follows.

A flexible board in a flat-plate form is folded along predetermined folded lines of the flexible board 200 and folded portion positioning members used as the positioning unit are provided. At this time, each of the folded portion positioning members is disposed such that an edge of each of the folded portion positioning members corresponds to each of the folded lines. When the flexible board 200 is folded, the flexible board 200 is folded along the edges of the folded portion positioning members to form the folded portions. The flexible board 200 is folded along the edges of the folded portion positioning members by this method, so that the flexible board 200 can be accurately processed in the predetermined form.

Here, each of the folded portion positioning members is formed by a member in which flexible boards are laminated (configuration A), or by a member made of a thick flexible board (configuration B). By use of edges of the laminated flexible boards or edges of the partly thick flexible boards, the flexible board 200 can be processed in an accurate manner without introducing other members. In addition, if these folded portion positioning members are formed in a single piece with the flexible board 200, there is no need to attach the folded portion positioning members to the formed flexible board 200 so that the fixed position of each of the folded portion positioning members can be accurately determined (configuration C). Furthermore, when the flexible board 200 is folded, it is not necessary to use jigs to determine the fixing position so that the number of processes and time for the processes can be reduced.

It is also possible for reinforcing plates as the folded portion positioning members to be attached to the flexible board 200 (configuration D). Thereby, the folded portion positioning members can be formed at positions to be required to process the flexible board 200 without depending on electrical circuit configurations of the flexible board 200.

In each of the above folded portion positioning members, parts of the flexible board, on which the folded portion positioning members are provided are more rigid than the other parts of the flexible board (configuration E). Thereby, the flexible board can be folded along the rigid parts so that an accurate process to form the flexible board can be performed.

Here, the folded portion positioning member is provided on one side of each folded line or both sides of each folded line. If the folded portion positioning member is provided on one side of each folded line, the folded portions are accurately formed by folding the flexible board along the edges of the folded portion positioning members (configuration F). If the folded portion positioning member is provided on both sides of each folded line, the flexible board is folded between the two folded portion positioning members so that the folded portions are more accurately formed (configuration G).

In addition, the folded portion positioning member is provided along the folded line over an entire or partial length of the folded line. If the flexible board is folded along the folded line over the entire length of the folded line, the folded portion can be accurately formed along the entire folded line (configuration H). If the flexible board is folded along the folded line over the partial length of the folded line, the folded portion can be accurately formed at only a part where high-accuracy is required in the folded portion and the other part where the folded portion positioning member is not formed is used to suppress reduction of the flexibility of the flexible board 200 due to the provided folded portion positioning member (configuration I). In addition, on the other part where the folded portion positioning member is not formed, since the flexible board can be folded such that two folded surfaces are overlapped, the process to form the folded portion of the flexible board can be firmly performed.

Moreover, as an example in which the folded portion positioning member is provided along the folded line in the partial length of the folded line, the folded portion positioning member is provided along both ends of the folded line (configuration J). Thereby, the both ends of the folded line, which are required to be accurately processed, can be firmly processed and the other part where the folded portion positioning member is not formed can suppress reduction of the flexibility of the flexible board 200 due to the provided folded portion positioning member.

FIGS. 50 and 51 show configurations of flexible boards 200#1, 200#2 produced by the above-mentioned method. Here, a perspective view illustrating the image pickup device 101 viewed from the light-receiving side is shown. In FIGS. 50 and 51, the reinforcing members 200$hk$A, 200$hk$B, 200$hk$C, and the main positioning hole 200$kj$A1, the following positioning hole 200$kj$A2, and the double-faced tape TP are omitted.

FIG. 50 shows an example of the flexible board 200#1 in which the configurations A, D, E, G, H are combined. That is to say, the folded portion positioning member 200#1MB in which flexible boards are laminated is attached to both sides of a predetermined folded part (the folded line) of the flexible board 200#1 along the entire folded line of the plate-like flexible board 200#1. The flexible board 200#1 is folded along two edges of the folded portion positioning member 200#1MB, which face each other, so that the folded portion 200#1BD is formed.

FIG. 51 shows an example illustrating the flexible board 200#2 in which the configurations B, C, E, F, I, J are combined. A member (folded portion positioning member) 200#2MB, which is formed by a thicker flexible board than the flexible board 200#2, is provided together with the flat-plate flexible board 200#2 along each of ends of a predetermined folded part (folded line) of the flat-plate flexible board 200#2. The flexible board 200#2 is folded along a line connecting the ends of each of the two folded portion positioning members 200#2MB to form the folded portion 200#2BD.

Due to both of the configurations shown in FIGS. 50 and 51, each of the flexible boards 200#1 and 200#2 can be simply and accurately processed to be formed in a predetermined form by the folded portion positioning members 200#1MB and 200#2MB.

(Fifth Embodiment)

Next, a fifth embodiment will be explained.

The long flexible board 200C connecting the image pickup device 101 to the processing device 315 is required and then the long flexible board 200C is required to be provided with a plurality of folded portions to absorb a reactive force generated in the flexible board 200C according to a movement of the movable unit 303. Therefore, long signal lines are also required according to an increase of a length of the flexible board 200C connecting the image pickup device 101 and the processing device 315. This causes a problem in that image quality is reduced because the image signals from the image pickup device 101 are affected by noise, or the like.

Therefore, under considerations by the inventors, a signal line concerning the image quality is separated from the other signal line disposed along the long flexible board 200C and is configured to be shorter than the flexible board. Thereby, the reactive force generated in the flexible board 200C according to the movement of the movable unit 303 can be absorbed so that less reduction of the image quality in the imaging apparatus can be achieved.

That is to say, in this embodiment, a bypass signal line BP, which is shorter than the signal line disposed along the flexible board 200C, is provided on the flexible board 200C. The bypass signal line BP is configured to communicate image signals between the image pickup device 101 and the processing device 315. Details will be explained as follows.

Figure 52:
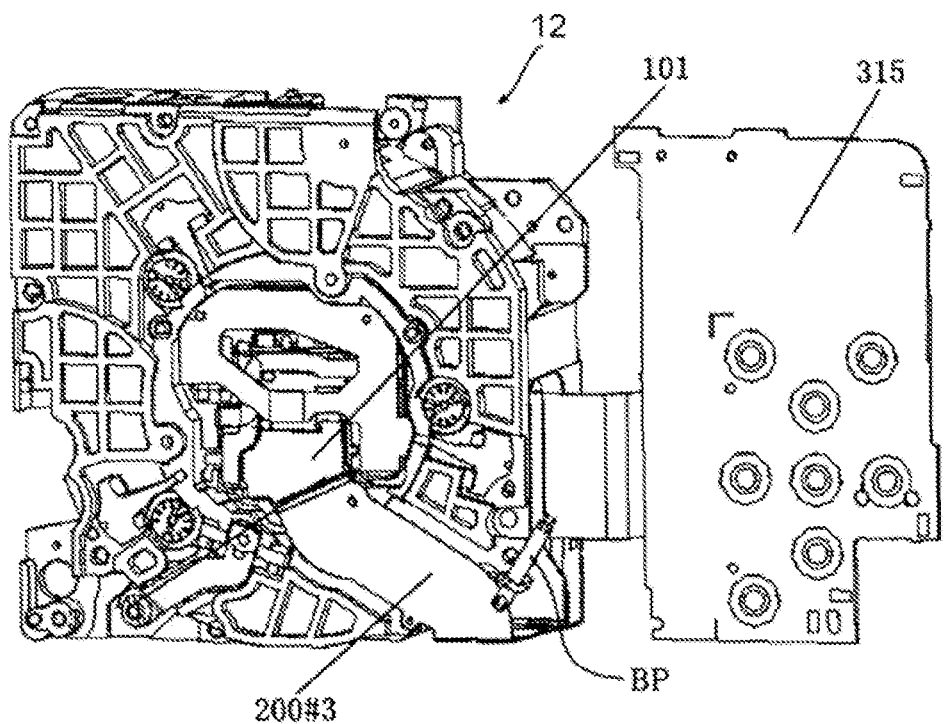
FIG. 52 is a view illustrating an example of the imaging apparatus according to an embodiment of the present invention, which has a flexible board provided with a bypass signal line.

FIG. 52 shows an example of the imaging apparatus according to the embodiment of the present invention, which has a flexible board 200#3 provided with a bypass signal line BP, viewed from the backside of the imaging apparatus. The flexible board 200#3 is configured to connect the image pickup device 101 and the processing device 315. The bypass signal line BP, which includes a part of the signal line of the flexible board 200#3 to form a shortcut, is provided on the flexible board 200#3. That is to say, the bypass signal line BP allows the part of the signal line of the flexible board 200#3 to be separated to form a shortcut and to join again the flexible board 200#3.

Figure 53:
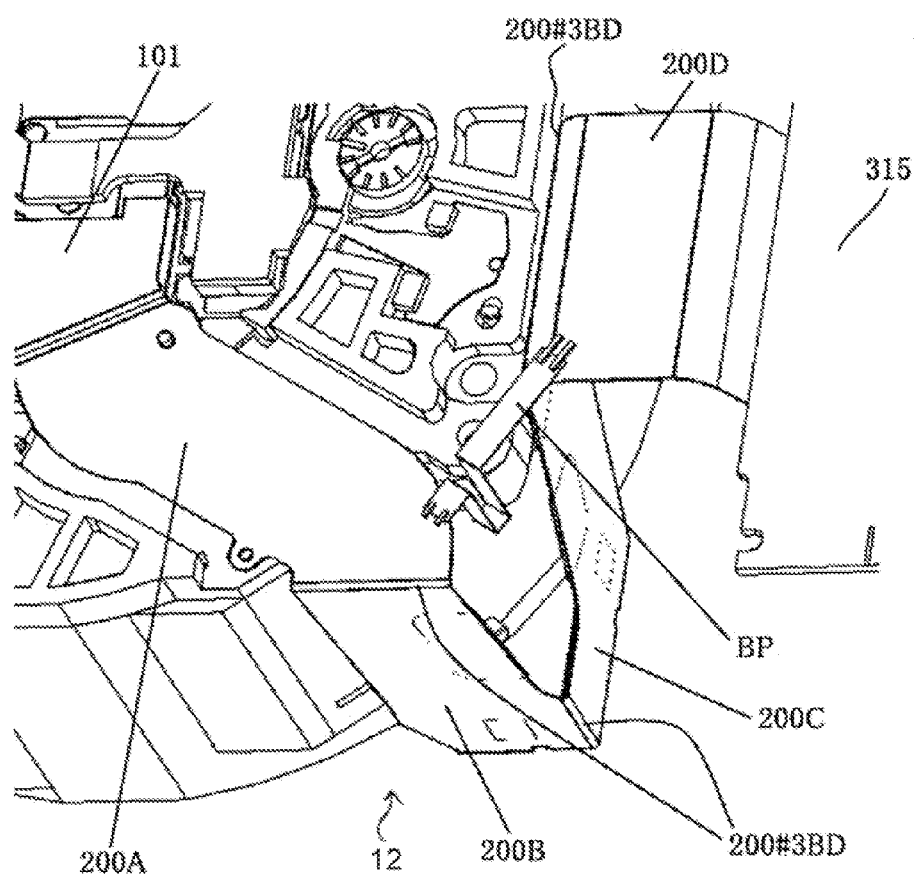
FIG. 53 is an enlarged view of the flexible board shown in FIG. 52.

FIG. 53 is an enlarged view of the flexible board 200#3. The flexible board 200#3 includes the first surface 200A disposed parallel to the image pickup device 101, the second surface 200B extending from the first surface 200A and disposed perpendicularly to the first surface 200A, the third surface 200C extending from the second surface 200B and disposed perpendicularly to the second surface 200B, and the fourth surface 200D extending from the third surface 200C and connected to the processing device 315, which are formed by three folded portions 200#3BD. The first surface 200A, the second surface 200B, and the third surface 200C are deformed in conjunction with the movement of the movable unit 303 so that the reactive force generated in the flexible board 200#3 can be absorbed. The bypass signal line BP is configured to bridge between the first surface 200A and the fourth surface 200D.

Figure 54:
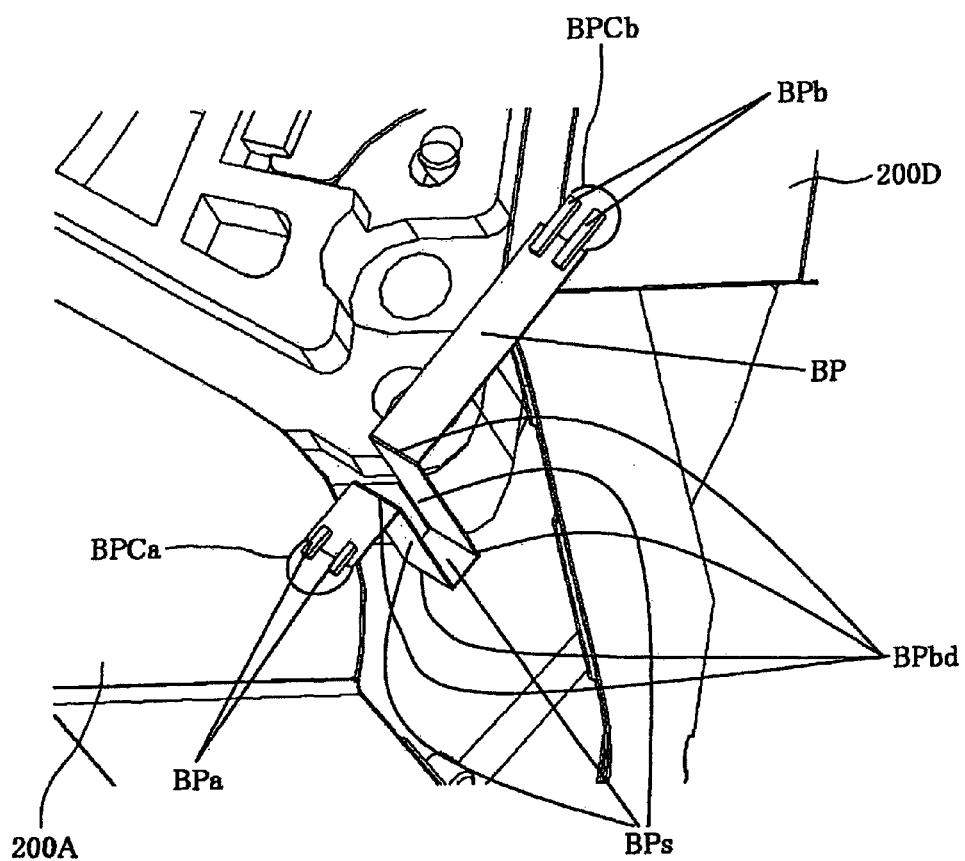
FIG. 54 is an enlarged view of the bypass signal line provided on the flexible board shown in FIG. 52.

FIG. 54 is an enlarged view of the bypass signal line BP provided on the flexible board 200#3. The bypass signal line BP is formed by folding a flexible board similar to the first to fourth surfaces 200A to 200D. That is to say, a strip-shaped flexible board is folded at four folded portions BPbd disposed in a longitudinal direction of the strip-shaped flexible board to form three surfaces BPs which are formed in a generally U-shaped form. Due to the structure of the U-shaped form, the first to third surfaces 200A to 200C are deformed in conjunction with the movement of the movable unit 303 so that the flexible board 200#3 can absorb the reactive force.

At both ends of the bypass signal line BP, solder portions BPa, BPb connecting to signal lines in the bypass signal line (two signal lines in FIG. 54) are provided, respectively. The solder portions BPa are soldered to be connected to electrical connection portions BPCa of the signal lines provided on the first surface 200A. The solder portions BPb are soldered to be connected to electrical connection portions BPCb of the signal lines provided on the fourth surface 200D. Thereby, the signal lines which pass via the first surface 200A, the bypass signal line BP, and the fourth surface 200D can be provided, so that a shorter line than the line passing via the first to fourth surfaces 200A to 200D of the flexible board 200#3 can be provided. The bypass signal line BP is provided separately from the first surface 200A to the fourth surface 200D of the flexible board 200#3 so that a form of the bypass signal line BP can be determined freely as long as the form of the bypass signal line BP does not affect the movement of the movable unit 303. In addition, the electric connection portions can be provided at any parts of the first surface 200A to the fourth surface 200D depending on the form of the bypass signal line BP so that design variations of the flexible board 200#3 can be increased.

It is possible for the bypass signal line BP to be provided together with the first surface 200A to the fourth surface 200D of the flexible board 200#3. In this case, the flexible board 200#3 can be easily assembled so that time and the number of processes required for assembling can be reduced.

Figure 55:
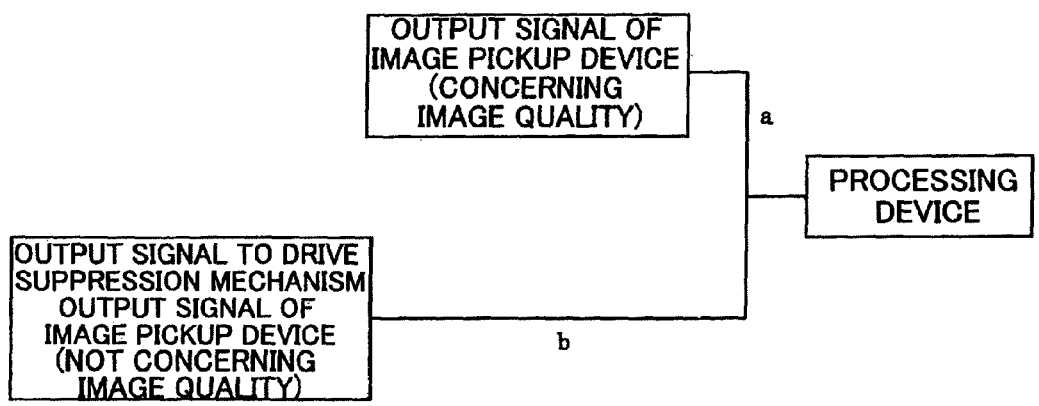
FIG. 55 is a block diagram illustrating a configuration of the signal lines of the flexible board shown in FIG. 52.

FIG. 55 is a block diagram illustrating a configuration of the signal lines of the flexible board 200#3 provided with the bypass signal line BP. Here, a difference of length between lines connecting each block shown in FIG. 55 indicates a relative difference of length between the signal lines, that is to say, the signal line a is shorter than the signal line b.

In this embodiment, the signal line passing through the first surface 200A, the bypass signal line BP, and the fourth surface 200D corresponds to the line a connecting an output terminal affecting image quality of the image pickup device 101 such as a CCD output, a horizontal transfer clock, or the like and an input terminal of the processing device 315 such as the CPU. On the other hand, the signal line passing through the first surface 200A to the fourth surface 200D of the flexible board 200#3 corresponds to the line b connecting an output terminal concerning the image blur suppression mechanism such as the driving coils, the position detection sensor, or the like provided on the movable unit 303 and an output terminal of the image pickup device 101 not affecting image quality of the image pickup device 101 to the input terminal of the CPU as the processing device 315. That is to say, the line a is an image signal line communicating the image signals between the image pickup device 101 and the processing device 315 and the line b is a driving signal line communicating signals between a driving system for the image blur suppression mechanism and the processing device 315. The signal line a, which is shorter than the signal line b, is used as the line affecting image quality of the image pickup device 101 so that a reduction of image quality can be prevented. Furthermore, the bypass signal line BP is formed by a flexible board so that the reactive force generated in the flexible board 200#3 due to the movement of the image pickup device 101 can be effectively absorbed.

Figure 56:
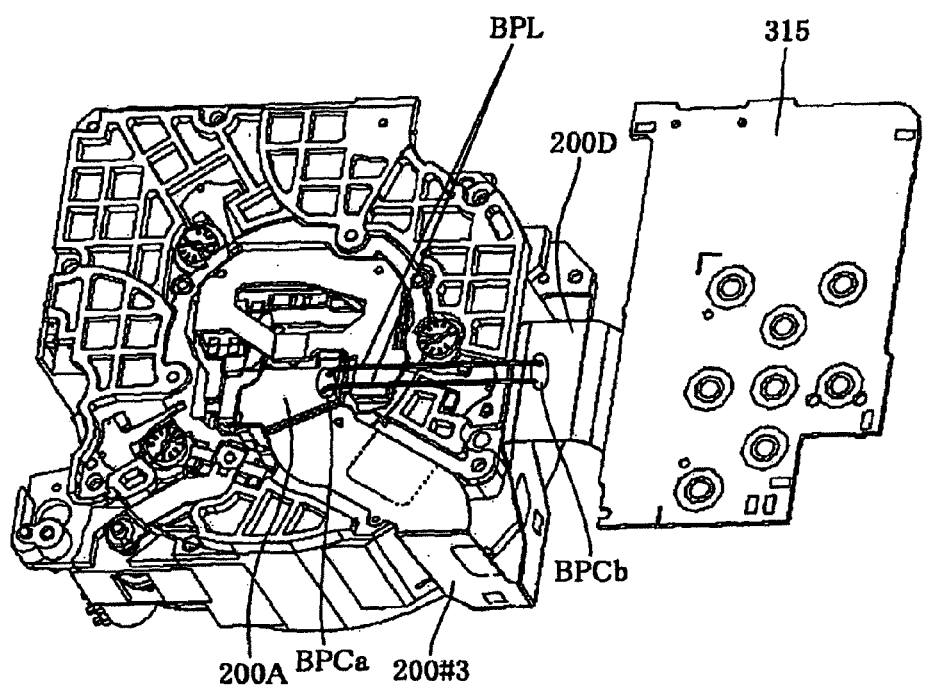
FIG. 56 is a view illustrating another example of a configuration in which a flexible board of the imaging apparatus according to an embodiment of the present invention is provided with a bypass signal line.

FIG. 56 shows another example of a configuration in which the flexible board 200#3 of the imaging apparatus according to the embodiment of the present invention is provided with the bypass signal line BP. Here, the bypass signal line BPL which is formed by two lead wires is used instead of the bypass signal line BP. Each of the lead wires has an end soldered and connected to an electric connection portion BPCa of the signal line provided on the first surface 200A and another end soldered and connected to an electric connection portion BPCb of the signal line provided on the fourth surface 200D. Thereby, a signal line passing through the first surface 200A, the bypass signal line BPL, and the fourth surface 200D, that is to say, the signal line which is shorter than the signal line passing through the first surface 200A to the fourth surface 200D can be provided. The signal line passing through the first surface 200A, the bypass signal line BPL, and the fourth surface 200D is used as the signal line communicating the image signals between the image pickup device 101 and the processing device 315. In this embodiment, a form of each of the lead wires of the bypass signal line BPL can be freely determined. In addition, each of the lead wires is deformed independently from each other so that the reactive force generated in the flexible board 200#3 can be effectively absorbed when the first surface 200A to the third surface 200C are deformed in conjunction with the movement of the movable unit 303.

It is possible for the imaging apparatus according to each of the above-mentioned embodiments and examples to have a function to detect a camera shake generating in the camera body, and perform the image blur suppression in which the image pickup device 101 is followed to the detected movement of a subject image due to the camera shake. The subject image is imaged on the image pickup device 101 through each lens system of the barrel unit 7. The image pickup device 101 performs a photoelectric conversion of the imaged subject image and outputs RGB analog signals to the processing device 315. The processor of the processing device 315 performs signal processes to the RGB analog signals output from the image pickup device 101 and converts them to YUV data. The displaying operation on the LCD monitor 10 is performed based on the YUV data.

The electronic device having the imaging apparatus according to the embodiments of the present invention can effectively control and drive the image pickup device.

Although the preferred embodiments of the present invention have been described, it should be noted that the present invention is not limited to these embodiments, and various changes and modifications can be made to the embodiments.

According to the above-mentioned embodiments or examples of the present invention, the following advantages can be provided.

Due to the positioning unit, the flexible board is positioned so that interferences between the flexible board and surrounding parts can be prevented.

The positioning unit is configured to guide the flexible board connected to the image pickup device to a peripheral portion of the barrel unit so that slack of the flexible board is reduced. Thereby, the interferences between the flexible board and the surrounding parts can be prevented. In addition, due to reduction of the slack of the flexible board, a space around the image pickup device can be effectively used so that a reduced size or thickness of the imaging apparatus can be achieved.

When the flexible board positioning member is fixed to the flexible board, the flexible board positioning member can firmly guide the flexible board to a position to be guided so that the interferences between the flexible board and the surrounding parts can be firmly prevented.

When the flexible board positioning member is connected to the movable unit with margins, even if a guided position of the flexible board is varied due to other parts being assembled with less accuracy, the positional variation can be absorbed by the margins.

The flexible board positioning member is fixed to the movable unit so that a movable range of the flexible board when the image pickup device is moved is controlled to prevent the interferences between the flexible board and the surrounding parts.

The flexible board can be positioned by simple configurations without affecting the movement of the image pickup device so that the interferences between the flexible board and the surrounding parts can be prevented.

The concave portion provided on the flexible board and the convex portion provided on the fixing unit and fitting in the concave portion have a margin in at least one direction of three dimensions so that even if a guided position of the flexible board is varied due to other parts being assembled with less accuracy, the positional variation can be absorbed by the margin.

The positioning unit can be provided at any position by simple configurations.

By use of the reinforcing member suppressing deformation of a surface, slack of the flexible board is suppressed so that the interferences between the flexible board and the surrounding parts can be prevented.

The reactive forces generated in the flexible board according to the movement of the image pickup device in directions perpendicular to the first surface, the second surface, and the third surface can be absorbed by the deformations of the first surface, the second surface, and the third surface.

The positioning unit positions the flexible board so that the interferences between the flexible board and the surrounding parts can be prevented.

The flexible board can be processed to be formed in a predetermined form by the folded portion positioning member so that the interferences between the flexible board and the surrounding parts can be firmly prevented.

The folded portion positioning member which is formed by a material equivalent to the flexible board is used so that the folded portion positioning member can be easily provided on the flexible board without complex processes in a case where a different material is used.

The folded portion positioning member can be provided on required positions without depending on electrical circuit configurations of the flexible board.

The signal line communicating the image signals between the image pickup device and the processing device can be shortened even if the long flexible board is used. Thereby, reduction of image quality can be prevented.

In the image blur suppression mechanism in which the image pickup device is followed to the movement of the subject image, the reactive force generating in the flexible board due to the movement of the image pickup device can be effectively absorbed so that the appropriate image blur suppression can be achieved.

In the imaging apparatus having the image blur suppression function or the electronic device including the imaging apparatus, the flexible board connecting the image pickup device and the processing device is provided with a positioning mechanism which allows the flexible board to be attached to the fixed processing device in a state the image pickup device is maintained to be appropriately movably disposed without affecting the movement of the image pickup device when or before the flexible board is attached to the fixed processing device.

INDUSTRIAL APPLICABILITY

The present invention is applicable to any portable device having a camera function or functional part installed therein, for example, a mobile phone, a video camera, and so on although it is not limited thereto.

The invention claimed is:

1. An imaging apparatus comprising:
a barrel unit having a photographic lens;
an image pickup device configured to receive light through the photographic lens to capture a subject image;
a movable unit configured to movably support the image pickup device in a direction perpendicular to a light-receiving axis of the subject image;
a processing unit configured to process signals from the image pickup device;
a flexible board configured to connect the image pickup device to the processing unit; and
a positioning unit including a positioning member configured to position the flexible board; and
wherein the movable unit and the positioning member are connected in a state where the positioning member is rotatably supported within a predetermined range by the movable unit, such that the positioning member is rotatable, within the predetermined range, relative to the movable unit.

2. The imaging apparatus according to claim 1, wherein the positioning member is configured to guide the flexible board connected to the image pickup device along a peripheral portion of the barrel unit.

3. The imaging apparatus according to claim 2, wherein the positioning member is fixed to the flexible board.

4. The imaging apparatus according to claim 1, further comprising a fixing unit configured to hold the barrel unit and the movable unit, wherein the positioning unit includes a concave portion provided on the flexible board and a convex portion provided on the fixing unit and configured to be fitted in the convex portion.

5. The imaging apparatus according to claim 4, wherein the concave portion has a margin in at least one direction of three dimensions with respect to the convex portion.

6. The imaging apparatus according to claim 4, wherein the concave portion is a hole or a U-shaped notch.

7. The imaging apparatus according to claim 1, wherein the flexible board has a plurality of surfaces formed by folding along a plurality of lines on the flexible board; and the positioning unit includes at least one folded portion positioning member which is provided on the flexible board and defines one of the plurality of lines.

8. The imaging apparatus according to claim 7, wherein the folded portion positioning member includes a member in which a plurality of positioning flexible boards equivalent to the flexible board are laminated or a member made of a thicker positioning flexible board than the flexible board.

9. The imaging apparatus according to claim 7, wherein the folded portion positioning member is a reinforcing member which is provided on the flexible board and limits deformation of the flexible board.

10. The imaging apparatus according to claim 7, wherein a signal line is disposed along the flexible board; a bypass signal line which is shorter in length than the signal line disposed along the flexible board is provided on the flexible board; and a part of the signal line communicating an image signal between the image pickup device and the processing unit is disposed along the bypass signal line.

11. The imaging apparatus according to claim 1, wherein a signal line is disposed along the flexible board; a bypass signal line which is shorter in length than the signal line disposed along the flexible board is provided on the flexible board; and a part of the signal line communicating an image signal between the image pickup device and the processing unit is disposed along the bypass signal line.

12. The imaging apparatus according to claim 1, further comprising a fixing unit configured to hold the barrel unit and the movable unit; and a suppression device configured to detect camera shake occurring in the fixing unit and to allow the image pickup device to follow by the movable unit a movement of the subject image, which occurs due to the camera shake, based on the detection of the camera shake.

13. An imaging apparatus comprising:
a barrel unit having a photographic lens;
an image pickup device configured to receive light through the photographic lens to capture a subject image;
a movable unit configured to movably support the image pickup device in a direction perpendicular to a light-receiving axis of the subject image;
a processing unit configured to process signals from the image pickup device;
a flexible board configured to connect the image pickup device to the processing unit; and
a positioning unit including a positioning member configured to position the flexible board; and
wherein the movable unit and the positioning member are connected in a state where the positioning member is rotatably supported within a predetermined range by the movable unit,
wherein the positioning unit includes at least one reinforcing member provided on a part of the flexible board to suppress deformation of the flexible board, and
wherein the flexible board has a plurality of surfaces formed by folding along a plurality of lines on the flexible board; at least one of the plurality of surfaces has a center portion in which the at least one reinforcing member is provided to limit deformation of the at least one surface; the plurality of surfaces include a first surface disposed parallel to the image pickup device, a second surface extending from the first surface and disposed perpendicularly to the first surface, and a third surface extending from the second surface and disposed perpendicularly to both of the second surface and the image pickup device; and the first surface, the second surface, and the third surface are capable of deforming in directions perpendicular to the first surface, the second surface, and the third surface, respectively.

14. The imaging apparatus according to claim 13, wherein the positioning unit is configured to position at least one of the plurality of surfaces with respect to the fixing unit.

15. The imaging apparatus according to claim 14, wherein the positioning unit includes a concave portion provided on the flexible board and a convex portion provided on the fixing unit and configured to be fitted in the concave portion.

16. The imaging apparatus according to claim 15, wherein the concave portion is a hole or a U-shaped notch.

* * * * *